(12) United States Patent
Oren et al.

(10) Patent No.: US 9,963,308 B2
(45) Date of Patent: May 8, 2018

(54) CONVEYOR WITH INTEGRATED DUST COLLECTOR SYSTEM

(71) Applicant: Oren Technologies, LLC, Houston, TX (US)

(72) Inventors: Joshua Oren, Houston, TX (US); Marty Boros, Houston, TX (US); Pete Berveiler, Houston, TX (US); Dave Hansen, Houston, TX (US); Colin Campbell, Houston, TX (US); Mike Edwards, Houston, TX (US); Thomas Massalone, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 0 days. days.

(21) Appl. No.: 15/463,201

(22) Filed: Mar. 20, 2017

(65) Prior Publication Data

US 2017/0190526 A1 Jul. 6, 2017

Related U.S. Application Data

(60) Continuation of application No. 15/463,063, filed on Mar. 20, 2017, which is a division of application No. 15/398,835, filed on Jan. 5, 2017.

(Continued)

(51) Int. Cl.
*B65G 53/24* (2006.01)
*B65G 69/18* (2006.01)
(Continued)

(52) U.S. Cl.
CPC ........ *B65G 69/181* (2013.01); *B01F 13/0037* (2013.01); *B65G 11/00* (2013.01);
(Continued)

(58) Field of Classification Search
CPC ........ B65G 53/24; B65G 53/26; B65G 65/42; B65G 65/425; B65G 69/182; B65G 69/186
(Continued)

(56) References Cited

U.S. PATENT DOCUMENTS 137,871 A 4/1873 Worsley
150,894 A 5/1874 Safely
(Continued)

FOREIGN PATENT DOCUMENTS

CA 2023138 2/1992
CA 2791088 3/2013
(Continued)

OTHER PUBLICATIONS

Arrows Up, Inc., Jumbo BTS—Bulk Transport System, Aug. 1, 2014.
(Continued)

*Primary Examiner* — Joseph Dillon, Jr.
(74) *Attorney, Agent, or Firm* — Hogan Lovells US LLP

(57) ABSTRACT

Embodiments of the present disclosure a system for capturing proppant dust particles when positioned at a fracking operation site including a proppant delivery assembly to receive one or more containers having proppant stored therein. The system dispenses the proppant from the one or more containers and delivers the proppant to other fracking operation equipment. Moreover, the system includes a dust collection assembly positioned proximate and associated with the proppant delivery assembly to capture dust particles released by movement and settling of the proppant when being dispensed and delivered by the proppant delivery assembly. The dust collection assembly is positioned to direct an air flow in a flow path overlying the dust particles to capture the dust particles and move the dust particles (Continued)

away from the proppant thereby reducing risk of dust exposure to fracking operation site personnel.

5 Claims, 30 Drawing Sheets

Related U.S. Application Data

(60) Provisional application No. 62/275,377, filed on Jan. 6, 2016.

(51) Int. Cl.
| | |
|---|---|
| *B65G 53/26* | (2006.01) |
| *E21B 41/00* | (2006.01) |
| *B65G 15/00* | (2006.01) |
| *B65G 11/00* | (2006.01) |
| *B65G 65/42* | (2006.01) |
| *B01F 13/00* | (2006.01) |
| *E21B 43/26* | (2006.01) |
| *E21B 43/267* | (2006.01) |

(52) U.S. Cl.
CPC .............. *B65G 15/00* (2013.01); *B65G 53/24* (2013.01); *B65G 53/26* (2013.01); *B65G 65/42* (2013.01); *B65G 69/182* (2013.01); *E21B 41/00* (2013.01); *E21B 43/26* (2013.01); *E21B 43/267* (2013.01)

(58) Field of Classification Search
USPC ................ 406/113, 117, 118, 151, 152, 153; 414/291, 332; 198/637; 454/56
See application file for complete search history.

(56) References Cited

U.S. PATENT DOCUMENTS

| | | |
|---|---|---|
| D384,443 S | 6/1888 | Hoover |
| D448,238 S | 3/1891 | Johnson |
| 710,611 A | 10/1902 | Ray |
| 711,632 A | 10/1902 | Johnson |
| 917,649 A | 4/1909 | Otto |
| 1,143,641 A | 6/1915 | McGregor |
| 1,331,883 A | 2/1920 | Stuart |
| 1,344,768 A | 6/1920 | Messiter |
| 1,434,488 A | 11/1922 | Forsythe et al. |
| 1,520,560 A | 12/1923 | Burno |
| 1,506,936 A | 9/1924 | Lea |
| 1,526,527 A | 2/1925 | Butler |
| 1,573,664 A | 2/1926 | Wetherill |
| 1,807,447 A | 5/1931 | Smith |
| 1,850,000 A | 3/1932 | Fernand |
| 1,932,320 A | 10/1933 | Steward |
| 1,973,312 A | 9/1934 | Hardinge |
| 2,020,628 A | 11/1935 | Woodruff |
| 2,233,005 A | 2/1941 | Garlinghouse |
| 2,255,448 A | 9/1941 | Morris |
| 2,293,160 A | 8/1942 | Miller et al. |
| 2,368,672 A | 2/1945 | McNamara |
| 2,381,103 A | 8/1945 | Frank |
| 2,385,245 A | 9/1945 | Willoughby |
| 2,413,661 A | 12/1946 | Stokes |
| 2,423,879 A | 7/1947 | De Frees |
| 2,563,470 A | 8/1951 | Kane |
| 2,564,020 A | 8/1951 | Mengel |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,670,866 A | 3/1954 | Glesby |
| 2,678,145 A | 5/1954 | Ejuzwiak et al. |
| 2,693,282 A | 11/1954 | Sensibar |
| 2,700,574 A | 1/1955 | Tourneau |
| 2,792,262 A | 4/1955 | Hathom |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,873,036 A | 2/1959 | Noble |
| 2,894,666 A | 7/1959 | Campbell, Jr. |
| 2,988,235 A | 6/1961 | Ronyak |
| 2,994,460 A | 8/1961 | Matthews |
| 3,041,113 A | 6/1962 | Sackett |
| 3,049,248 A | 8/1962 | Heltzel et al. |
| 3,064,832 A | 11/1962 | Heltzel |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Raymond |
| 3,134,606 A | 5/1964 | Oyler |
| 3,135,432 A | 6/1964 | McKinney |
| 3,163,127 A | 12/1964 | Gutridge et al. |
| 3,187,684 A | 6/1965 | Ortner |
| 3,198,494 A | 8/1965 | Curran et al. |
| 3,199,585 A | 8/1965 | Cronberger |
| 3,248,026 A | 4/1966 | Kemp |
| 3,255,927 A | 6/1966 | Ruppert et al. |
| 3,265,443 A | 8/1966 | Simas |
| 3,270,921 A | 9/1966 | Nadolske et al. |
| 3,281,006 A | 10/1966 | Tonchung |
| 3,294,306 A | 12/1966 | Areddy |
| 3,318,473 A | 5/1967 | Jones et al. |
| 3,326,572 A | 6/1967 | Murray |
| 3,343,688 A | 9/1967 | Ross |
| 3,353,599 A | 11/1967 | Swift |
| 3,354,918 A | 11/1967 | Coleman |
| 3,378,152 A | 4/1968 | Warner |
| 3,387,570 A | 6/1968 | Pulcrano et al. |
| 3,396,675 A | 8/1968 | Stevens |
| 3,397,654 A | 8/1968 | Snyder |
| 3,406,995 A | 10/1968 | McCarthy |
| 3,407,971 A | 10/1968 | Oehler |
| 3,425,599 A | 2/1969 | Sammarco et al. |
| 3,455,474 A | 7/1969 | Truncali |
| 3,476,270 A | 11/1969 | Cox et al. |
| 3,486,787 A | 12/1969 | Campbell |
| 3,499,694 A | 3/1970 | Coppel |
| 3,508,762 A | 4/1970 | Pratt |
| 3,524,567 A | 8/1970 | Coleman |
| 3,528,570 A | 9/1970 | Pase |
| 3,561,633 A | 2/1971 | Morrison et al. |
| 3,587,834 A | 6/1971 | Dugge |
| 3,596,609 A | 8/1971 | Ortner |
| 3,601,244 A | 8/1971 | Ort et al. |
| 3,602,400 A | 8/1971 | Cooke |
| 3,650,567 A | 3/1972 | Danielson |
| 3,653,521 A | 4/1972 | Bridge |
| 3,661,293 A | 5/1972 | Gerhard et al. |
| 3,692,363 A | 9/1972 | Tenebaum et al. |
| 3,704,797 A | 12/1972 | Suykens |
| 3,721,199 A | 3/1973 | Hassenauer |
| 3,729,121 A | 4/1973 | Cannon |
| 3,734,215 A | 5/1973 | Smith |
| 3,738,511 A | 6/1973 | Lemon et al. |
| 3,752,511 A | 8/1973 | Racy |
| 3,777,909 A | 12/1973 | Rheinfrank |
| 3,785,534 A | 1/1974 | Smith |
| 3,800,712 A | 4/1974 | Krug, Jr. |
| 3,802,584 A | 4/1974 | Sackett |
| 3,817,261 A | 6/1974 | Rogge |
| 3,820,762 A | 6/1974 | Bostrom et al. |
| 3,827,578 A | 8/1974 | Hough |
| 3,840,141 A | 10/1974 | Allom et al. |
| 3,854,612 A | 12/1974 | Snape |
| 3,861,716 A | 1/1975 | Baxter et al. |
| 3,883,005 A | 5/1975 | Stevens |
| 3,909,223 A | 9/1975 | Schmidt |
| 3,913,933 A | 10/1975 | Visser et al. |
| 3,933,100 A | 1/1976 | Dugge |
| 3,963,149 A | 6/1976 | Fassauer |

(56) References Cited

U.S. PATENT DOCUMENTS

| | | |
|---|---|---|
| 3,970,123 A | 7/1976 | Poulton et al. |
| 3,986,708 A | 10/1976 | Heltzel et al. |
| 3,997,089 A | 12/1976 | Clarke et al. |
| 4,003,301 A | 1/1977 | Norton |
| 4,004,700 A | 1/1977 | Empey |
| 4,057,153 A | 11/1977 | Weaver |
| 4,058,239 A | 11/1977 | Van Mill |
| 4,063,656 A | 12/1977 | Lambert |
| 4,073,410 A | 2/1978 | Melcher |
| 4,125,195 A | 11/1978 | Sasadi |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,245,820 A | 1/1981 | Muryn |
| 4,247,228 A | 1/1981 | Gray et al. |
| 4,247,370 A | 1/1981 | Nijhawan et al. |
| 4,258,953 A | 3/1981 | Johnson |
| 4,265,266 A | 5/1981 | Kierbow et al. |
| 4,278,190 A | 7/1981 | Oory et al. |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,299,597 A | 11/1981 | Oetiker et al. |
| 4,306,895 A | 12/1981 | Thompson et al. |
| 4,329,106 A | 5/1982 | Adler |
| 4,350,241 A | 9/1982 | Wenzel |
| 4,359,176 A | 11/1982 | Johnson |
| 4,363,396 A | 12/1982 | Wolf et al. |
| 4,395,052 A | 7/1983 | Rash |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,420,285 A | 12/1983 | Loyer et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,513,755 A | 4/1985 | Baroni |
| 4,525,071 A | 6/1985 | Horowitz |
| 4,526,353 A | 7/1985 | Stomp |
| 4,532,098 A | 7/1985 | Campbell |
| 4,534,869 A | 8/1985 | Seibert |
| 4,552,573 A | 11/1985 | Weis |
| 4,569,394 A | 2/1986 | Sweatman et al. |
| 4,570,967 A | 2/1986 | Allnut |
| 4,571,143 A | 2/1986 | Hellerich |
| 4,588,605 A | 5/1986 | Frei et al. |
| 4,608,931 A | 9/1986 | Ruhmann et al. |
| 4,619,531 A | 10/1986 | Dunstan |
| 4,624,729 A | 11/1986 | Bresciani et al. |
| 4,626,155 A | 12/1986 | Hlinsky et al. |
| 4,626,166 A | 12/1986 | Jolly |
| 4,628,825 A | 12/1986 | Taylor et al. |
| 4,639,015 A | 1/1987 | Pitts |
| 4,648,584 A | 3/1987 | Wamser |
| 4,660,733 A | 4/1987 | Snyder et al. |
| 4,701,095 A | 10/1987 | Berryman et al. |
| 4,714,010 A | 12/1987 | Smart |
| 4,715,754 A | 12/1987 | Scully |
| 4,738,774 A | 4/1988 | Patrick |
| 4,741,273 A | 5/1988 | Sherwood |
| 4,761,039 A | 8/1988 | Hilaris |
| 4,798,039 A | 1/1989 | Deglise |
| 4,801,389 A | 1/1989 | Brannon et al. |
| 4,819,830 A | 4/1989 | Schultz |
| 4,836,510 A | 6/1989 | Weber et al. |
| 4,836,735 A | 6/1989 | Dennehy |
| 4,848,605 A | 7/1989 | Wise |
| 4,882,784 A | 11/1989 | Tump |
| 4,889,219 A | 12/1989 | Key |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,949,714 A | 8/1990 | Orr |
| 4,954,975 A | 9/1990 | Kalata |
| 4,956,821 A | 9/1990 | Fenelon |
| 4,964,243 A | 10/1990 | Reiter |
| 4,975,205 A | 12/1990 | Sloan |
| 4,975,305 A | 12/1990 | Biginelli |
| 4,988,115 A | 1/1991 | Steinke |
| 4,995,522 A | 2/1991 | Barr |
| 5,004,400 A | 4/1991 | Handke |
| 5,028,002 A | 7/1991 | Whitford |
| 5,042,538 A | 8/1991 | Wiese |
| 5,069,352 A | 12/1991 | Harbolt et al. |
| 5,080,259 A | 1/1992 | Hadley |
| 5,082,304 A | 1/1992 | Preller |
| 5,102,281 A | 4/1992 | Handke |
| 5,102,286 A | 4/1992 | Fenton |
| 5,105,858 A | 4/1992 | Levinson |
| 5,131,524 A | 7/1992 | Uehara |
| 5,167,719 A | 12/1992 | Tamaki |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,280,883 A | 1/1994 | Ibar |
| 5,286,158 A | 2/1994 | Zimmerman |
| 5,286,294 A | 2/1994 | Ebi et al. |
| 5,290,139 A | 3/1994 | Hedrick |
| 5,317,783 A | 6/1994 | Williamson |
| 5,320,046 A | 6/1994 | Hesch |
| 5,324,097 A | 6/1994 | DeCap |
| 5,339,996 A | 8/1994 | Dubbert |
| 5,345,982 A | 9/1994 | Nadeau et al. |
| 5,358,137 A | 10/1994 | Shuert et al. |
| 5,373,792 A | 12/1994 | Pileggi et al. |
| 5,392,946 A | 2/1995 | Holbrook et al. |
| 5,402,915 A | 4/1995 | Hogan |
| 5,413,154 A | 5/1995 | Hurst, Jr. et al. |
| 5,429,259 A | 7/1995 | Robin |
| 5,441,321 A | 8/1995 | Karpisek |
| 5,465,829 A | 11/1995 | Kruse |
| 5,470,175 A | 11/1995 | Jensen et al. |
| 5,470,176 A | 11/1995 | Corcoran et al. |
| 5,493,852 A | 2/1996 | Stewart |
| 5,498,119 A | 3/1996 | Faivre |
| 5,507,514 A | 4/1996 | Jacques |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |

(56) References Cited

U.S. PATENT DOCUMENTS

| | | |
|---|---|---|
| 5,687,881 A | 11/1997 | Rouse et al. |
| 5,690,466 A | 11/1997 | Gaddis et al. |
| 5,697,535 A | 12/1997 | Coleman |
| 5,706,614 A | 1/1998 | Wiley et al. |
| 5,718,555 A | 2/1998 | Swalheim |
| 5,722,552 A | 3/1998 | Olson |
| 5,722,688 A | 3/1998 | Garcia |
| 5,746,258 A | 5/1998 | Huck |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,906,471 A | 5/1999 | Schwoerer |
| 5,911,337 A | 6/1999 | Bedeker |
| 5,924,829 A | 7/1999 | Hastings |
| 5,927,558 A | 7/1999 | Bruce |
| 5,960,974 A | 10/1999 | Kee |
| 5,971,219 A | 10/1999 | Karpisek |
| 5,993,202 A | 11/1999 | Yamazaki et al. |
| 5,997,099 A | 12/1999 | Collins |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 | 4/2001 | Crosby |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,422,413 B1 | 7/2002 | Hall et al. |
| 6,425,725 B1 | 7/2002 | Ehlers |
| 6,450,522 B1 | 9/2002 | Yamada et al. |
| 6,457,291 B2 | 10/2002 | Wick |
| 6,498,976 B1 | 12/2002 | Ehlbeck et al. |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,557,896 B1 | 5/2003 | Stobart |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,066 B2 | 1/2004 | Moshgbar |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 | 8/2007 | Eng Soon et al. |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,695,538 B2 | 4/2010 | Cheng |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,213 B1 | 8/2011 | Gauthier et al. |
| 7,997,623 B2 | 8/2011 | Williams |
| 8,083,083 B1 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Benning et al. |
| D688,351 S | 8/2013 | Oren |
| 8,505,780 B2 | 8/2013 | Oren |
| 8,544,419 B1 | 10/2013 | Spalding et al. |
| 8,545,148 B2 | 10/2013 | Wanek-Pusset et al. |
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |

(56) References Cited

U.S. PATENT DOCUMENTS

| | | |
|---|---|---|
| 8,662,525 B1 | 3/2014 | Dierks et al. |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 9,624,036 B2 | 4/2017 | Luharuka et al. |
| 9,688,492 B2 | 6/2017 | Stutzman et al. |
| 2001/0022308 A1 | 9/2001 | Epp et al. |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0006248 A1 | 1/2003 | Gill et al. |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2007/0194564 A1 | 8/2007 | Garceau et al. |
| 2008/0008562 A1 | 1/2008 | Beckel et al. |
| 2008/0029546 A1 | 2/2008 | Schuld |
| 2008/0029553 A1 | 2/2008 | Culleton |
| 2008/0058228 A1 | 3/2008 | Wilson |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2008/0315558 A1 | 12/2008 | Cesterino |
| 2009/0038242 A1 | 2/2009 | Cope |
| 2009/0078410 A1 | 3/2009 | Krenek et al. |
| 2009/0278326 A1 | 11/2009 | Rowland et al. |
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0080681 A1 | 4/2010 | Bain |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0207371 A1 | 8/2010 | Van Houdt et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0121003 A1 | 5/2011 | Moir |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0017812 A1 | 1/2012 | Renyer |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0247335 A1 | 10/2012 | Stutzman et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2014/0377042 A1 | 12/2014 | McMahon |
| 2015/0004895 A1 | 1/2015 | Hammers et al. |
| 2015/0069052 A1 | 3/2015 | Allegretti et al. |
| 2015/0079890 A1 | 3/2015 | Stutzman et al. |
| 2015/0086307 A1 | 3/2015 | Stefan |
| 2015/0086308 A1 | 3/2015 | McIver et al. |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1* | 7/2015 | De Siqueira .............. B07B 1/24 241/19 |
| 2015/0284183 A1 | 10/2015 | Houghton et al. |
| 2016/0148813 A1 | 5/2016 | Rogers et al. |
| 2016/0177678 A1 | 6/2016 | Morris et al. |
| 2016/0185522 A1* | 6/2016 | Herman .................. B60P 1/04 414/332 |
| 2016/0273355 A1 | 9/2016 | Gosney et al. |
| 2016/0280480 A1 | 9/2016 | Smith et al. |
| 2017/0129721 A1 | 5/2017 | Harris et al. |

FOREIGN PATENT DOCUMENTS

| | | |
|---|---|---|
| CN | 2037354 | 5/1989 |
| CN | 2059909 | 8/1990 |
| CN | 2075632 | 4/1991 |
| CN | 1329562 | 1/2002 |
| CN | 2517684 | 10/2002 |
| CN | 1635965 | 7/2005 |
| CN | 2913250 | 6/2007 |
| CN | 201390486 | 1/2010 |
| CN | 101823630 | 9/2010 |
| CN | 102101595 | 6/2011 |
| CN | 201881469 | 6/2011 |
| CN | 102114985 | 7/2011 |
| CN | 203033469 | 7/2013 |
| CN | 103350017 | 10/2013 |

(56) References Cited

FOREIGN PATENT DOCUMENTS

| | | |
|---|---|---|
| DE | 3108121 | 9/1982 |
| DE | 3342281 | 6/1985 |
| DE | 4217329 | 5/1993 |
| DE | 20317967 | 3/2004 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1775190 | 4/2007 |
| EP | 1795467 | 6/2007 |
| EP | 2062832 | 5/2009 |
| EP | 2311757 | 4/2011 |
| FR | 2173445 | 10/1973 |
| FR | 2640598 | 6/1990 |
| GB | 1296736 | 11/1972 |
| GB | 2204847 | 11/1988 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| MX | 2012011046 | 5/2013 |
| WO | 1990008082 | 7/1990 |
| WO | 1992002437 | 2/1992 |
| WO | 1993001997 | 2/1993 |
| WO | 1993006031 | 4/1993 |
| WO | 1996025302 | 8/1996 |
| WO | 2006039757 | 4/2006 |
| WO | 2007005054 | 1/2007 |
| WO | 2007057398 | 5/2007 |
| WO | 2007061310 | 5/2007 |
| WO | 2008012513 | 1/2008 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield infrastructure, Mobile Sand Silo System, 2016.
Final Office dated Sep. 27, 2016 for co-pending U.S. Appl. No. 13/555,635.
Non-Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
Non-Final Office Action dated Apr. 3, 2017 for co-pending U.S. Appl. No. 13/555,635.
Non-Final Office Action dated Feb. 14, 2017 for co-pending U.S. Appl. No. 14/943,111.

(56) References Cited

OTHER PUBLICATIONS

Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Feb. 24, 2017 for co-pending U.S. Appl. No. 14/943,182.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
International Search Report for related International Application No. PCT/US2012/066639, dated Feb. 25, 2013.
International Search Report for related International Application No. PCT/US2013/035442, dated Jun. 23, 2011.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May 2013.
SandBox Logistics, LLC, screenshots from video made in Apr. 2013 and publicly shown in May 2013, Arnegard, North Dakota.
International Search Report for PCT/US15/35635, filed Oct. 30, 2015. (12 pages).

PCT International Search Report for PCT/US15/49074, dated Dec. 17, 2015. (11 pages).
PCT International Search Report for PCT/US15/57601, dated May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.

(56) References Cited

OTHER PUBLICATIONS

Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
WW Trailers Inc., Model GN204S9A datasheet, Portland, OR, Jan. 2007 (4pages).
Final Office Action dated Jul. 27, 2017 for co-pending U.S. Appl. No. 14/738,485.
Non-Final Office Acton dated Aug. 3, 2017 for co-pending U.S. Appl. No. 15/218,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4pages).
Non-Final Office Action dated Sep. 8, 2017 for co-pending U.S. Appl. No. 15/475,354.
Non-Final Office Action dated Sep. 8, 2017 for co-pending U.S. Appl. No. 15/143,942.
International Search Report and Written Opinion for PCT/US17/34603 dated Aug. 22, 2017.
Non-Final Office Action dated Aug. 30, 2017 for co-pending U.S. Appl. No. 14/943,182.
Non-Final Office Action dated Aug. 4, 2017 for co-pending U.S. Appl. No. 13/625,675.
Final Office Action dated Oct. 13, 2017 for co-pending U.S. Appl. No. 15/398,950.
Non-Final Office Action dated Sep. 21, 2017 for co-pending U.S. Appl. No. 15/413,822.
Non-Final Office Action dated Oct. 5, 2017 for co-pending U.S. Appl. No. 14/848,447.
Final Office Action dated Sep. 21, 2017 for co-pending U.S. Appl. No. 14/922,836.
Non-Final Office Action dated Sep. 27, 2017 for co-pending U.S. Appl. No. 14/996,362.
Non-Final Office Action dated Sep. 28, 2017 for co-pending U.S. Appl. No. 13/628,702.
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al v. Grit Energy Solutions LLC*, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.
Final Office Action dated Jan. 22, 2018 for co-pending U.S. Appl. No. 13/628,702.
Final Office Action dated Jan. 25, 2018 for co-pending U.S. Appl. No. 15/602,666.
Final Office Action dated Feb. 6, 2018 for co-pending U.S. Appl. No. 15/475,354.
Non-Final Office Action dated Feb. 9, 2018 for co-pending U.S. Appl. No. 15/587,926.
Non-Final Office Action dated Feb. 15, 2018 for co-pending U.S. Appl. No. 14/922,836.
Final Office Action dated Dec. 27, 2017 for co-pending U.S. Appl. No. 14/943,182.
Smith, Ryan E., Prefab Architecture, A Guide to Modular Design and Construction, John Wiley & Sons, Inc., 2010.
Osha-Niosh, Hazard Alert: Worker Exposure to Silica during Hydraulic Fracturing, Jun. 2012.
Tremoglie, Michael P., Legal NewsLine, OSHA, NIOSH issue fracking health alert (/stories/510527440-oshaniosh-issue-fracking-health-alert), Jun. 25, 2012.
Beckwith, Robin, Proppants: Where in the World, Journal of Petroleum Technology, Apr. 2011.
Final Office Action dated Feb. 27, 2018 for co-pending U.S. Appl. No. 15/143,942.

\* cited by examiner

CONVEYOR WITH INTEGRATED DUST COLLECTOR SYSTEM

RELATED APPLICATIONS

This application is a continuation of U.S. Non-Provisional application Ser. No. 15/463,063, filed Mar. 20, 2017, titled "Conveyor with Integrated Dust Collector System," which is a divisional of U.S. Non-Provisional application Ser. No. 15/398,835, filed Jan. 5, 2017, titled "Conveyor with Integrated Dust Collector System," which claims priority to U.S. Provisional Application No. 62/275,377, filed Jan. 6, 2016, titled "Conveyor with Integrated Dust Collector System," all of which are incorporated herein by reference in their entireties.

BACKGROUND

Field of the Invention

The present invention relates to collecting dust particles. More particularly, the present invention relates to systems and methods to collect dust particles formed during the movement of proppant.

Description of Related Art

Hydraulic fracturing or "fracking" has been used for decades to stimulate production from conventional oil and gas wells. In recent years, the use of fracking has increased due to the development of new drilling technology such as horizontal drilling and multi-stage fracking. Such techniques reach previously-unavailable deposits of natural gas and oil. Fracking generally includes pumping fluid into a wellbore at high pressure. Inside the wellbore, the fluid is forced into the formation being produced. When the fluid enters the formation, it fractures, or creates fissures, in the formation. Water, as well as other fluids, and some solid proppants, are then pumped into the fissures to stimulate the release of oil and gas from the formation.

By far the dominant proppant is silica sand, made up of ancient weathered quartz, the most common mineral in the Earth's continental crust. Unlike common sand, which often feels gritty when rubbed between your fingers, sand used as a proppant tends to roll to the touch as a result of its round, spherical shape and tightly-graded particle distribution. Sand quality is a function of both deposit and processing. Grain size is critical, as any given proppant should reliably fall within certain mesh ranges, subject to downhole conditions and completion design. Generally, coarser proppant allows a higher capacity due to the larger pore spaces between grains. This type of proppant, however, may break down or crush more readily under stress due to the relatively fewer grain-to-grain contact points to bear the stress often incurred in deep oil- and gas-bearing formations.

During fracking operations, workers may load fracking proppant into blending hoppers to mix the fracking proppant with fluids (e.g., water, specialty fracking chemicals, etc.) before injection into the wellbore. The movement and loading of the fracking proppant may produce dust particles which may be inhaled by operations personnel or sucked into mechanical equipment. Inhalation by personnel may negatively impact health. Moreover, mechanical equipment may be damaged by the dust particles. For example, the particles may clog filters and reduce air flow to the equipment. Accordingly, it is now recognized that it is desirable to reduce the presence of dust particles near locations having fracking proppant.

SUMMARY

Applicants recognized the problems noted above herein and conceived and developed embodiments of systems and methods, according to the present invention, to position proppant containers onto racks, holders, conveyors, or the like.

In an embodiment a system for capturing proppant dust particles when positioned at a fracking operation site includes a proppant delivery assembly to receive one or more containers having proppant stored therein. The system dispenses the proppant from the one or more containers and delivers the proppant to other fracking operation equipment. Moreover, the system includes a dust collection assembly positioned proximate and associated with the proppant delivery assembly to capture dust particles released by movement and settling of the proppant when being dispensed and delivered by the proppant delivery assembly. The dust collection assembly is positioned to direct an air flow in a flow path overlying the dust particles to capture the dust particles and move the dust particles away from the proppant thereby reducing risk of dust exposure to fracking operation site personnel.

In another embodiment a system for capturing proppant dust particles when positioned at a fracking operation site includes a proppant delivery assembly supporting one or more contains having proppant stored therein. The one or more containers are arranged to dispense proppant to a chute that directs the dispensed proppant to a desired location. The system also includes a dust collection assembly positioned proximate and at least partially coupled to the proppant delivery system to capture dust particles released by movement and settling of the proppant when being dispensed and directed to the desired location. Moreover, the dust collection assembly is positioned to draw a volume of air containing dust particles proximate the desired location away from the desired location to reduce the risk of dust exposure to personnel near the desired location.

In a further embodiment, a method of capturing proppant dust particles when positioned at a fracking operation site includes delivering proppant stored in one or more containers to fracking operation equipment via a proppant delivery assembly. The method also includes capturing proppant dust particles formed by the movement and settling of the proppant at the fracking operation equipment via an air flow directed in a flow path overlying the dust particles. The method further includes removing the proppant dust particles from the fracking operation equipment by directing the air flow away from the fracking operation equipment.

In another embodiment, a catch box is arranged proximate a lower surface of a proppant mover to catch proppant and dust particles as the proppant is transferred from the proppant mover to a desired location. The catch box includes an inlet positioned below the proppant mover to catch residual proppant and dust particles after the proppant mover has deposited proppant into a chute that directs the proppant to the desired location. The catch box also includes an interior volume to store the residual proppant and dust. Moreover, the catch box includes an outlet having a conduit connection to enable removal of the residual proppant and dust particles via suction at the outlet.

In a further embodiment, a hood assembly to direct a vacuum air flow that removes a volume of air containing proppant dust particles after a proppant has been transported to a desired location from a flow path includes a first hood section that substantially surrounds and receives an outlet of a chute that directs the proppant to the desired location. The first hood section includes at least one dust receptacle extending through a body of the first hood section to enable a volume of air to exit the first hood section. The hood assembly also includes a second hood section positioned adjacent the first hood section and comprising at least one dust receptacle to receive the volume of air. Additionally, the hood assembly includes a third hood section positioned adjacent the first hood section and opposite the second hood section. The third hood section includes at least one dust receptacle to receive the volume of air and being substantially symmetrical to the second hood section about the first hood section.

In another embodiment, a proppant delivery assembly to receive and support one or more containers having proppant stored therein includes a cradle having a top surface to receive and support the one or more containers when positioned thereon. The cradle enables the one or more containers to dispense the proppant stored therein. The proppant delivery assembly also includes a proppant mover positioned below the top surface of the cradle and aligned with the one or more containers to receive the proppant when the proppant is dispensed from the one or more containers. The proppant mover carries the proppant away from the one or more containers. The proppant delivery assembly also includes a directable chute that receives the proppant from the proppant mover and directs the proppant to a desired location, the chute being coupled to the cradle and movable about an axis to change the location where the proppant is dispensed.

In a further embodiment a dust collection assembly to collect and remove dust particles in a volume of air, the dust particles formed by the movement and settling of proppant, includes a hood assembly positioned proximate the volume of air having the dust particles. The hood assembly directs at least a portion of the volume of air toward one or more dust receptacles extending through the hood assembly and defines at least a portion of the volume of air. The dust receptacles are positioned to direct at least a portion of the volume of air away from the hood assembly. The dust collection assembly also includes a vacuum air unit fluidly coupled to the hood assembly at the one or more dust receptacles. The vacuum air unit generates suction pressure to draw at least a portion of the volume of air out of the hood assembly through the one or more dust receptacles.

BRIEF DESCRIPTION OF DRAWINGS

The foregoing aspects, features, and advantages of the present invention will be further appreciated when considered with reference to the following description of embodiments and accompanying drawings. In describing the embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

DETAILED DESCRIPTION

Figure 1:
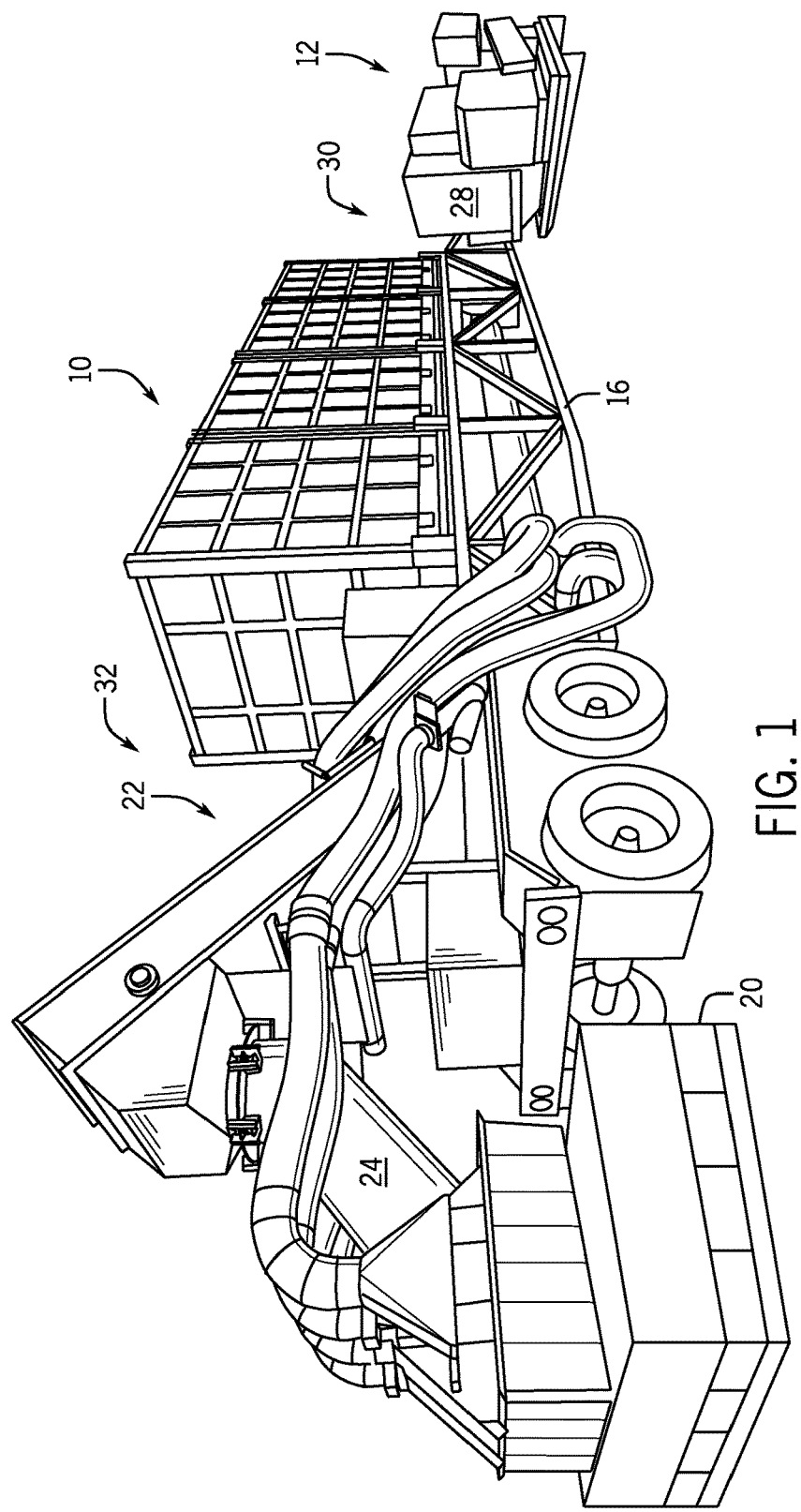
FIG. 1 is a front perspective view of a proppant delivery system having a dust collection assembly according to an embodiment of the present invention.

The foregoing aspects, features, and advantages of the present invention will be further appreciated when considered with reference to the following description of embodiments and accompanying drawings. In describing the embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include a system for capturing proppant dust particles. In certain embodiments, a dust collection assembly is arranged proximate and at least partially coupled to a proppant delivery assembly. The proppant delivery assembly includes a cradle that receives one or more containers in a side-by-side configuration. The containers contain fracking proppant that is dispensed through an opening at a bottom of each respective container. For example, actuators positioned below a top surface of the cradle can engage a gate 114 covering the opening to enable the proppant to flow out of the one or more containers and onto a proppant mover. In certain embodiments, the proppant mover is an endless conveyor that carries the proppant along a length of the cradle and away from the one or more containers. The proppant mover directs the proppant to a chute arranged at a distal end of the cradle. The chute includes an inclined surface that directs the proppant into a blender hopper. In certain embodiments, the chute is directable to enable fracking site operations personnel to direct an outlet of the chute toward a desired location.

In certain embodiments, the dust collection assembly includes a hood assembly arranged around the outlet of the chute to capture and remove dust particles generated by the movement and settling of the proppant. At least a portion of the hood assembly surrounds the outlet of the chute, thereby being positioned proximate to the location where dust particles are likely to form. In certain embodiments, the hood assembly includes one or more dust receptacles that receive the dust captured by the hood assembly. For example, the hood assembly is coupled to an air mover via conduit. That is, tubes, manifolds, and the like couple the air mover to the hood assembly to transmit a suction pressure generated by the air mover to the hood assembly. The suction pressure draws an air flow from a flow path positioned proximate the blender hopper. Accordingly, the dust particles captured in the air flow are drawn away from the blender hopper and moved toward the air mover. In certain embodiments, the suction force generated by the air mover at the hood assembly is sufficient to capture the dust particles and also designed to reduce the likelihood of lifting the proppant out of the blender hopper. That is, the suction force is particularly selected to minimize the risk of removing proppant from the blender hopper. In this manner, dust particles are removed from the blender hopper to reduce the risk of exposure to fracking operations site personnel.

FIG. 1 is a front perspective view of an embodiment of a proppant delivery assembly 10 and a dust collection assembly 12 positioned at a well site 14. In the illustrated embodiment, the proppant delivery assembly 12 includes a cradle 16 that supports proppant containers 18. As shown, the containers 18 are arranged in a side-by-side configuration along the cradle 16 and positioned proximate to fracking operation equipment, for example, a blender hopper 20. In certain embodiments, the cradle 16 includes a proppant mover 22 that directs the proppant away from the containers 18 after the proppant 18 is dispensed from the containers 18. In embodiments where, for example, the proppant mover 22 is a conveyor, the proppant travels along the cradle 16 to a chute 24 that directs the proppant into the blender hopper 20. However, it should be appreciated that in other embodiments the proppant mover 22 may be a chute, a sloped surface, a screw auger, or the like. Furthermore, the proppant mover 22 may direct the proppant away from the containers 18 without moving along the cradle 16. For example, the proppant mover 22 can be a screw auger that directs the proppant to a side of the cradle 16. At the blender hopper 20, the proppant can be mixed with fracking fluid (e.g., water, chemicals, etc.) for injection into a wellbore 26.

The containers 18 in the illustrated embodiment are substantially sealed, self-contained, and modular to enable transportation and storage of the proppant while minimizing the risk of exposure of the proppant and/or dust particles formed from the proppant. Furthermore, substantially sealed containers 18 can isolate the proppant from the environment, thereby reducing the risk of water or contaminants from mixing with the proppant. For example, the containers 18 may be delivered to the well site 14 filled with proppant, stacked into a vertical configuration until the proppant is ready for use, and then arranged on the cradle 16 in the illustrated side-by-side configuration. Once on the cradle 16, the proppant containers 18 may be opened such that the proppant flows out of a bottom of the containers 18 and onto the proppant mover 22. As will be described below, in certain embodiments the proppant mover 22 can be an endless conveyor that receives the proppant on a surface and directs the proppant away from the containers 18. However, in other embodiments, the proppant mover 22 may be a screw auger, sloped ramp, or the like to facilitate movement of the proppant from one location to another. In this manner, proppant can be moved from the containers 18 to the blender hopper 20.

The dust collection assembly 12 is positioned proximate the proppant delivery assembly 10, in the illustrated embodiment. Positioning the dust collection assembly 12 close by the proppant delivery assembly 10 not only reduces the footprint of the overall system at the well site 14, but also reduces the quantity of conduit connecting the dust collection assembly 12 to the proppant delivery assembly 10. As will be described in detail below, the dust collection assembly 12 includes an air mover 28 that draws a vacuum at a desired location where the proppant is being loaded into the blender hopper 20. That is, the air mover 28 generates a suction pressure proximate the blender hopper 20 to remove dust particles in a volume of air. Accordingly, the dust particles that are formed due to the movement and settling of the proppant will be captured by an air flow generated by the air mover 28. For example, in the illustrated embodiment, the desired location is the blender hopper 20. As proppant is moved from the containers 16 to the blender hopper 20 (e.g., via the proppant mover 22), dust particles may separate from the proppant and enter the air. These dust particles may infiltrate mechanical equipment, thereby reducing reliability or increasing maintenance intervals. Or, in certain cases, the dust particles may be inhaled by fracking operation site personnel at the well site 14. By utilizing the dust collection assembly 12, the dust particles can be captured and removed from the blender hopper 20, thereby reducing the risk of exposure to both workers and equipment.

Figure 2:
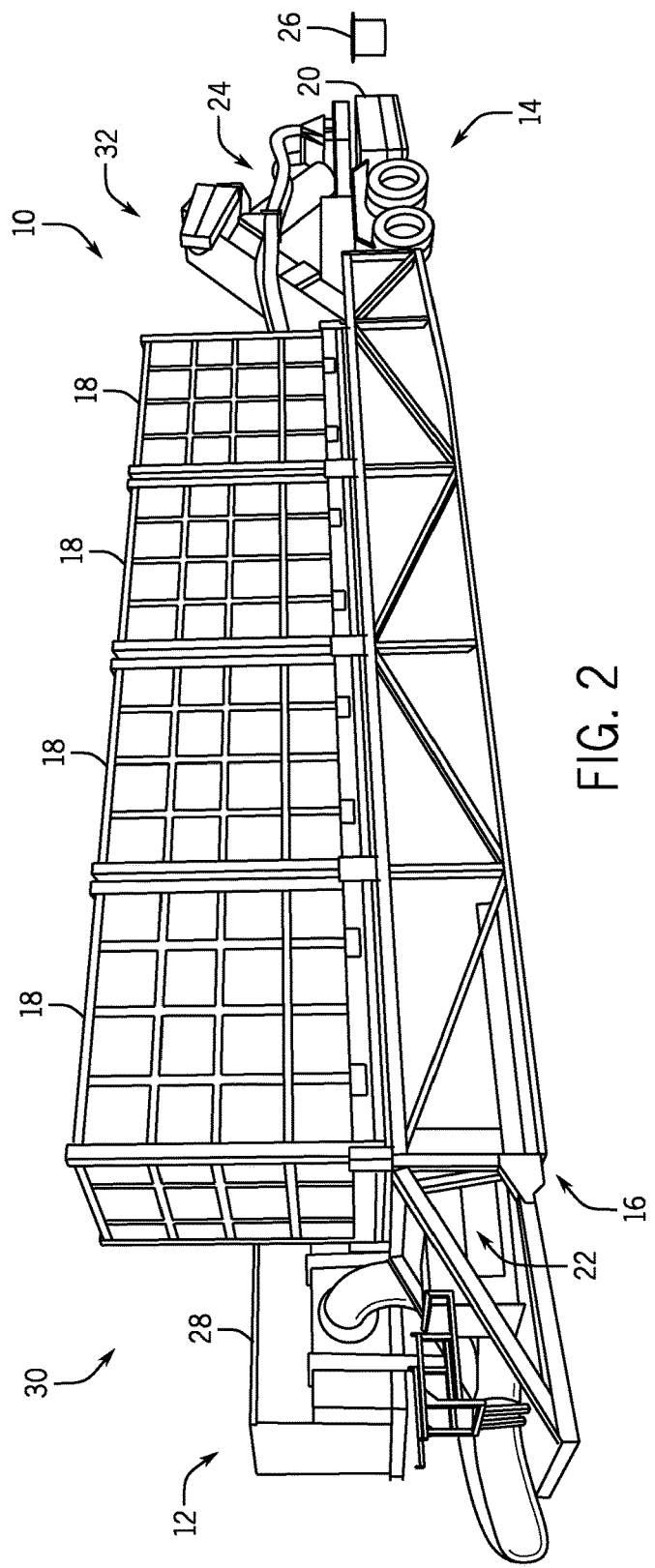
FIG. 2 is a rear perspective view of a proppant delivery system having a dust collection assembly of FIG. 1 according to an embodiment of the present invention.

FIG. 2 is a back perspective view of the dust collection assembly 12 arranged proximate the proppant delivery assembly 10. As shown, the dust collection assembly 12 is arranged on a back side of the proppant delivery assembly 10 to keep at least one side of the cradle 16 free from obstructions. In this manner, the containers 18 can be loaded and unloaded from the cradle 16 via a forklift. For example, the containers 18 may be stacked at the well site 14 in a vertical configuration until such time as they are ready for use. The forklift may lift the containers 18 from the stacked configuration and carry the containers 18 to the cradle 16 for alignment and deposition on a top surface of the cradle 16 to facilitate dispensing of the proppant from the containers 18. Because one side of the cradle 16 is free from obstructions, the forklift may continuously add and remove containers 18 from the cradle 16, thereby enabling ongoing fracking operations as containers 18 are emptied of the proppant. In certain embodiments, the containers 18 are emptied onto the proppant mover 22 to facilitate movement of the proppant to the blender hopper 20. Moreover, the dust collection assembly 12 may be worked on (e.g., routine maintenance, installation, optimization, etc.) while the containers 18 are positioned on the cradle 16 because the dust collection assembly 12 is separated from the movement area of the forklifts by the cradle 16. In this manner, the dust collection assembly 12 may be installed and placed into commission at the same time that the containers 18 are installed on the cradle 16, thereby improving efficiencies at the well site 14 and potentially reducing the duration of set up at the well site 14.

In the illustrated embodiment, the air mover 28 is positioned near a rear end 30 or proximal end of the cradle 16, away from the chute 24 arranged at a distal end 32 of the cradle 16. Accordingly, workers at the well site 14 can maintain a distance from the vacuum suction, generated by the air mover 28, at the blender hopper 20 and/or chute 24 when working on or near the air mover 28. As such, the risk of exposure to the dust particles is further decreased. As will be described below, the dust collection assembly 12 is designed to substantially integrate with the proppant delivery assembly to minimize the equipment's footprint at the well site 14 and to reduce the amount of additional equipment utilized by the dust collection assembly 12.

Figure 3:
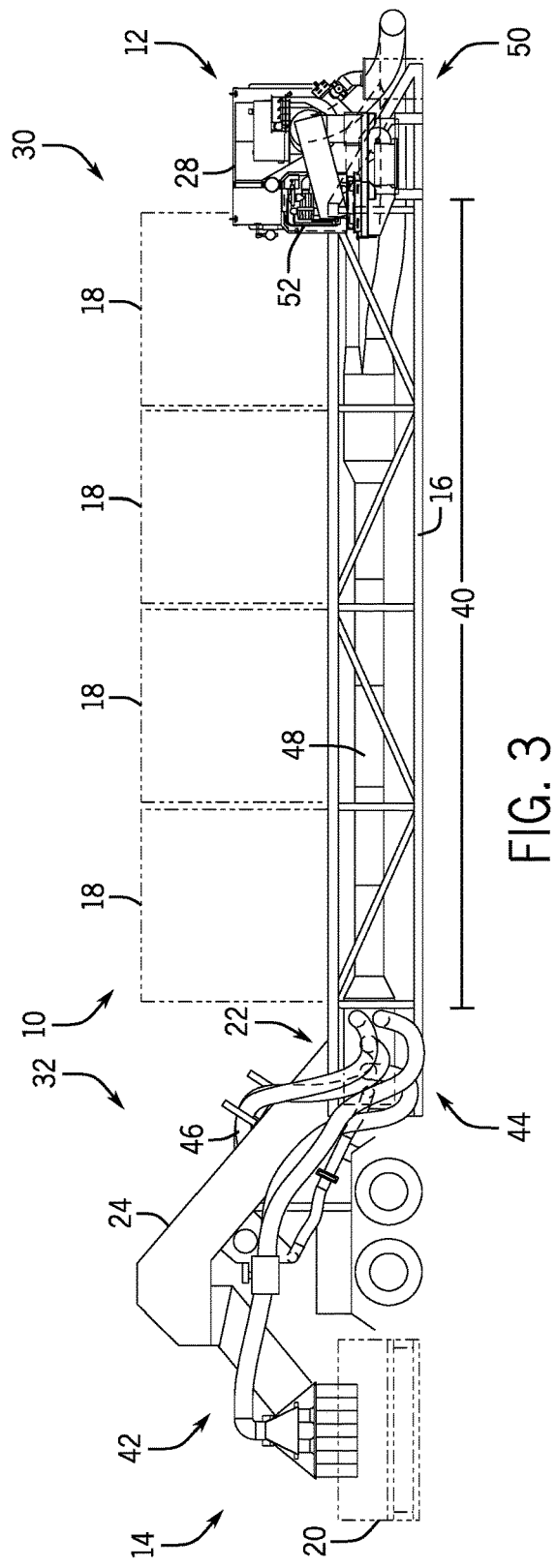
FIG. 3 is a front elevation view of a proppant delivery system having a dust collection assembly of FIG. 1 according to an embodiment of the present invention.

FIG. 3 is a front elevation view of an embodiment of the dust collection assembly 12 arranged in front of (e.g., relative to the plane of the page) and proximate the proppant delivery assembly 10. As described above, the dust collection assembly 12 is arranged proximate the proppant delivery assembly 10 to remove dust particles that are produced at a desired location of proppant dispersion. Moreover, by closely positioning the dust collection assembly 12 to the proppant delivery assembly 10, the overall footprint may be reduced at the well site 14. In the illustrated embodiment, the containers 18 (shown in phantom for clarity) are arranged in a side-by-side configuration along a length 40 of the cradle 16. The configuration of the containers 18 enables one container 18 to be removed from the cradle 16 while the other containers 18 are unloading proppant onto the proppant mover 22. In this manner, proppant may be continuously supplied to the blender hopper 20, even when one of the containers 18 is empty and being changed out for a full container 18.

In the illustrated embodiment, the dust collection assembly 12 includes a hood assembly 42 positioned above and overlying the blender hopper 20 to capture and remove dust particles formed near the blender hopper 20. The hood assembly is fluidly coupled to the air mover 28 via conduit 44. In the illustrated embodiment, the conduit 44 includes multiple tubes 46 extending from the hood assembly 42 to a manifold 48 extending along the cradle length 40. For example, the tubes 46 can be formed from flexible tubing (e.g., polymer tubing, metal tubing, etc.) to enable a variety of routing configurations between the manifold 48 and the hood assembly 42, thereby increasing flexibility of routing to accommodate design conditions at the well site 14. Moreover, it is appreciated that the manifold 48 may be any diameter and include one or more connections to accommodate any diameter tubes 46 based on design conditions.

The manifold 48 is coupled to each tube 46 to fluidly couple the hood assembly 42 to the air mover 28. As a result, the vacuum force generated by the air mover 28 forms an air flow that removes air from a flow path overlying the blender hopper 20 and directs the air toward the air mover 28 via the conduit 44. In this manner, dust particles in the air removed by the air mover 28 may be captured at the air mover 28 for later storage and/or disposal. As shown, the manifold 48 is supported by the cradle 16. However, it should be appreciated that in other embodiments the manifold 48 may not be coupled to the cradle 16. For example, the manifold 48 may be supported by a series of pipe supports positioned beside the cradle 16. In the illustrated embodiment, incorporating the manifold 48 into the cradle 16 further reduces the footprint of the proppant delivery assembly 10 and the dust collection assembly 12 at the well site 14. Moreover, positioning the manifold 48 below the cradle 16 enables operators to access both sides of the containers 18, thereby improving access to the containers 18 for inspection and/or positioning on the cradle 16.

The tubes 46 extending from the manifold 48 are supported at least in part by the chute 24. For example, the tubes 46 can be routed around and supported by a top surface of the chute 24. Moreover, as will be describe below, a body of the chute 24 may include pipe supports that provide support to the tubes 46 coupling the hood assembly 42 to the manifold 48. In this manner, the conduit 44 of the dust collection assembly 12 can be substantially incorporated with the proppant delivery assembly 10 to reduce the overall footprint of the system.

As described above, the air mover 28 generates a vacuum force proximate the blender hopper 20, in the illustrated embodiment. The vacuum force removes at least a portion of the air surrounding the blender hopper 20 in the air flow, thereby removing the dust particles in the flow path via the movement and settling of proppant. In the illustrated embodiment, the air mover 28 is positioned on a skid 50 at the rear end 30 of the cradle 16. The skid 50 enables the air mover 28 to be readily moved between well sites along with the proppant delivery assembly 10, thereby reducing downtown between operations at the well sites 14. The illustrated skid 50 also includes an engine 52 to provide power to the air mover 28. For example, the engine 52 may be a combustion engine, an electric engine, a steam engine, or the like to supply power to the air mover 28 sufficient to generate the suction vacuum force at the blender hopper 20. By providing an independent power system from the cradle 16, the air mover 28 may continue to remove air from proximate the blender hopper 20 even when the proppant delivery assembly 10 is not in operation.

Figure 4:
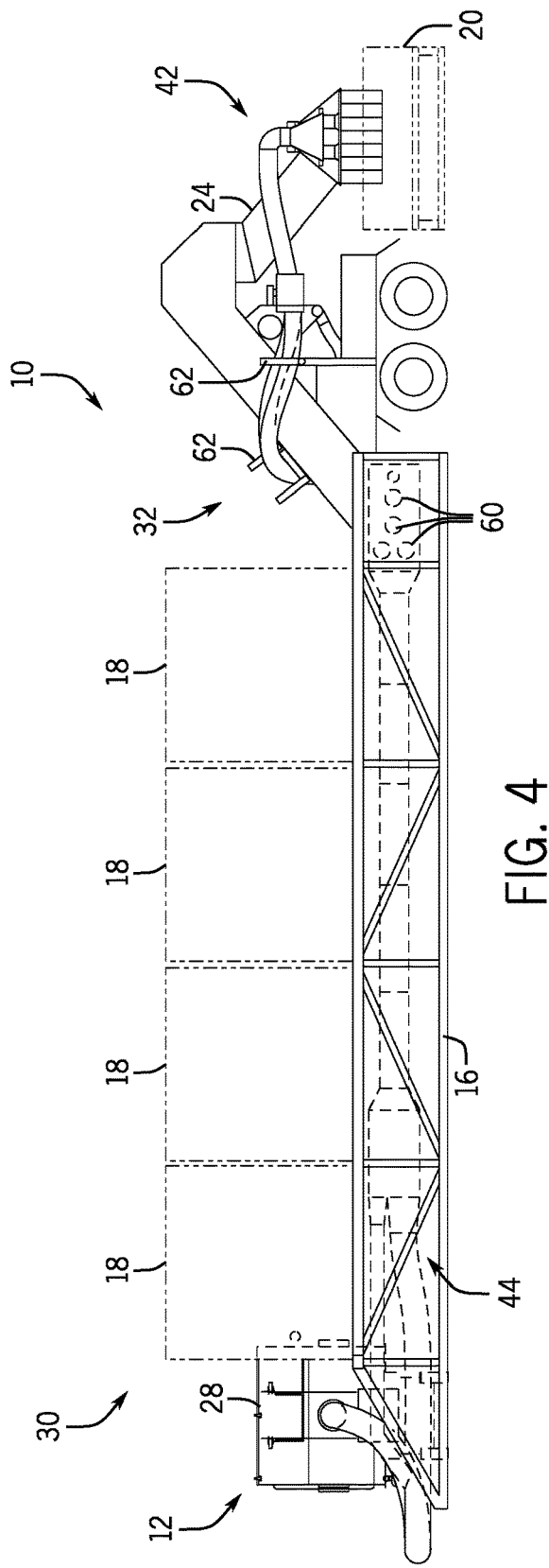
FIG. 4 is a rear elevation view of a proppant delivery system having a the dust collection assembly of FIG. 1 according to an embodiment of the present invention.

FIG. 4 is a rear elevation view of the proppant delivery system 10 having the dust collection assembly 12 positioned proximate the rear end 30 of the cradle 16. Similarly to FIG. 3, the containers 18 arranged in a side-by-side configuration along the cradle 16 are shown in phantom for clarity. Moreover, in the illustrated embodiment, the manifold 48 is shown in phantom for clarity. As shown, the air mover 28 is arranged closer to the rear end 30 of the cradle 16 than the container 18 positioned proximate the rear end 30 of the cradle 16. As a result, the containers 18 can be accessed from both sides of the cradle 16, thereby improving access for maintenance, inspection, and the like.

In the illustrated embodiment, the manifold 48 is shown with connections 60 arranged substantially linearly and proximate the distal end 32 of the cradle 16. The connections 60 enable the tubes 46 to couple to the manifold 48, and thereby provide a flow path for the air having the dust particles to travel away from the blender hopper 20, through the manifold 48, and to the air mover 28. It should be appreciated that the connections 60 may be positioned along any portion of the manifold 48 and in any reasonable configuration to enable the tubes 46 to couple to the manifold 48. For example, in the illustrated embodiment the connections 60 are positioned facing the plane of the page. However, in other embodiments, the connections 60 may be positioned at any circumferential position around the manifold 48 to enable quick and easy connections between components of the dust collection assembly 12.

Moreover, the illustrated embodiment includes conduit supports 62 coupled to a shroud arranged upstream of the chute 24. The conduit supports 62 support the conduit 44 (e.g., the tubes 46) extending from the manifold 48 to the hood assembly 42. As will be appreciated, the conduit supports 62 support the conduit 44 to block movement and maintain an open flow path along the conduit 44. For example, in embodiments where the tubes 46 are flexible lengths of pipe, the conduit supports 62 can block impingement along the conduits 44, thereby facilitating an open flow path between the air mover 28 and the hood assembly 42.

Figure 5:
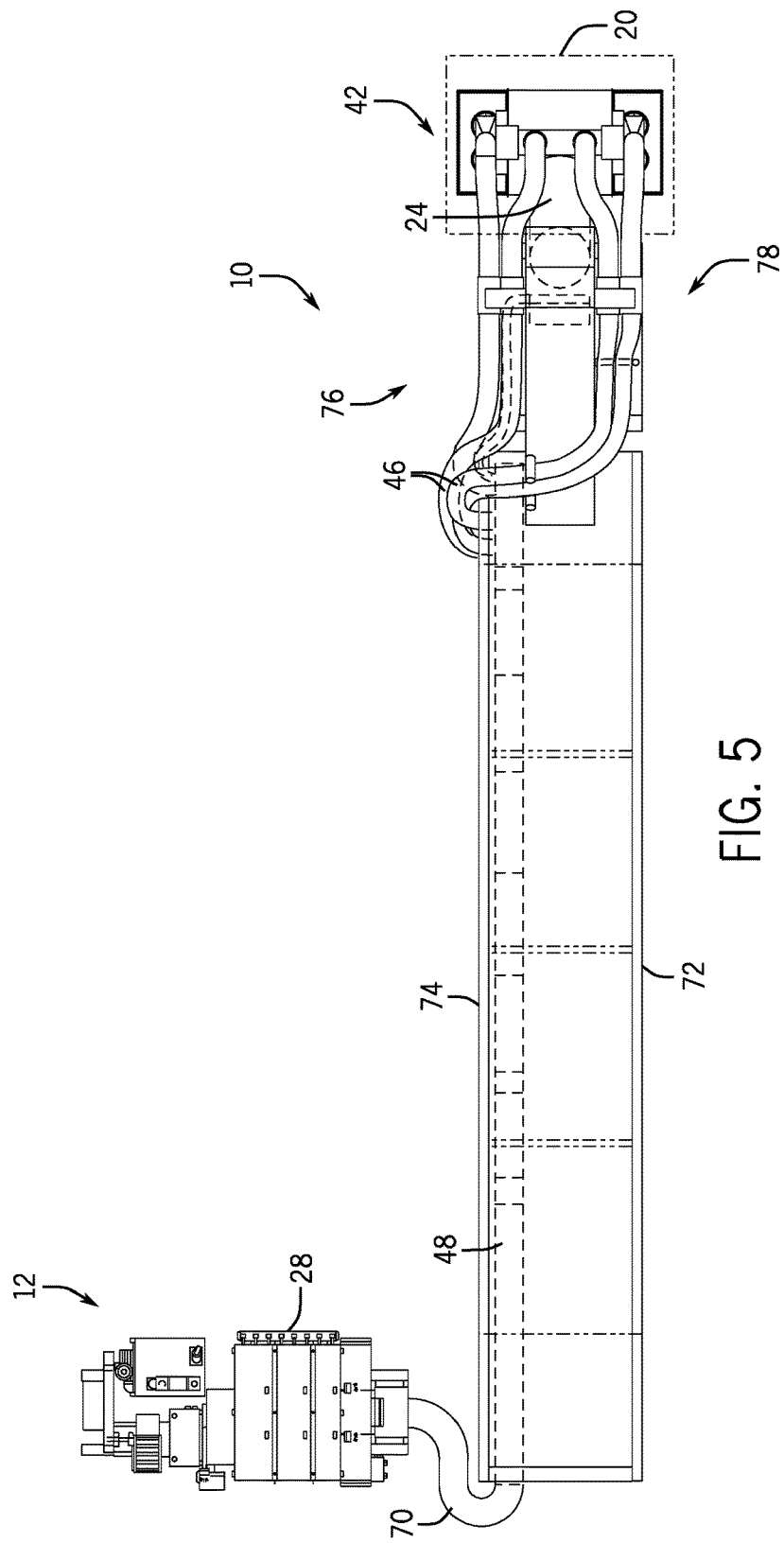
FIG. 5 is a top plan view of a proppant delivery system having a the dust collection assembly of FIG. 1 according to an embodiment of the present invention.

FIG. 5 is a top plan view of an embodiment of the proppant delivery system 10 and the dust collection assembly 12. It is appreciated that several components are shown in phantom for clarity. In the illustrated embodiment, the conduit 44 couples the air mover 28 to the hood assembly 42. For example, tubing 70 couples to the air mover 28 to the manifold 48, which extends along the cradle length 40. At the distal end 32 of the cradle 16, the tubes 46 couple to the manifold 48 and to the hood assembly 42, thereby forming a flow path between the air mover 28 and the hood assembly 42. In the illustrated embodiment, the manifold 48 is positioned beneath the cradle 16. That is, the manifold 48 is positioned within a front beam 72 and a rear beam 74 of the cradle 16. As a result, the manifold 48 is away from a walking area around the cradle 16, thereby enabling access to the containers 18 and decreasing the amount of equipment at ground level at the well site 14.

In FIG. 5, the tubes 46 are arranged such that a pair of tubes extends along a rear side 76 of the chute 24 and a pair of tubes extends over the cradle and to a front side 78 of the chute 24. However, it should be appreciated that in other embodiments different configurations of the tubes 46 may be utilized to form the flow path between the hood assembly 42 and the air mover 28.

Figure 6:
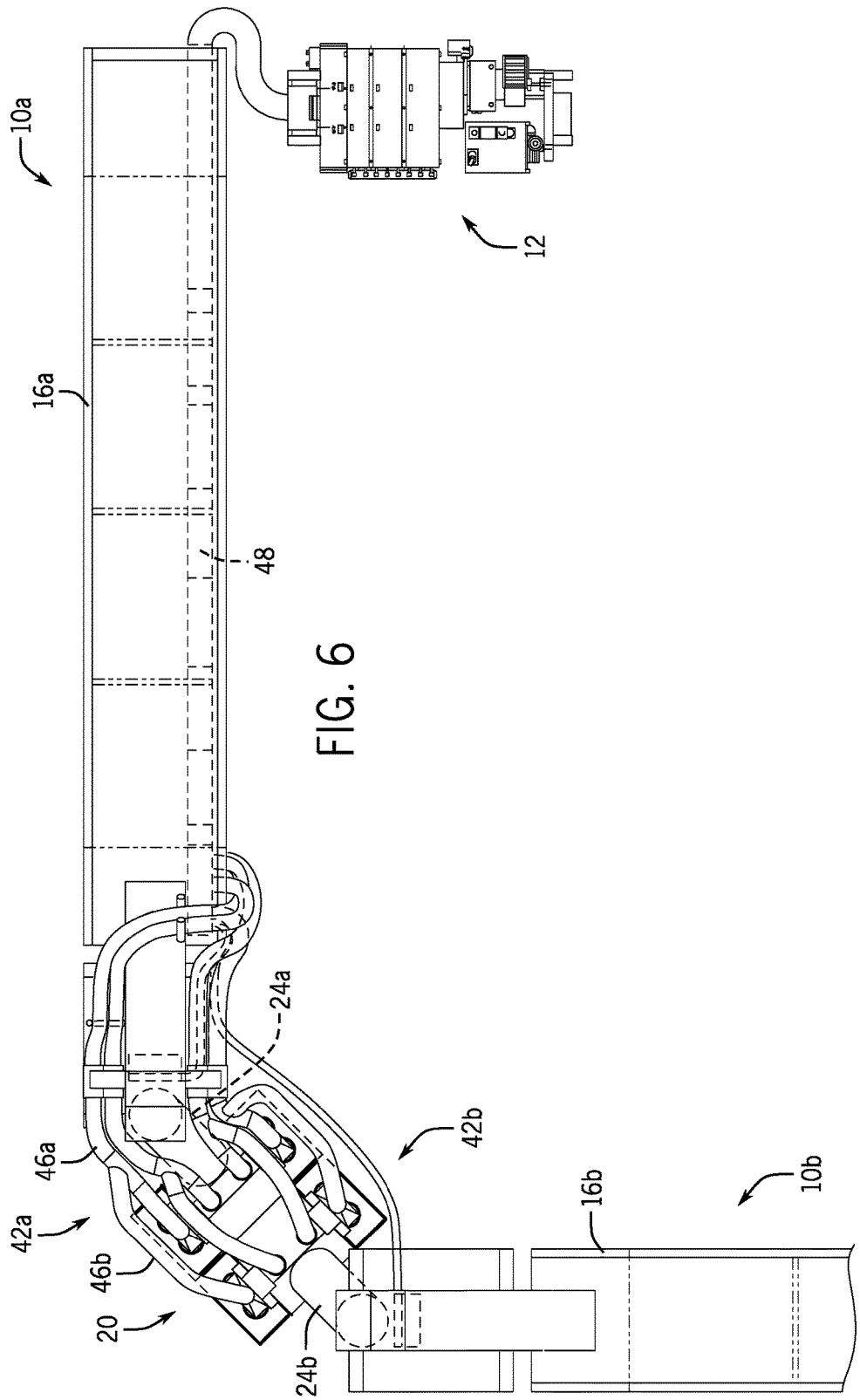
FIG. 6 is a top plan view of an embodiment of a dust collection assembly supporting two proppant delivery systems according to another embodiment of the present invention.

FIG. 6 is a top plan view of an embodiment of the dust collection assembly 12 supporting two proppant delivery systems 10a, 10b according to another embodiment of the present invention. In certain embodiments, multiple proppant delivery assemblies 10 can be utilized to deliver proppant to a single blender hopper 20. For example, as illustrated, each of the proppant delivery systems 10a, 10b may utilize the air mover 28 to draw air away from the blender hopper 20 via respective hood assemblies 42a, 42b.

In the illustrated embodiment, the manifold 48 is positioned below the cradle 16a of the proppant delivery assembly 10a. This manifold 48 is particularly selected such that the size of the manifold 48 can accommodate the air flow from both hood assemblies 42a, 42b. As a result, the cradle 16b of the proppant delivery assembly 10b does not have a manifold arranged below the cradle 16. Instead, the tubes 46b extending from the hood assembly 42b are arranged to couple to the tubes 46a. As a result, the dust particles removed via the hood assembly 48b are transported through the tubes 46b, into the tubes 42a, toward the manifold 48, and to the air mover 28 via the suction pressure generated by the air mover 28.

As shown in FIG. 6, each hood assembly 42a, 42b is coupled to the respective chute 24a, 24b to be positioned above the blender hopper 20 to remove dust particles formed from the movement and settling of fracking proppant being dispensed from the containers 18. In certain embodiments, the hood assemblies 42a, 42b are in contact with one another over the blender hopper 20. However, in other embodiments, the hood assemblies 42a, 42b are independently moveable via movement of the respective chutes 24a, 24b.

Figure 7:
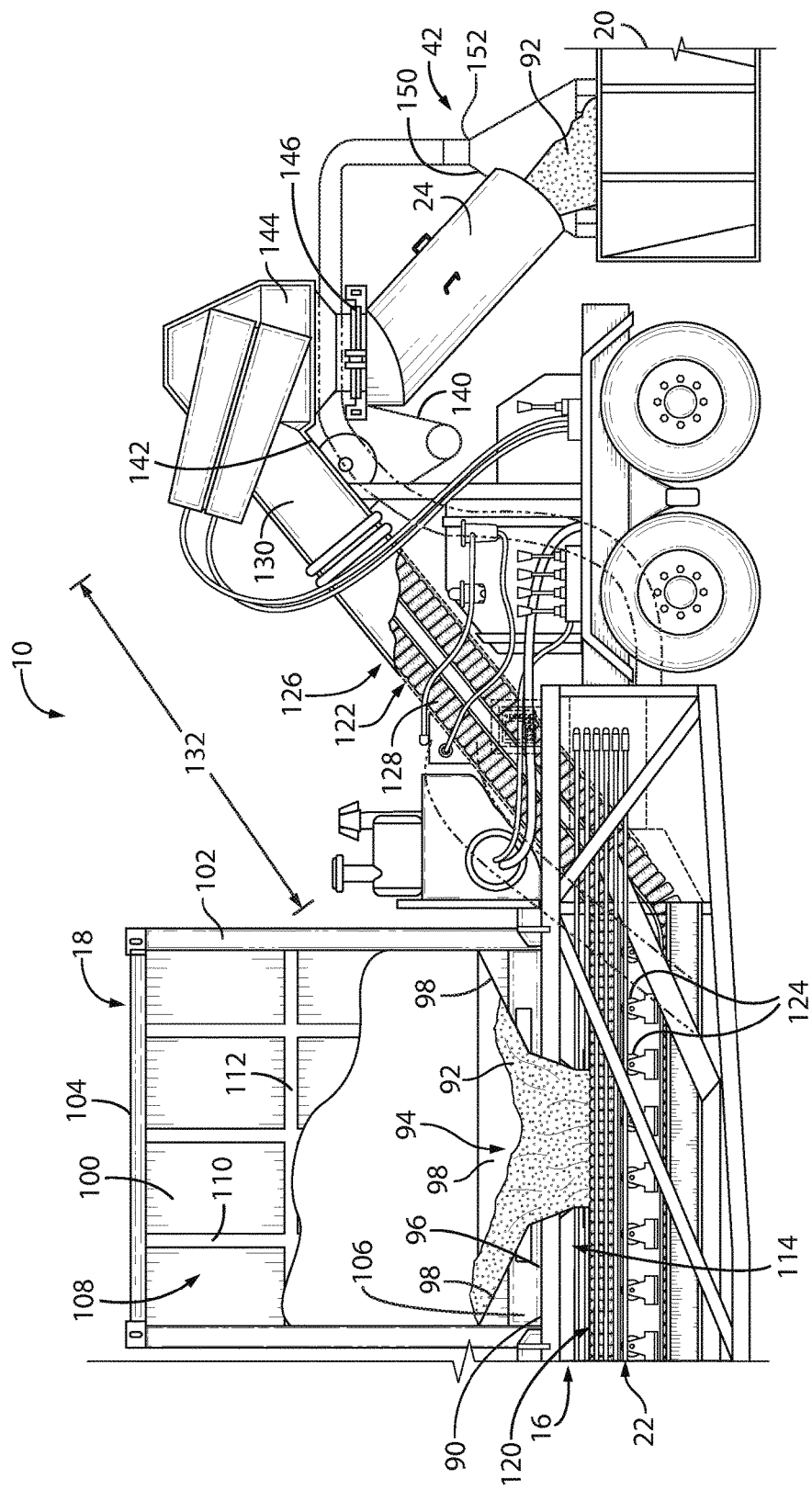
FIG. 7 is a partial perspective view of a proppant delivery system positioned to deliver proppant to a blender hopper according to an embodiment of the present invention.

FIG. 7 is a partial perspective view of the proppant delivery system 10 positioned to deliver proppant to the blender hopper 20 according to an embodiment of the present invention. As shown, portions of the cradle, 16, container 18, proppant mover 22, chute 24, and the hood assembly 42 have been cut away to clarify the discussion of the components of the system. As described above, the container 18 is positioned on a top surface 90 of the cradle 16. The top surface 90 positions the container 18 above the proppant mover 22 to receive the proppant 92 dispensed from the container 18 via an opening 94 at a bottom 96 of the container 18. The proppant 92 flows from the container 18 along inclined surfaces 98 and onto a surface of the proppant mover 22 for transportation to the blender hopper 20 via the chute 24.

In the illustrated embodiment, the container 10 is substantially box-shaped and has four walls 100 extending between corner posts 102 in the horizontal direction and a top post 104 and a bottom post 106 in the vertical direction. While FIG. 7 shows one wall 100 of the container 18, it is appreciated that the other walls 100 are substantially similar to the illustrated wall 100. The walls 100 include a cage-like structural support 108 having vertical support bars 110 and horizontal support bars 112 arranged in a lattice-type configuration to provide structural support to the walls 100 when filled with the proppant 92. Because proppant 92 is a highly-dense, granular material, little interstitial space remains between grains of the proppant 92 when the proppant 92 is loaded into the container 18. The structural support 108 provides strength and support to the walls 100 to stop bulging and/or deformation of the walls 100 when filled with proppant 92. As a result, the structural integrity of the container 18 is improved, thereby improving safety during transportation and also enabling reuse of the containers 18 when the proppant 92 is dispensed from the containers 18.

As illustrated, the proppant 92 flows out of the opening 94 along inclined surfaces 98. The angle of the inclined surfaces 92 is particularly selected to enhance the emptying of the container 18. For example, in the illustrated embodiment, the inclined surfaces 98 are positioned approximately 30 degrees to 45 degrees relative to the bottom 96. However, in other embodiments, the inclined surfaces 98 may be any angle relative to the bottom 96 to enhance emptying of the container 18 through the opening 94.

In certain embodiments, the container 10 includes a gate 114 arranged at the bottom 96 and positioned to block or enable flow through the opening 94. The gate 114 is configured to couple to an actuator (e.g., hydraulic, electric, pneumatic) to drive movement of the gate 114 between an open position and a closed position. As will be described in detail below, the orientation of the gate 114 when coupled to the actuators may be utilized to properly align the containers 18 on the cradle 16. That is, the gate 114 may be arrange such that the gate 114 only aligns with the actuator when the container 18 is placed on the cradle 16 in a desirable configuration.

The proppant 92 flows out of the container 18 along the inclined surfaces 98 through the opening 94 and onto a proppant mover top surface 120. The proppant mover top surface 120 receives and supports the proppant 92 as the proppant mover 22 takes the proppant 92 away from the container 18 and toward the blender hopper 20. In the illustrated embodiment, the proppant mover 22 is a conveyor 122 (e.g., an endless conveyor) extending beyond the length 40 of the cradle 16 and arranged on one or more rollers 124 that underlies the top surface 90 of the cradle 16. The conveyor 122 carries the proppant 92 away from the containers 18 along an inclined section 126 to empty into the chute 24. That is, the conveyor 122 turns over to direct the proppant 92 off of the conveyor 122 and into the chute 24. In other words, the conveyor 122 flips over at the chute 24 such that the surface traveling along the top of the rollers closest to the containers 18 becomes the surface traveling along the bottom of the rollers closest to the ground plane. In the illustrated embodiment, the inclined section 126 extends above the top surface 90 of the cradle 16. As shown, the conveyor 122 includes one or more projections 128 extending upward from the top surface 120. For example, the projections 128 can include walls, nubs, ridges, or the like to facilitate receiving and supporting the proppant 92 as the proppant 92 contacts the conveyor 122 after it is dispensed from the containers 18.

In the illustrated embodiment, the inclined section 126 is covered by a shroud 130 that extends along a length 132 of the inclined section 126. The shroud 130 blocks dust particles formed due to the movement of the proppant 92 from entering the air, thereby potentially being inhaled by workers or entering and damaging auxiliary equipment. As will be described in detail below, a catch box 140 is coupled to a bottom surface 142 of the shroud 130 and arranged downstream of the chute 24, relative to the movement of the proppant mover 22. The catch box 140 is fluidly coupled to the inclined section 126 via an opening in the bottom surface 142 forming a flow path between the shroud 130 and the catch box 140. As the conveyor 122 turns over to empty the proppant 92 into the chute 24, proppant 92 and/or dust particles remaining on the conveyor 122 enter the catch box 140, thereby further capturing dust particles and proppant 92 to prevent inhalation by workers and/or damage to auxiliary equipment.

The chute 24 is coupled to the shroud 130 via a proppant chamber 144 positioned between the shroud 130 and the chute 24. The proppant chamber 144 receives and directs the proppant 92 toward the chute 24. Moreover, the proppant chamber 144 further serves to block dust particles from entering the air due to the enclosed nature of the proppant chamber 144. As a result, dust particles formed in the proppant chamber 144 will settle onto the chute 24, where the dust particles can be captured by the dust collection assembly 12. The chute 24 is pivotally coupled to the proppant chamber 144 at an attachment plane 146. As a result, the chute 24 is directable because the chute 24 can revolve about the attachment plane 146 (e.g., about an axis extending through and perpendicular to the attachment plane 146) to adjust the location in the blender hopper 20 where the proppant 92 is directed.

In the illustrated embodiment, the chute 24 is coupled to the hood assembly 42 along a back wall 150 of the hood assembly 42. Accordingly, the proppant 92 flows out of the chute 24 and through the hood assembly 42 to enter the blender hopper 20. The tubes 46 extend from a top 152 of the hood assembly 42 to capture the dust particles formed by the proppant 92 flowing into the blender hopper 20 and to remove a volume of air containing the dust particles.

Figure 8:
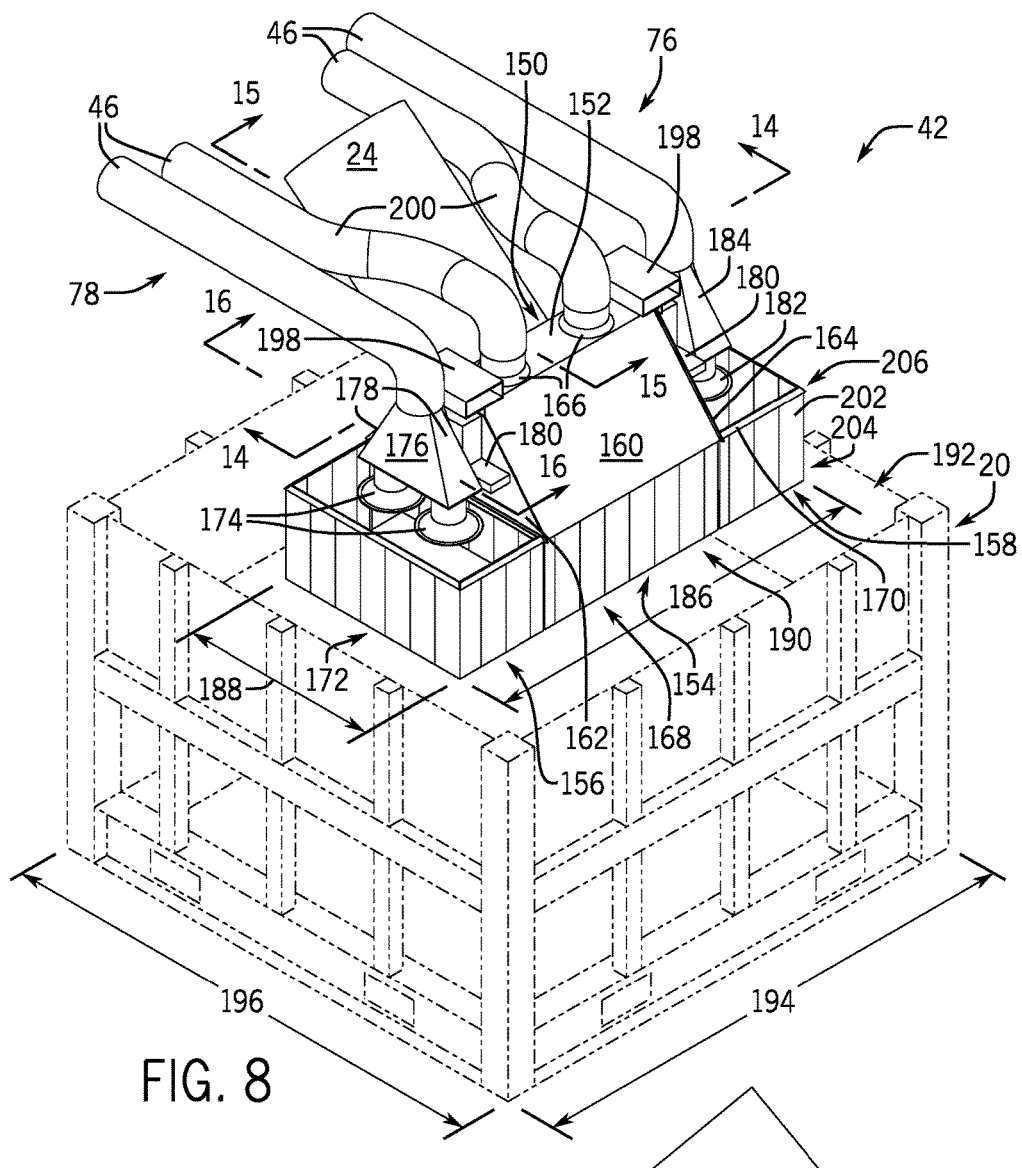
FIG. 8 is a perspective view of a hood assembly of a dust collection assembly of FIG. 1 positioned in association with a blender hopper according to an embodiment of the present invention.

FIG. 8 is a perspective view of the hood assembly 42 of the dust collection assembly 12 positioned in association with the blender hopper 20 according to an embodiment of the present invention. As described above, the hood assembly 42 overlays the blender hopper 20 and is positioned about an outlet of the chute 24 to capture dust particles formed by the movement and settling of the proppant 92. In the illustrated embodiment, the hood assembly 42 includes a first hood section 154, a second hood section 156, and a third hood section 158. The first hood section 154 is a substantially enclosed area formed by the back wall 150, a front wall 160, and sidewalls 162, 164 that substantially surrounds the chute 24 outlet. The chute 24 is coupled to the back wall 150 and the proppant 92 flows into the enclosed area formed by the first hood section 154 as the proppant 92 flows toward the blender hopper 20. The top 152 includes a pair of dust receptacles 166 coupled to tubes 46 to direct the dust particles away from the blender hopper 20 and toward the air mover 28 via the suction pressure generated by the air mover 28. While the illustrated embodiment includes two dust receptacles 166, in other embodiments there can be 1, 3, 4, 5, or any suitable number of dust receptacles extending from the top 152 of the first hood section 154. The first hood section 154 is arranged to capture dust particles from at least a first volume 168 at least partially defined by the back wall 150, the first wall 150, the sidewalls 162, 164, and a bottom plane 170 (e.g., planar bottom surface) of the hood assembly 42.

In the illustrated embodiment, the second hood section 156 is positioned adjacent to the first hood section 154 and proximate the blender hopper 20. As shown, the second hood section 156 is arranged to capture dust particles in a second volume 172 at least partially defined by the bottom plane 170 of the hood assembly 42 and a pair of dust receptacles 174. As shown, the dust receptacles 174 are coupled to a dust enclosure 176 extending upward toward the top 152 of the first hood section 154. The dust enclosure 176 includes sloped walls 178 extending upward and converging on the tube 46. In this manner, dust captured by the dust receptacles 174 is channeled upward through the dust enclosure 176 and into the tube 46. As shown, the area around the dust receptacles 174 is substantially open, thereby enabling inspection into the second volume 172. The second hood section 15 is coupled to the first hood section 154 via a support bracket 180. The support bracket 180 positions the second hood section 156 such that the dust receptacles 174 are substantially flush with the bottom plane 170. Accordingly, the second hood section 156 is positioned to capture dust particles that disperse out and away from the first hood section 154 and/or dust particles formed by the inclusion of the proppant 92 flowing out of the chute 24.

The third hood section 158 is positioned adjacent the first hood section 154 and substantially opposite the second hood section 156. That is, the second and third hood sections 156, 158 are substantially symmetrical about the first hood section 154. Accordingly, the third hood section 158 is arranged to capture dust particles that disperse out and away from the first hood section 154, in a similar manner to the second hood section 156. It should be appreciated that the first hood section 154 partially obscures the view of the third hood section 158 in the illustrated embodiment. However, as mentioned above, the second hood section 156 and the third hood section 158 are substantially symmetrical, therefore, the third hood section 158 includes dust receptacles 182 and a dust enclosure 184 arranged in the manner illustrated for the second hood section 156.

In the illustrated embodiment, the hood assembly 42 is smaller than the blender hopper 20. That is, a length 186 and a depth 188 defining a capture area 190 of the hood assembly 42 is smaller than a surface area 192 of the blender hopper 20 defined by a hopper length 194 and a hopper depth 196. Therefore, the hood assembly 42 can be moved around the blender hopper 20 to capture dust particles that are formed due to the settling and movement of the proppant 92. Moreover, the chute 24 can be moved to direct the proppant 92 to different areas of the blender hopper 20 to ensure even distributions in the blender hopper 20. Furthermore, while the illustrated embodiment depicts the hood assembly 42 has being smaller than the blender hopper 20, in other embodiments they may be substantially the same size or the hood assembly 42 may be larger than the blender hopper 20.

As described above, the chute 24 is coupled to the back wall 150 of the hood assembly 42. In certain embodiments, the slots 198 positioned on the top 152 are configured to receive forks of a forklift to enable lifting and movement of the hood assembly 42. Because the slots 198 are coupled to the top 152, movement via the slots 198 leads to movement of the entire hood assembly 42 because the second and third hood sections 156, 158 are coupled to the first hood section 154 via the support bracket 180. In this manner, the hood assembly 42 can be positioned on the chute 24 at the well site 14, thereby reducing the equipment coupled to the chute 24 during transportation between well sites 14. Moreover, the hood assembly 42 can be adapted to be used at other locations (e.g., such as transloading sites where the proppant 92 is loaded into the containers 18) because of the ease of removability via the slots 198.

FIG. 8 also illustrates an embodiment of the tubes 46 extending from the hood assembly 42 and toward the manifold 48. As shown, a pair of tubes 46 extends around the front side 78 of the chute 24 and a pair of tubes 46 extends around the rear side 76 of the chute 24. In this manner, the tubes 46 can be organized based on the location where the tubes 46 are coupled to the hood assembly 42. In the illustrated embodiment, the tubes 46 coupled to the first hood section 154 include bends 200 that conform to the chute 24. The bends 200 enable a smaller footprint for the system because the tubes 46 are positioned closer to the chute 24 than tubes without bends 200. As a result, the tubes 46 are more streamlined. Moreover, the tubes 46 are easier to install because the bends 200 provide an indication as to which tube 46 couples to which dust receptacle of the hood assembly 42. As a result, the duration to install the system may be reduced, thereby improving efficiencies at the well site 14.

In the illustrated embodiment, the hood assembly 42 includes a curtain 202 extending downwardly from the bottom plane 170 toward the blender hopper 20. The curtain 202 is formed from flexible sheets (e.g., plastic) to form at least a portion of the first volume 168, the second volume 170, and a third volume 204. It should be appreciated that in certain embodiments, the curtain 202 may be a single unit having no gaps. However, in other embodiments, the curtain 202 may include multiple strips or sections that are independently moveable from one other. The curtain 202 blocks the dust particles from dispersing out and away from the first, second, and third volumes 168, 170, 204, thereby enhancing the collection by the hood assembly 42. For example, in certain embodiments, the hood assembly 42 may be lowered into the blender hopper 20 such that the curtain 202 is in contact with the proppant 92 positioned within the blender hopper 20. In this manner, the dust particles will be contained within the first, second, and third volumes 168, 170, 204 as the proppant 92 flows from the chute 24 to the blender hopper 20. As shown in FIG. 8, the curtain 202 extends about a perimeter 206 of the capture area 190 to substantially enclose the dust particles within the first, second, and third volumes 168, 170, 204.

Figure 9:
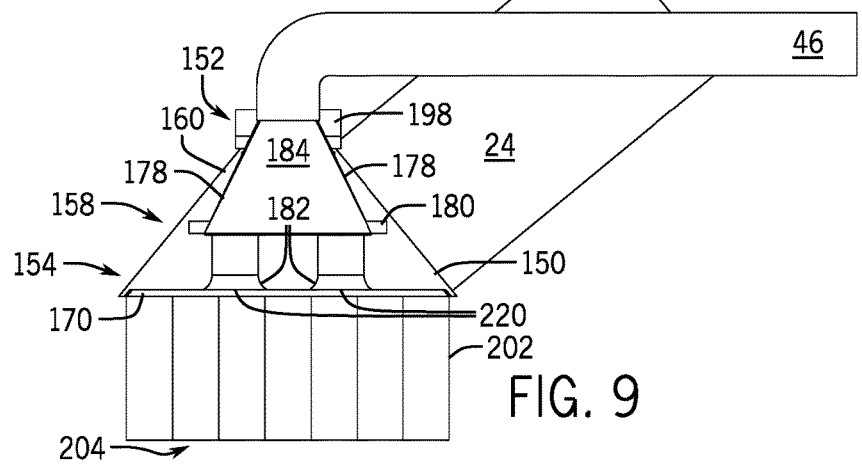
FIG. 9 is a side elevation view of a hood assembly of FIG. 8 according to an embodiment of the present invention.

FIG. 9 is a side elevation view of the hood assembly 42 according to an embodiment of the present invention. In the illustrated embodiment, the chute 24 is coupled to the angled back wall 150 to direct the proppant 92 flowing through the chute 24 through the hood assembly 42. As shown, the front wall 160 is angled and converges toward the back wall 150 at the top 152. In other words, the area at the top 152 of the first hood section 142 is smaller than the area at the bottom plane 170. Moreover, the dust enclosure 184 is formed by sloped walls 178 at converge toward the tube 46, thereby directing the collected dust particles out of the dust receptacles 182 and toward the air mover 28.

In the illustrated embodiment, the third hood section 158 includes the pair of dust receptacles 182 arranged in a spaced apart relationship. The dust receptacles 182 extend downwardly from the dust enclosure 184 to capture dust particles in the third volume 204. In the illustrated embodiment, the dust receptacles 182 are substantially cylindrical tubular members that have an enlarged opening 220 positioned at a bottom thereof. In other words, the cross-sectional area of the dust receptacles 182 decreases from the opening 220 upward to the dust enclosure 184. By decreasing the cross-sectional area, the force enacted on the dust particles is increased and thereby improves the capture of the dust particles present in the third volume 204. Moreover, while the illustrated embodiment includes a reduced diameter on the dust receptacles 182, in other embodiments the diameter may increase or remain substantially constant.

Figure 10:
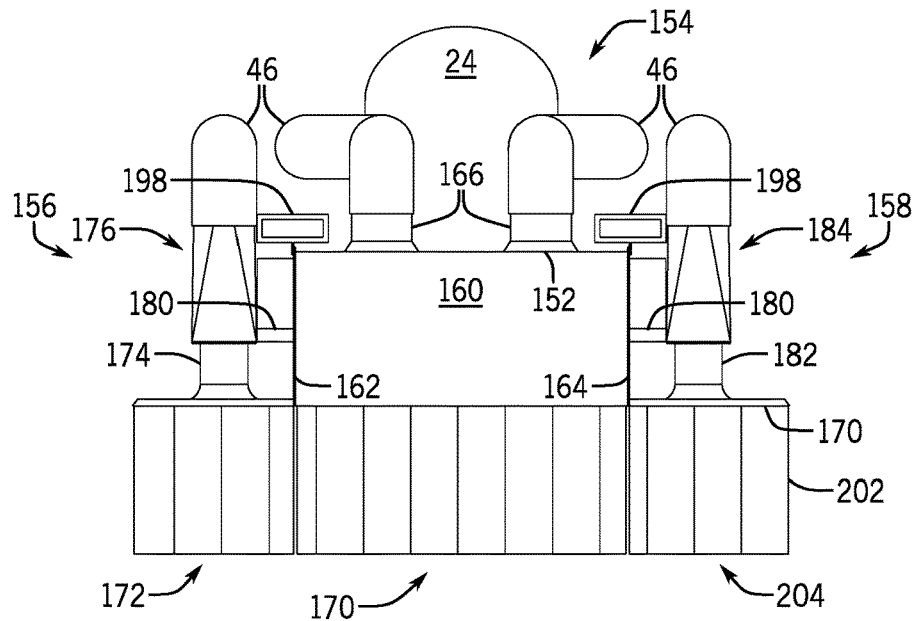
FIG. 10 is a front elevation view of a hood assembly of FIG. 8 according to an embodiment of the present invention.

FIG. 10 is a front elevation view of the hood assembly 42 according to an embodiment of the present invention. As described above, the first hood section 154 is arranged between the second hood section 156 and the third section 158. Each section 154, 156, 158 is arranged to capture dust particles from a respective first, second, and third volume 168, 172, 204 to remove the dust particles from proximate the blender hopper 20. In the illustrated embodiment, the hood assembly 42 is substantially symmetrical about the first hood section 154. However, in other embodiments, the second and third volumes 156, 158 may have different configurations based on design conditions.

In the illustrated embodiment, the first hood section 154 is defined at least in part by the side walls 162, 164, the top 152, and the front wall 160. It should be noted that the back wall 150 also defines the first hood section 154, at least in part, but is not visible in the depicted view. In operation, the hood assembly 42 is lowered into the blender hopper 20 such that the curtain 202 is in contact with the proppant 92 in the blender hopper, or such that the curtain 202 is closely positioned to the proppant 92 in the blender hopper. As a result, the first volume 168 being acted on by the suction force through the dust receptacles 166 may be defined at least in part by the first hood section 154 and the curtain 202.

The second and third hood sections 156, 158 are positioned on opposite sides of the first hood section 154 to capture dust particles formed when the proppant 92 flows through the first hood section 154. As shown, each of the second and third hood sections 156, 158 includes dust receptacles 174, 182 and dust enclosures 176, 184, respectively. As suction pressure from the air mover draws a volume of air into each of the dust receptacles 174, 182, the volume of air is directed toward the respective dust enclosure 176, 184 and toward the tubes 46. In this manner, dust particles can be removed from the second and third volumes 172, 204.

Figure 11:
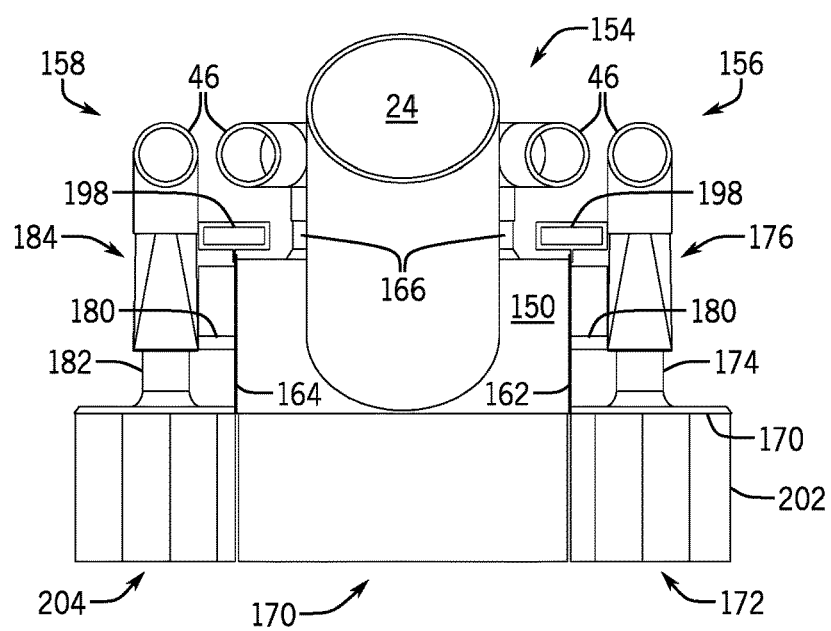
FIG. 11 is a rear elevation view of a hood assembly of FIG. 8 according to an embodiment of the present invention.

FIG. 11 is a rear elevation view of the hood assembly 42 according to an embodiment of the present invention. The chute 24 is coupled to the back wall 150 such that proppant 92 flowing through the chute 24 enters the first hood section 154. As shown, the chute 24 is substantially centered in the back wall 150 such that the proppant 92 exiting the chute 24 will be uniformly spread through the first hood section 154. Furthermore, as described above, the curtain 202 extends about the perimeter 206 as illustrated in FIG. 11. In this manner, the first, second, and third volumes 168, 172, 204 can be substantially sealed off, thereby improving the suction pressure generated by the air mover 28.

Figure 12:
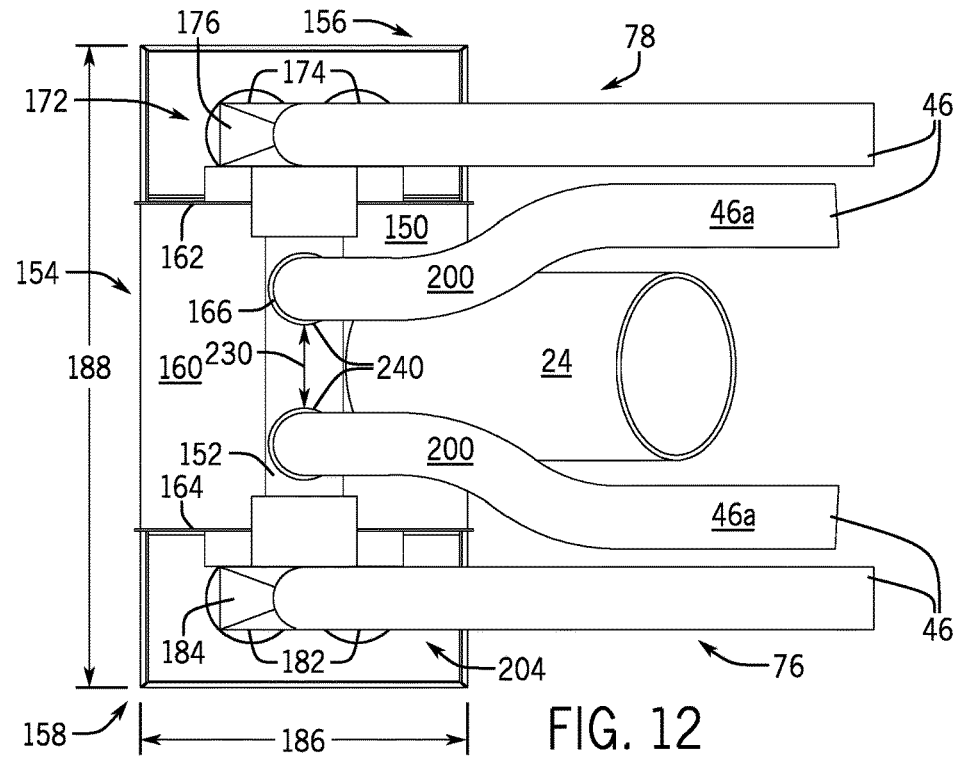
FIG. 12 is a top plan view of a hood assembly of FIG. 8 according to an embodiment of the present invention.

FIG. 12 is a top plan view of the hood assembly 42 and the routing of the tubes 46, according to an embodiment of the present invention. As described above, the hood assembly 42 is substantially symmetrical about the first hood section 154, in the illustrated embodiment. Accordingly, the dust particles may be captured uniformly in the blender hopper 20. The back wall 150 and front wall 160 converge at the top 152 where the dust receptacles 166 are coupled to the tubes 46 to direct the dust particles away from the hood assembly 42 and toward the air mover 28. The top 152 extends between the sidewalls 162, 164 to span across the first hood section 14. The dust receptacles 166 are arranged on the top 152 in a side-by-side spaced relationship such that a gap 230 extends between the dust receptacles 166. By spacing the dust receptacles 166 apart, the suction force of the air mover 28 is distributed over a larger portion of the first volume 168, thereby improving the capture of the dust particles.

The dust receptacles 174, 182 are arranged on the respective dust enclosures 176, 184 of the second and third hood sections 156, 158. As illustrated, the second and third hood sections 156, 158 each include a pair of dust receptacles 174, 182 arranged in a spaced relationship along the hood depth 188. In this manner, the suction pressure generated by the air mover 28 is distributed over the hood depth 188 of each of the second and third hood sections 156, 158 to facilitate capture and removal of the dust particles formed by the movement and settling of the proppant 92.

In the illustrated embodiment, the tube connections 240 are substantially aligned along the hood length 186. That is, the locations where the tubes 46 interact with the hood assembly 42 are substantially aligned and centered relative to the hood length 186 and the hood depth 188. As a result, the suction pressure generated by the air mover 28 is directed toward a central portion of the hood assembly 42. As described above, the first hood section 154 converges toward the top 152 and the dust enclosures 176, 184 also converge upward toward the tubes 46. Accordingly, the respective cross-sectional areas are reduced as the captured dust particles move upward toward the tubes 46, thereby increasing the force enacted on the dust particles by the suction pressure. In this manner, the dust particles are captured and removed from the area proximate the blender hopper 20, thereby decreasing the likelihood that the dust particles are inhaled by operations personnel or interact with auxiliary equipment.

The tubes 46 are routed in pairs around the front side 78 of the chute and the rear side 76 of the chute. As shown, the tubes are generally parallel until the bends 200 direct the inner tubes 46a toward the connections 240 on the first hood section 154. Routing the tubes 46 in pairs simplifies maintenance and inspection because an operator can quickly and easily identify which tubes 46 are coupled to which sections of the hood assembly 42. In this manner, the dust particles captured in the hood assembly 42 can be removed and carried toward the air mover 28 via the tubes 46.

Figure 13:
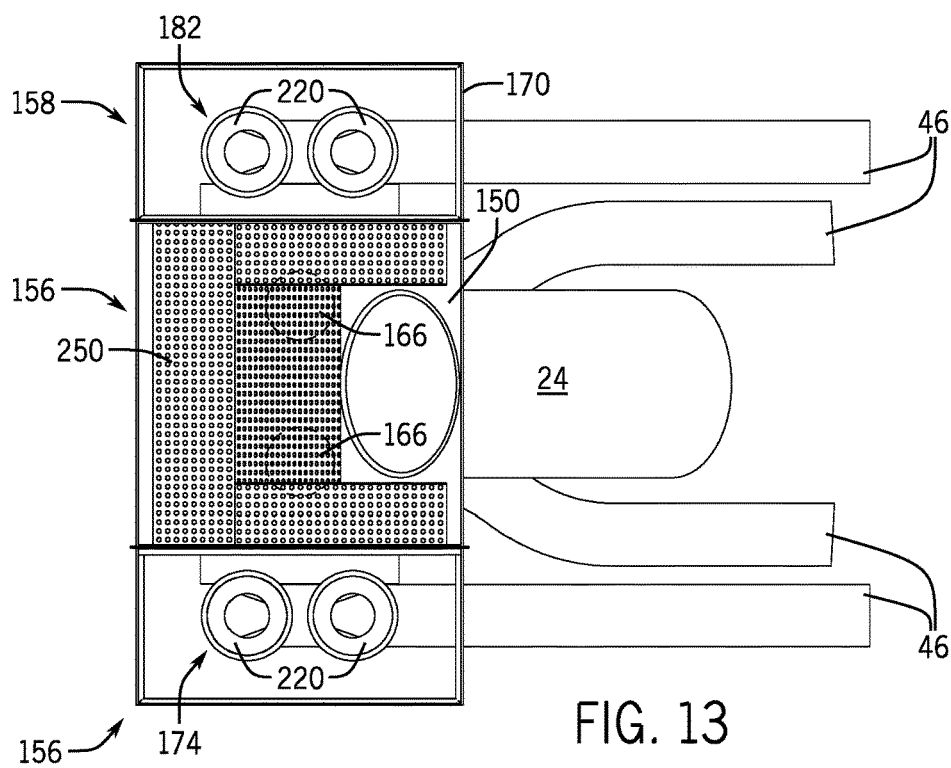
FIG. 13 is a bottom plan view of a hood assembly of FIG. 8 according to an embodiment of the present invention.

FIG. 13 is a bottom plan view of the hood assembly 42 according to an embodiment of the present invention. As shown, the chute 24 connections to the hood assembly 42 along the back wall 150, thereby directing proppant 92 flowing through the chute 24 through the first hood section 154 before being deposited into the blender hopper 20. In the illustrated embodiments, screens 250 are positioned within the first hood section 154. The screens 250 are positioned to block grains of proppant 92 from entering the dust receptacles 166. For example, in certain embodiments, the air mover 28 may be configured to operate at a suction pressure sufficient to lift grains of proppant 92 from the blender hopper 20. The screens 250 can be sized to block the grains of proppant 92 from entering the dust receptacles 166, thereby limiting the quantity of proppant 92 removed from the blender hopper 20. However, it should be appreciated that in certain embodiments the screens 250 may not be included in the hood assembly 42. For example, the air mover 28 may be operated at a suction pressure sufficient to capture dust particles, which are smaller and weigh less than the grains of proppant 92, while not significantly impacting the grains of proppant 92.

The dust receptacles 174, 182 of the second and third hood sections 156, 158, respectively, are positioned closer to the bottom plane 170 than the dust receptacles 166 of the first hood section 154. Moreover, the second and third hood sections 156, 158 are not fully enclosed, like the first hood section 154, and therefore the dust particles are not funneled toward the second and third hood sections 156, 158. However, by positioning the dust receptacles 174, 182 closer to the blender hopper 20, the second and third hood sections 156, 158 can capture dust particles that are formed by the movement and settling of the proppant 92 flowing through the chute 24. For example, the dust particles may disperse outwardly from the first hood section 154 as the proppant 92 contacts the level of proppant 92 in the blender hopper 20. The second and third hood sections 156, 158 are therefore positioned to capture the dust particles that move away from the first hood section 154, thereby removing dust particles from the air to reduce the risk of inhalation or contact with auxiliary equipment.

Figure 14:
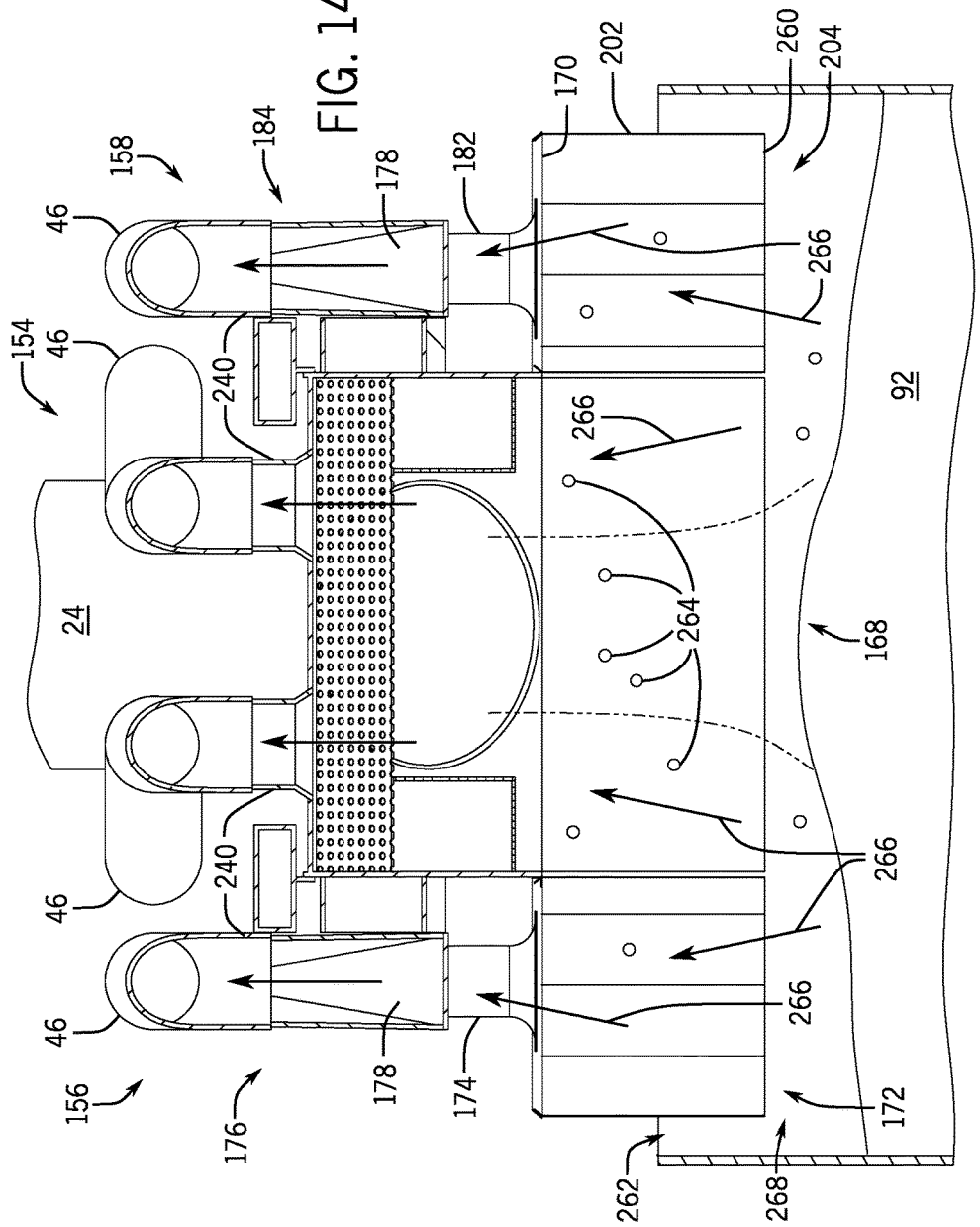
FIG. 14 sectional view of a hood assembly of FIG. 8, taken along line 14-14 according to an embodiment of the present invention.

FIG. 14 is a partial sectional view of the hood assembly 24 taken along line 14-14 of FIG. 8 positioned in association with the blender hopper 20 to collect dust particles from the blender hopper 20 according to an embodiment of the present invention. As shown, a bottom plane 260 of the curtain 202 is positioned to overlay an opening 262 of the blender hopper 20 to substantially block the dust particles from escaping after being formed due to the movement and settling of the proppant 92. The proppant 92 flows out of the chute 24 and into the blender hopper 20 through the first hood section 154. As the proppant 92 contacts the proppant 92 disposed in the blender hopper 20, dust particles 264 can form. The dust particles 264 have a smaller diameter than the grains of proppant 92 and weigh less, thereby enabling the suction pressure of the air mover 28 to capture the dust particles 264 and remove them from the blender hopper 20.

The air mover 28 directs an air flow 266 (represented be the arrows) over a flow path 268 arranged over the blender hopper 20. In the illustrated embodiment, the flow path 268 is at least partially defined by the curtain 202. The air flow 266 is a suction force that draws air out of the blender hopper and up into the hood assembly 42. In other words, the air flow 266 is a vacuum force that moves air in the flow path 268 in a direction substantially opposite the direction of the proppant 92 flowing into the blender hopper 20 from the chute 24. As shown, the air flow 266 draws the dust particles 264 toward the first, second, and third hood sections 154, 156, 158. As shown, the air flow 266 is positioned over the flow path 268 to capture dust particles 264 suspended in the first, second, and third volumes 168, 170, 204. The air flow 266 pulls the dust particles 264 into the dust receptacles 166, 174, 182 and through the hood assembly 42 to enter the tubes 46. Thereafter, the tubes 46 direct the air flow 266 toward the air mover 28 and away from the blender hopper 20.

As described above, the vacuum pressure generated by the air mover 28 is designed to carry the dust particles 264 produced by the movement and settling of the proppant 92 without significantly impacting the proppant 92. In other words, the vacuum pressure is designed to lift the dust particles 264 away from the proppant 92 while also limiting or substantially restricting the quantity of proppant 92 lifted away from the blender hopper 20. That is, the air flow 266 is designed to be sufficient to collect the dust particles 264 and also significantly reduce the risk of lifting the proppant 92. For example, the air mover 28 can include one or more fans or blowers driven by the engine 52 to draw a volume of air away from the blender hopper 20 (e.g., via the conduit 44) and toward the air mover 28. That is, as the fan is driven to rotate by the engine 52, the pressure in front of the fan blades (e.g., downstream of the fan blades) is reduced, thereby drawing air across the fan blades. As the air crosses over the fan blades, energy is added to the air, thereby increasing the velocity of the air. In this manner, air is removed from downstream of the fan and directed toward the fan.

As described in detail above, the air mover 28 includes the conduit 44 to couple the air mover 28 to the hood assembly 42. As will be appreciated by one skilled in the art, as fluid (e.g., gas, liquid, solids, mixtures thereof) flows through conduit 44, there is typically a drop in the pressure of the system due to the lengths of the conduits 44, bends in the conduit 44, measurement devices, filter elements, and the like. These line losses (e.g., pressure drop) can be referred to as the static pressure in the line, that is, the pressure that the air mover 28 overcomes in order to generate the suction pressure. Accordingly, in order to remove the air proximate the blender hopper 20, the air mover 28 is designed to generate a sufficient suction pressure to overcome the static pressure (e.g., line losses) and also capture and remove the dust particles 256.

Figure 39:
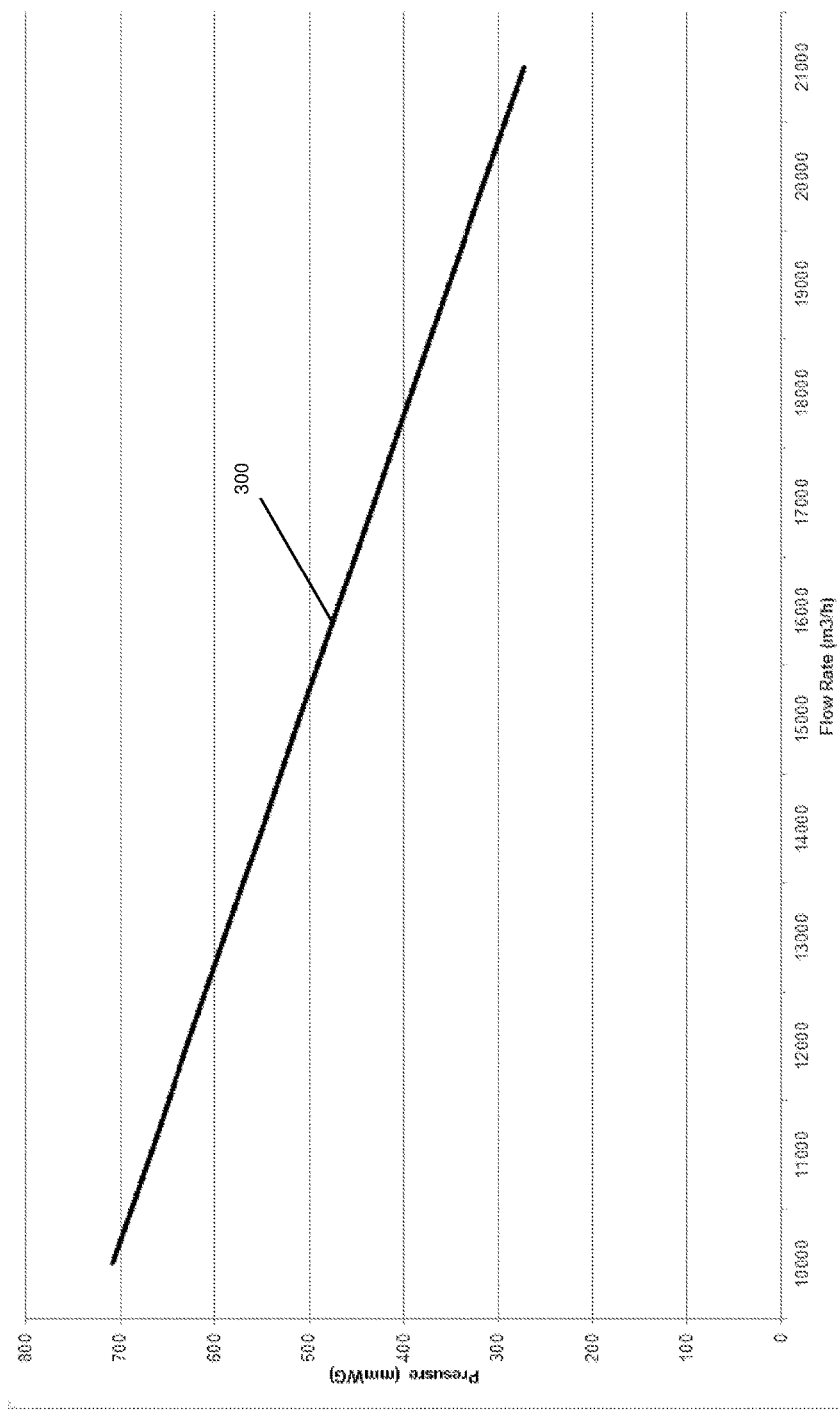
FIG. 39 is a graph illustrating a linear approximation of a range of operation of an air mover according to embodiments of the present invention.

The fan is designed to operate at a given flow rate for a given static pressure. In the illustrated embodiment, the air mover 28 (e.g., the fan of the air mover 28) is rated to operate at approximately 1699 cubic meters per hour (m3/h) at 431.8 millimeters water gauge (mmWG) (1000 cubic feet per minute (CFM) at 17 inches water gauge (inWG) or 286.2 cubic meters per minute (m3/min) at 4234.5 Pascals (Pa)). Moreover, in certain embodiments, the air mover 28 is rated to operate at approximately 20390 m3/h at 297.18 mmWG (12000 CFM at 11.7 inWG or 339 m3/min at 2914.34 Pa). FIG. 39 illustrates a linear approximation of the range of operation of the air mover 28. That is, a fit line 300 having an equation represented by y=−0.039594x+1104.504 approximates a line fitting points together representative of the operating parameters of the fan, where y is equal to the static pressure in mmWG and x is equal to the flow rate in m3/h. As will be appreciated, the fit line 300 may be obtained by utilizing the formula y−y1=m(x−x1), where y and y1 are pressures, x and x1 are flow rates, and m is the slope.

As shown, the flow rate and the static pressure are inversely proportional, such that at the static pressure, and therefore the pressure drop in the system, decreases, the flow rate increases. In this manner, the routing configuration of the conduit 44 may be adjusted at the well site to lower the static pressure, thereby increasing the flow rate of the system. Furthermore, it should be appreciated that the static pressure can also be a property of the temperature, elevation, atmospheric pressure, and the like of the well site. Accordingly, well sites located at higher elevations (e.g., in mountainous regions) may have a lower atmospheric pressure, and thereby a lower static pressure. Moreover, well sites located at lower elevations may have a higher atmospheric pressure, and thereby a higher static pressure. In this manner, the system may be adjusted based on the location of the well site, the environmental conditions at the well site, and the desired operating parameters of the well site.

In certain embodiments illustrated in the present disclosure, the suction pressure (e.g., vacuum pressure, vacuum force, suction force) generated by the air mover 28 is sufficient to capture and remove the dust particles 264 generated by the movement and settling of the proppant 92 while not lifting or carrying the proppant 92 up and away from the blender hopper 20. For example, in certain embodiments, the proppant 92 may have a density between 1.5 grams per cubic centimeter (g/cm3) and 4 g/cm3. Furthermore, the proppant 92 can have a mesh size of 20/40 and have an average proppant diameter of 0.69 millimeters (mm). As described above, the proppant 92 may be spherical particles, having a volume defined by $(4/3)(pi)(r)3$, where r is the radius of the spherical shape. Accordingly, the grains of proppant 92 can have a mass in the range of approximately 0.25801 milligrams (mg) and 0.688027 mg. However, it should be appreciated that in other embodiments the grains of proppant 92 can have different densities and different diameters, which could have masses different than the range specified above. For example, larger, denser grains would have a larger mass, while smaller, less dense grains would have a smaller mass.

As will be known by one skilled in the art, pressure is defined as force of area. Moreover, the force can be defined as the mass of the grains of proppant over an area. For clarity, the proppant 92 not be referred to as a single grain, but instead, as a layer of grains evenly distributed over a plane. However, it should be appreciated that the calculations contained herein may be utilized on any number of proppant grains to determine a pressure sufficient to lift the grains from a resting position. For example, in certain embodiments, the hood assembly 42 can have dimensions of approximately 1.22 meters (m) by 1.22 m (approximately 4 feet by 4 feet). As a result, the surface area is approximately 1.44 square meters (m2). However, because the proppant 92 is substantially spherical, the surface area of the proppant positioned on the plane having a surface area of approximately 1.44 m2 is different. For example, assuming that the proppant grains having an average diameter of 0.69 mm as described above, approximately 3,118,756 grains of proppant 92 can be positioned under the hood assembly 42 having the surface area of approximately 1.44 m2. Yet, because the grains are spherical, the surface area of the proppant may be approximated by calculating of half of the surface area of a sphere, because approximately one half of the surface area will be pointed downwards. As will be known by one skilled in the area, the surface area of a sphere may be calculated by the equation $SA=4(pi)(r2)$, where r is the radius. Utilizing the average diameter of 0.69 mm and multiplying by the number of grains present under the surface area of the hood 42 yields a surface area of approximately 2.33 m2.

Thereafter, the pressure range for the average density (e.g., 1.5 g/cm3 to 4 g/cm3) can be determined. For example, for the density of 1.5 g/cm3, the weight of the proppant particles may be calculated by multiplying the mass of the particles by the number of particles and by the force due to gravity (e.g., 9.81 m/s2). Moreover, the calculated weight is divided by the calculated area, yielding a pressure of 3.38 Pa. Furthermore, for the density of 4 g/cm3, and utilizing the same steps listed above, the pressure is 9.025 Pa. Therefore, for suction pressures above the static pressure of less than approximately 3.38 Pa, the grains of proppant 92 in the blender hopper 20 will not be carried away. Additionally, because in certain embodiments the proppant 92 may include a range of sizes, the suction pressures above the static pressure may be within a range from approximately 3.38 Pa to 9.025 Pa. However, the dust particles 264, which are smaller and lighter than the proppant 92, will be captured and removed from the volume of air proximate the blender hopper. It should be appreciated that the above mentioned pressures may be modified due to operating conditions, such as temperature, atmospheric pressure, proppant size, proppant density, conduit 44 configurations, filter element properties, and the like. Furthermore, the above-calculated pressures are indicative of pressures above the static pressure utilized to overcome the line losses present in the system.

As described above, the tubes 46 couple to the hood assembly 42 at the tube connections 240. In the illustrated embodiment, the tube connections 240 are substantially aligned. That is, the tube connections 240 are at approximately the same elevation relative to the bottom plane 170 of the hood assembly 42. However, it should be appreciated that the tube connections 240 do not need to be aligned in order for the tubes 46 to remove the dust particles 264 from the blender hopper 20.

As shown in FIG. 14, the sloped walls 178 of the dust enclosures 176, 184 converge toward the tube connections 240 to thereby decrease the cross-sectional area of the dust enclosures 176, 184. As a result, the force generated by the air mover 28 via the air flow 266 is increased before the air flow 266 enters the tubes 46. Accordingly, the larger force acting on the dust particles 264 will facilitate capture and transportation of the air flow 266 to the air mover 28.

Figure 15:
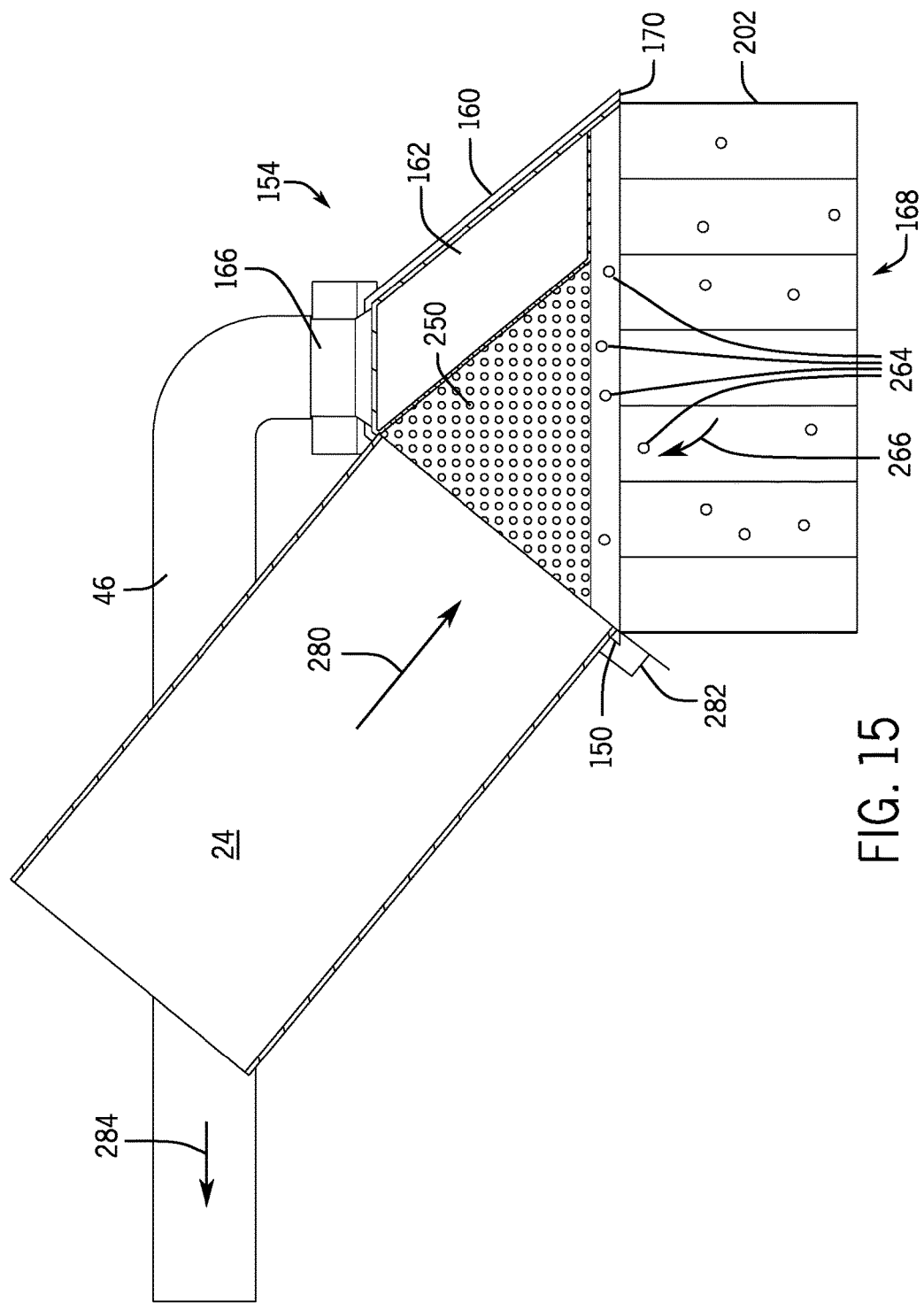
FIG. 15 is a sectional view of a hood assembly of FIG. 8, taken along line 15-15 according to an embodiment of the present invention.

FIG. 15 is a sectional view of the hood assembly 24 taken along line 15-15 of FIG. 8. In the illustrated embodiment, the arrow depicts the proppant flow direction 280 through the chute 24. In operation, the proppant 92 flows through the chute 24 after being received from the proppant mover 22. The chute 24 is angled downward, thereby utilizing gravity to drain into the blender hopper 20. As shown, the chute 24 is positioned such that an angle 282 of the chute relative to the back wall 150 is approximately 90 degrees. In other words, the chute 24 is arranged substantially perpendicular to the back wall 150. It should be appreciated that in other embodiments, the chute 24 may be positioned at other angles relative to the back wall 150 (e.g., 45 degrees, 60 degrees, 75 degrees, etc.) to accommodate design conditions. In the illustrated embodiment, the screen 250 is positioned to extend upward along the side wall 162. In this manner, the screen 250 may block grains of proppant captured by the air flow 266 from traveling upward into the corners of the first hood section 154. Once captured, the dust particles 264 are entrained in the air flow 266 moving in an air flow direction 284. As shown, the air flow direction 284 is substantially opposite the proppant flow direction 280. In other words, the air flow direction 284 is out of and away from the blender hopper 20, while the proppant flow direction 280 is toward and into the blender hopper 20.

Figure 16:
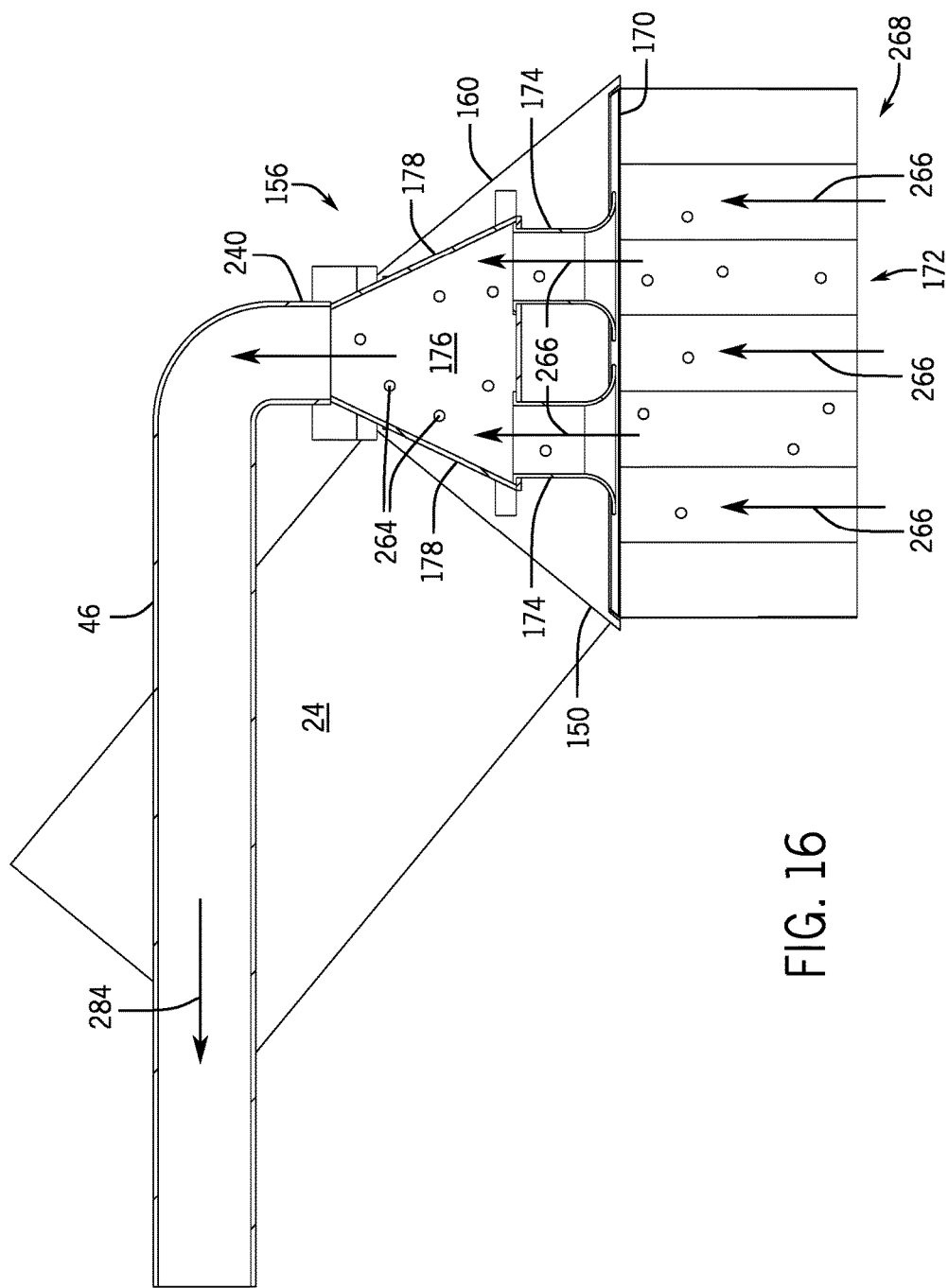
FIG. 16 is a sectional view of a hood assembly of FIG. 8, taken along line 16-16 according to an embodiment of the present invention.

FIG. 16 is a sectional view of the hood assembly 42 taken along line 16-16 of FIG. 8. In the illustrated embodiment, the dust enclosure 176 is shown with the air flow 266 directing the air from the flow path 268 upward to the tubes 46. The dust enclosure 176 receives the air removed from the second volume 172 by the air flow 266. In the illustrated embodiment, the pair of dust receptacles 174 are substantially aligned with the bottom plane 170 of the hood assembly 42 to capture dust particles formed in and around the second volume 172. As depicted by the arrows 266 representing the air flow, air from the flow path 268 is captured by the air flow 266 such that dust particles positioned in the air are directed toward the second hood section 156. The dust receptacles 174 are coupled to the dust enclosure 176 to direct the air flow 266 toward the air mover 28 in the air flow direction 284 via the tubes 46. In this manner, the dust particles 264 can be removed from proximate the blender hopper 24 via the hood assembly 42.

As described above, the sloped walls 178 of the dust enclosure 176 are positioned to reduce the cross-sectional area of the dust enclosure 176 and direct the air flow 266 toward the tube connections 240 and the tubes 46. In other words, the sloped walls 178 converge toward the tube connections 240 toward a center of the dust enclosure 176, thereby funneling the air flow 266 toward the tubes 46. While the illustrated embodiment includes the second hood section 156, it should be appreciated that the third hood section 158 is substantially a mirror-image. Accordingly, the features present in the second hood section 156 are also present in the third hood section 158.

Figure 17:
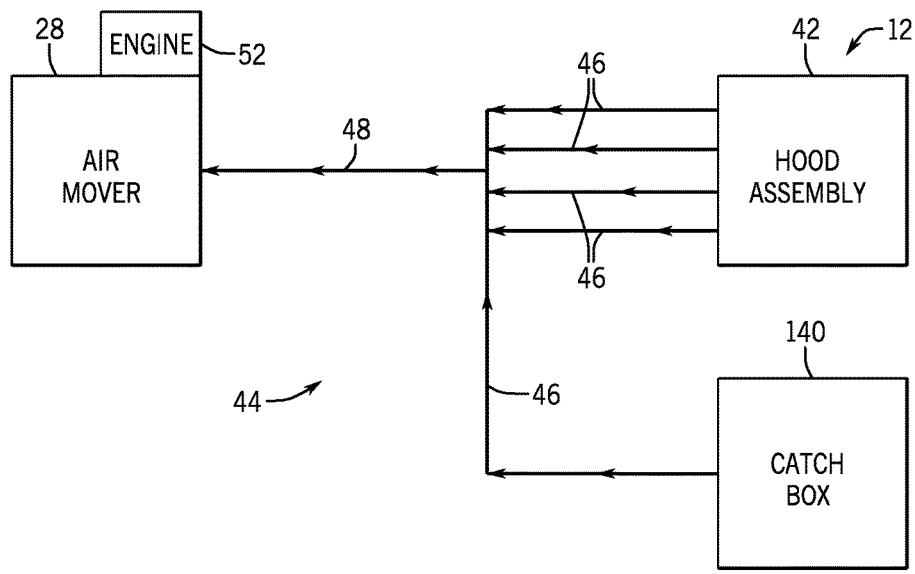
FIG. 17 is a schematic diagram of a conduit system coupling an air mover to the hold assembly of FIG. 8 according to an embodiment of the present invention.

FIG. 17 is a schematic diagram of the conduit 44 coupling the air mover 28 to the hood assembly 42, according to an embodiment of the present invention. The air mover 28 is positioned to draw air away from the hood assembly 42 and the catch box 140 via a generated suction pressure. The air flow 266 moves in the air flow direction 284 away from the hood assembly 42 and the catch box 140 and toward the air mover 28. In the illustrated embodiment, the tubes 46 couple the hood assembly 42 and the catch box 140 to the manifold 48 to direct the air flow 266 back to the air mover 28. It should be appreciate that while the illustrated embodiment depicts four tubes 46 extending from the hood assembly 42 to the manifold 48, in other embodiments more or fewer tubes 46 may be utilized to enable the air flow 266 to enter the manifold 48.

Figure 18:
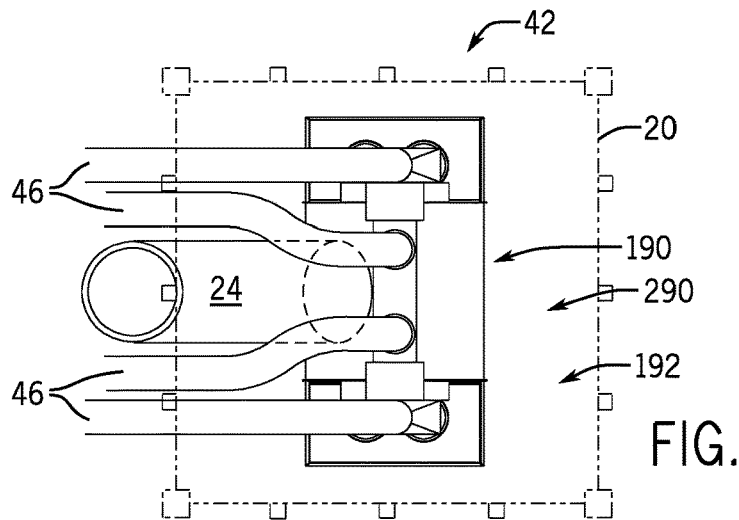
FIG. 18 is a top plan view of a hood assembly of FIG. 8 in a first position adjacent a blender hopper according to an embodiment of the present invention.
Figure 19:
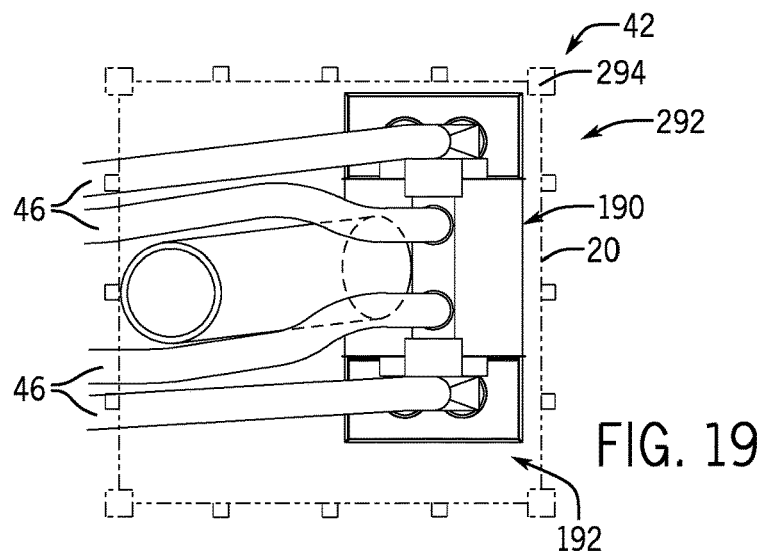
FIG. 19 is a top plan view of a hood assembly of FIG. 8 in a second position adjacent a blender hopper according to an embodiment of the present invention.
Figure 20:
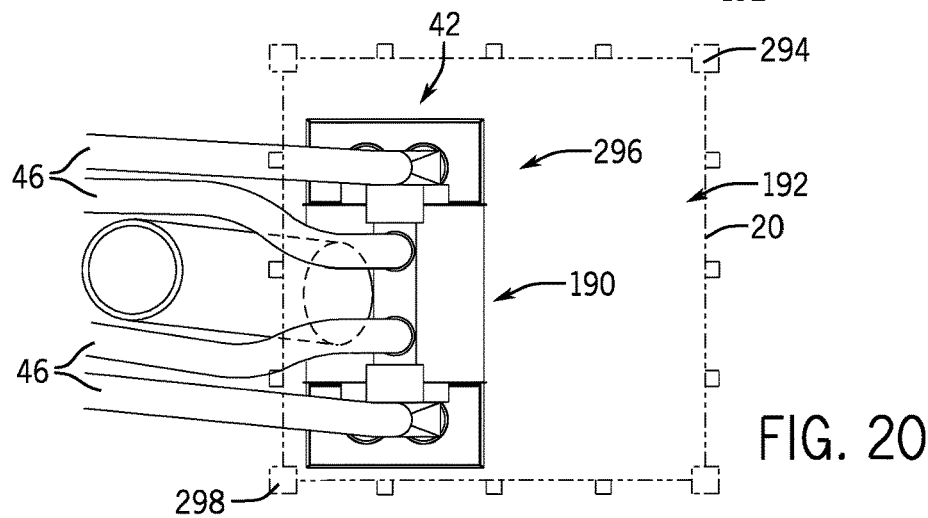
FIG. 20 is a top plan view of a hood assembly of FIG. 8 in a third position adjacent a blender hopper.

FIG. 18 is a top plan view of the hood assembly 42 in a first position 290 adjacent and overlying the blender hopper 20 according to an embodiment of the present invention. In the illustrated embodiment, the capture area 190 is smaller than the blender hopper surface area 192. As a result, the hood assembly 42 can move to different positions in the blender hopper 20 to evenly distribute the proppant 92 and to capture dust particles 264 formed by the movement and settling of the proppant 92. For example, turning to FIG. 19, a top plan view of the hood assembly 42 in a second position 292 is shown. In the illustrated embodiment, the second position 292 is different than the first position 290. For example, the second position 292 is closer to a corner 294 of the blender hopper 20 than the first position 290. In this manner, the hood assembly 42 can be moved in the blender hopper 20 to evenly distribute the proppant 92 and to capture dust particles 264. Furthermore, with regard to FIG. 20, a top plan view of the hood assembly 42 in a third position 296 is shown. As shown, the hood assembly 42 is positioned at an opposite corner 298 from the corner 294. In this manner, the hood assembly 42 can be continuously moved over the blender hopper 20 to distribute the proppant 92 and to capture dust particles 264 formed by the settling and movement of the proppant 92.

Figure 21:
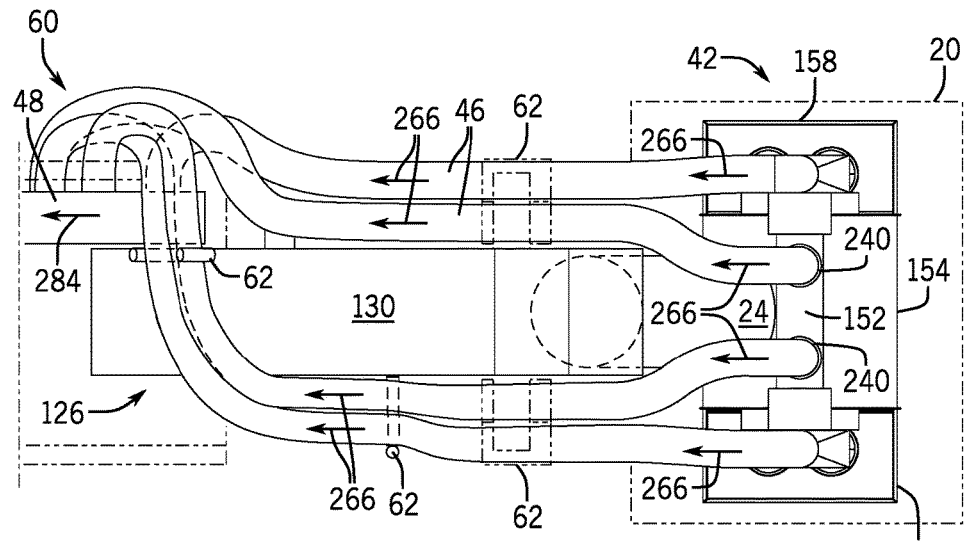
FIG. 21 is a top plan view of a conduit system coupled to the hood assembly of FIG. 8 according to an embodiment of the present invention.

FIG. 21 is a top plan view of the conduit 44 coupled to the hood assembly 42. In the illustrated embodiment, the tubes 46 are coupled to the hood assembly 42 at the connections 240. As shown, the air flow 266 is directed through the tubes 46 and toward the manifold 48. The manifold 48 receives the air flow 266 and further directs the air flow 266 in the air flow direction 284 away from the hood assembly 42 and toward the air mover 28. The tubes 46 are supported by the conduit supports 62 (in phantom) arranged along the inclined section 126. As shown, the conduit supports 62 direct the tubes 46 to the front side 78 and the rear side 76 of the chute 24. Accordingly, the tubes 46 are organized, thereby increasing the ease of maintenance or inspection of the tubes 46.

As described above, the tubes 46 couple to the manifold 48 at the connections 60. Accordingly, the air flow 266 in the tubes 46 is directed toward the manifold 48 for further delivery to the air mover 28. In certain embodiments, the tubes 46 are organized at the connections 60 to readily identify which tube 46 is connected to the first, second, and third hood sections 154, 156, 158. Accordingly, during maintenance or inspection, operations personnel can easily identify potential blockages and/or concerns with the tubes 46 and the associated hood sections 154, 156, 158.

Figure 22:
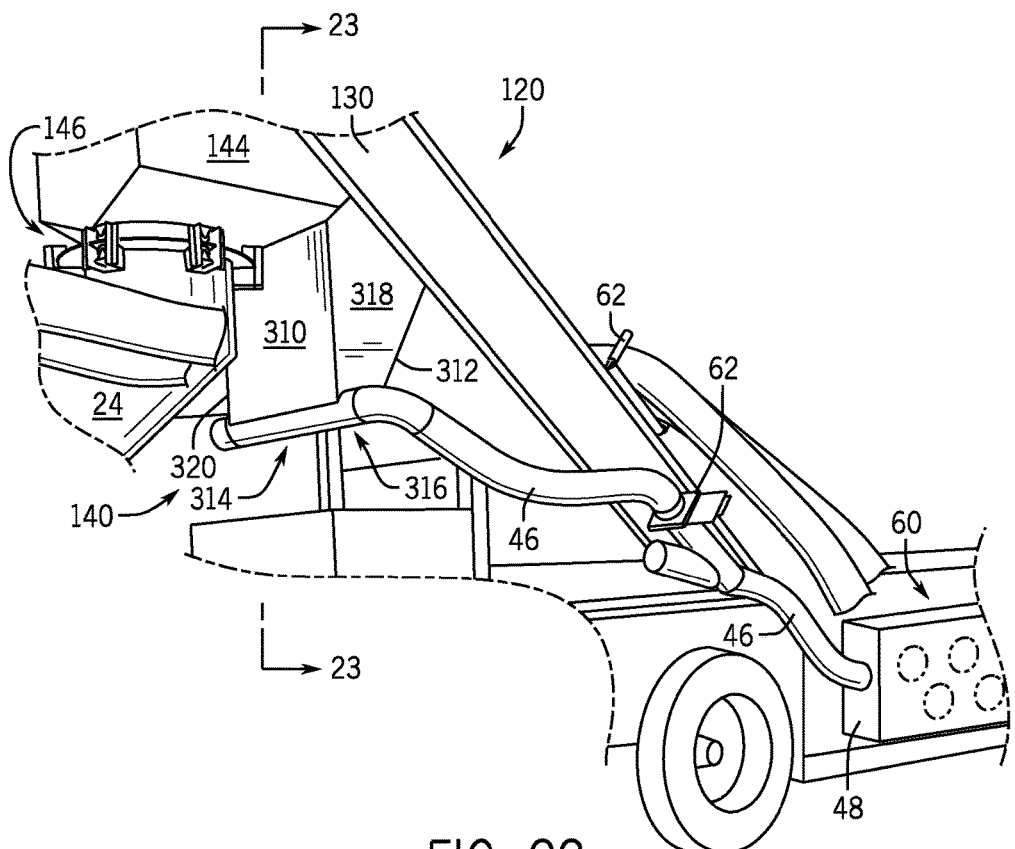
FIG. 22 is a perspective view of a catch box positioned along a conveyor downstream of the chute according to an embodiment of the present invention.

FIG. 22 is a perspective view of the catch box 140 positioned on the bottom surface 142 of the inclined section 126 of the shroud 130. In the illustrated embodiment, the catch box 140 is positioned below the proppant mover 22 to catch residual proppant that remains on the proppant mover 22 after being deposited into the chute 24. As shown, the catch box 140 has a substantially vertical side 310 arranged proximate the proppant chamber 144 and an inclined side 312 arranged proximate the inclined section 126 and opposite the vertical side 310. The vertical side 310 and the inclined side 312 direct residual proppant and dust particles 264 received by the catch box 140 downward toward a lower section 314 having an outlet 316. In the illustrated embodiment, the lower section 314 is substantially cylindrical and coupled to the vertical side 310 and the inclined side 312. Moreover, the lower section 314 is coupled to a first side panel 318 and a second side panel 320, the second side panel being obscured in this view. In this manner, the catch box 140 includes an interior volume for receiving and storing residual proppant and dust particles 264.

In the illustrated embodiment, the outlet 316 is coupled to the tubes 46 for removal of the residual proppant and dust particles 264 stored within the catch box 140. For example, as the residual proppant 46 and the dust particles 264 enter the catch box 140, they are directed downward to the lower section 314. In the illustrated embodiment, the outlet 316 is coupled to the manifold 48 and is acted on by the vacuum pressure of the air mover 28. As a result, the residual proppant and dust particles 264 are directed toward the air mover 28 for removal from the system. Additionally, in certain embodiments, the catch box 140 is arranged to store the residual proppant for later manual removal after fracking operations are complete. For example, in certain embodiments, the suction pressure generated by the air mover 28 is not large enough to carry the proppant 92. As a result, the catch box 140 may be arranged to hold the residual proppant because the air flow 266 may not be sufficient to carry the proppant 92. However, in other embodiments, the air flow 266 may be sufficient to remove the residual proppant from the catch box 140.

Figure 23:
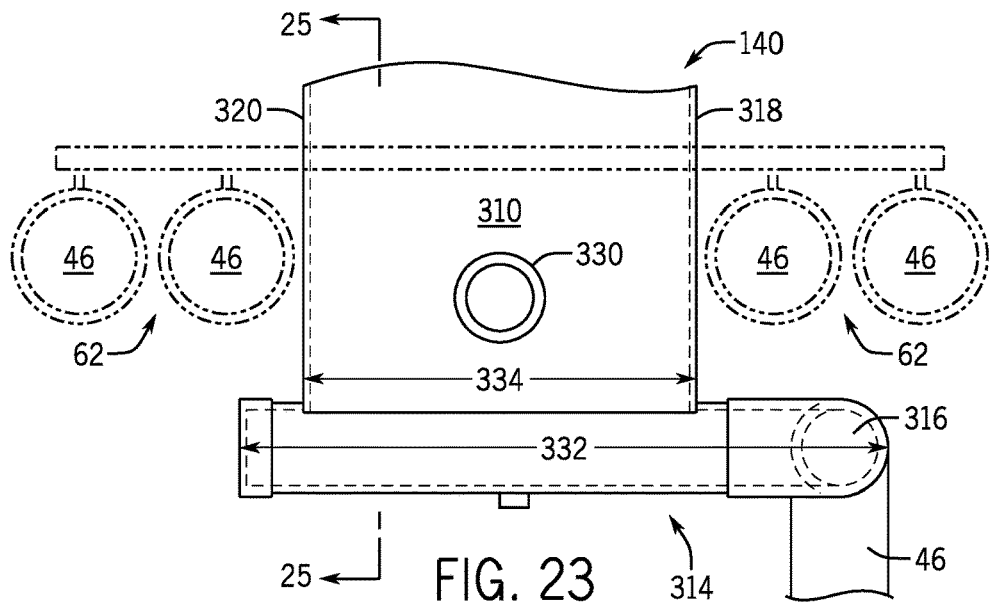
FIG. 23 is a front elevational view of the catch box of FIG. 23 according to an embodiment of the present invention.

FIG. 23 is a front elevational view of the catch box 140 arranged under the inclined section 126. In the illustrated embodiment, the tubes 46 coupled to the first hood section 154, the second hood section 156, and the third hood section 158 are shown in phantom being supported by the conduit supports 62. As shown, the vertical side 310 includes an access port 330. In certain embodiments, the tubes 46 may be coupled to the access port 330 in order to provide a second flow path out of the catch box 140, in addition to the outlet 316 arranged at the lower section 314. In the illustrated embodiment, the lower section 314 has a lower width 332 that is greater than a catch box width 334. As a result, the lower section 314 can distribute the residual proppant and dust particles 264 over a larger surface area, thereby enhancing the effectiveness of the vacuum pressure acting on the outlet 316.

In the illustrated embodiment, the conduit supports 62 are coupled to and extend away from the vertical side 310. In this manner, the catch box 140 is utilized to support and route the tubes 46 between the manifold 48 and the first, second, and third hood sections 154, 156, 158. For example, the conduit supports 62 on the catch box 140 position the tubes 46 above the lower section 314 and out of contact with the lower section 314. Yet, in certain embodiments, the tubes 46 may rest on the lower section 314 to provide further support.

Figure 24:
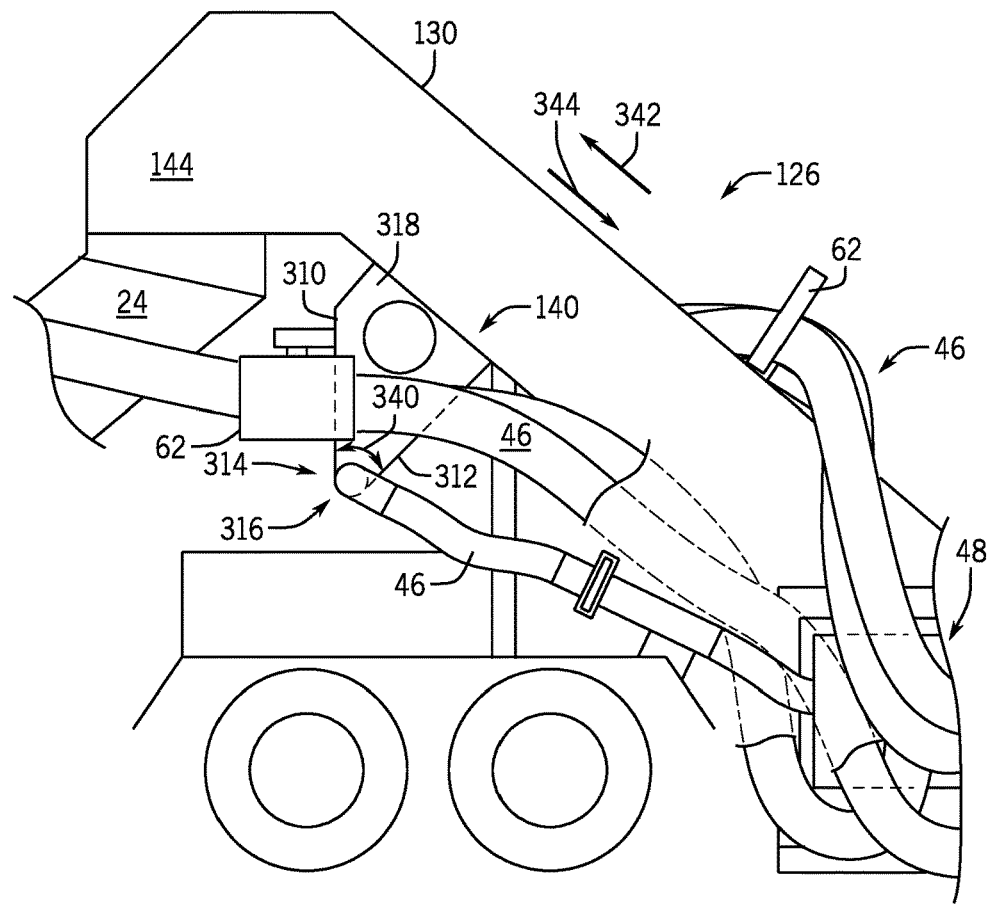
FIG. 24 is a side elevational view of the catch box of FIG. 23 according to an embodiment of the present invention.

FIG. 24 is a side elevational view of the catch box 140 positioned on the bottom surface 142 of the shroud 130 such that the catch box 140 is downstream of the chute 24, relative to the direction of travel of the proppant mover 22. In the illustrated embodiment, the inclined side 312 is positioned at an angle 340 with respect to the vertical side 310. It is appreciated that by positioning the inclined side 312 at the angle 340, residual proppant and dust particles 264 that enter the catch box 140 and contact the inclined side 312 will be directed downward toward the lower section 314 via gravity. As such, the residual proppant and dust particles 264 may be positioned proximate the outlet 316 for removal.

As described above, the catch box 140 is positioned downstream of the chute 24, relative to the direction of travel of the proppant mover 22. For example, in the illustrated embodiment, during operation the proppant mover 22 carries the proppant 92 in a first direction 342 toward the proppant chamber 144 and the chute 24. In certain embodiments, the proppant mover 22 is the endless conveyor 122 which turns over at a point and returns back toward the containers 18 in the second direction 344. As such, the catch box 140 is positioned along the portion of the conveyor moving in the second direction 344, and therefore is described as being downstream of the chute 24.

In the illustrated embodiment, the catch box 140 is coupled to the bottom surface 142 of the shroud 130. As will be described below, coupling the catch box 140 to the bottom surface 142 enables the residual proppant to fall off of the conveyor 122 as it moves in the second direction 344, and thereby downward and into the catch box 140. Moreover, positioning the catch box 140 below the inclined section 126 enables use of the catch box 140 is support the tubes 46 via the conduit supports 62, thereby enhancing the routing of the tubes 42 around the inclined section 126.

As shown in FIG. 24, the outlet 316 extends out of the lower section 314 perpendicular to the plane of the page. The outlet 316 is coupled to the tube 46 to direct the residual proppant and dust particles 264 positioned within the catch box 140 toward the manifold 48 via the suction pressure generated by the air mover 28. That is, the residual proppant and dust particles 264 will be directed downward toward the lower section 314 via the vertical side 310 and the inclined side 312. As the residual proppant and the dust particles 264 collect within the catch box 140, the suction pressure of the air mover 28 removes the residual proppant and/or the dust particles 264 from the catch box 140 via the outlet 316 to be directed toward the air mover 28. In this manner, the risk of exposure to proppant and dust particles 264 is reduced because the proppant and dust particles 264 remain contained within the shroud 130 and the catch box 140 after being deposited into the chute 24.

Figure 25:
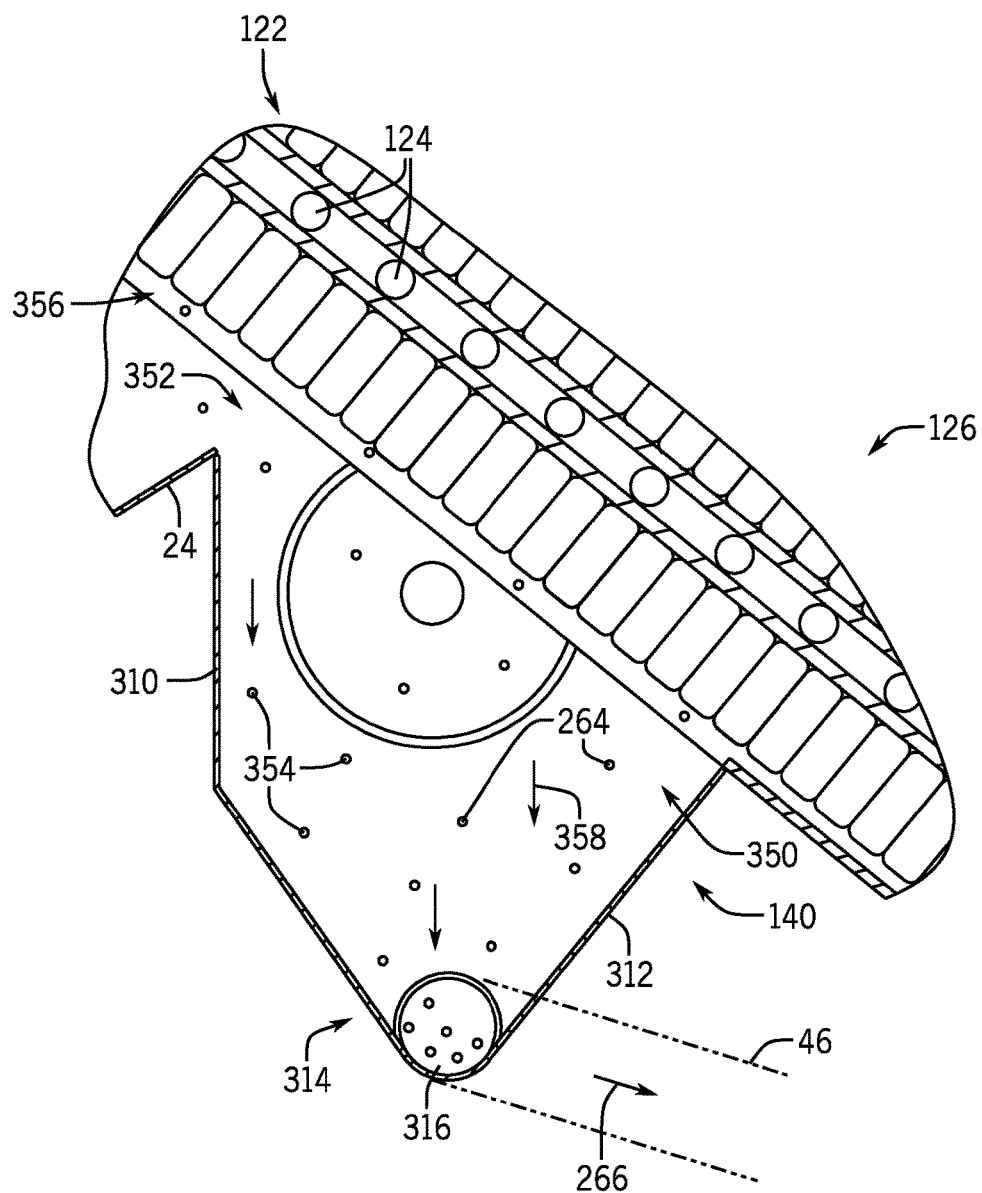
FIG. 25 is a cross-sectional view of the catch box of FIG. 23, taken along line 25-25 according to an embodiment of the present invention.

FIG. 25 is a cross-sectional view of the catch box 140 receiving residual proppant 354 and dust particles 264 from the conveyor 122 taken along line 25-25 of FIG. 23. In the illustrated embodiment, the vertical side 310, inclined side 312, lower section 314, second side panel 320, and bottom surface 142 of the shroud 130 at least partially define an interior volume 350 of the catch box 140. In the illustrated embodiment, an inlet 352 is positioned proximate the junction between the chute 24 and the vertical side 310. The inlet 352 fluidly couples the catch box 140 to the shroud 130. In the illustrated embodiment, residual proppant 354 falls from a lower surface 356 of the conveyor 122 and into the catch box 140. As used herein, the lower surface 356 describes the surface of the conveyor 122 as the conveyor 122 is traveling in the second direction 344. In other words, the lower surface 356 is the surface of the conveyor 122 positioned closest to the ground plane.

In the illustrated embodiment, the residual proppant 354 falls off of the lower surface 356 via the gravitational force acting on the residual proppant 354 as the conveyor 122 moves in the second direction 344. As illustrated by the arrows 358, the residual proppant 354 and dust particles 254 settle and collect in the lower section 314 of the catch box 140. For example, the residual proppant 354 may contact the inclined side 312 and be directed toward the lower section 314. At the lower section 314, the residual proppant 354 and the dust particles 254 are removed from the catch box 140 via the air flow 266 generated by the suction pressure of the air mover 28. For example, the tube 46 is coupled to the outlet 316 to fluidly couple the air mover 28 to the catch box 140 via the manifold 48. Accordingly, the residual proppant 354 and the dust particles 254 remain within the contained portions (e.g., shroud 130, manifold 48, catch box 140) of the system, thereby reducing the risk of exposure to fracking site operations personnel.

Figure 26:
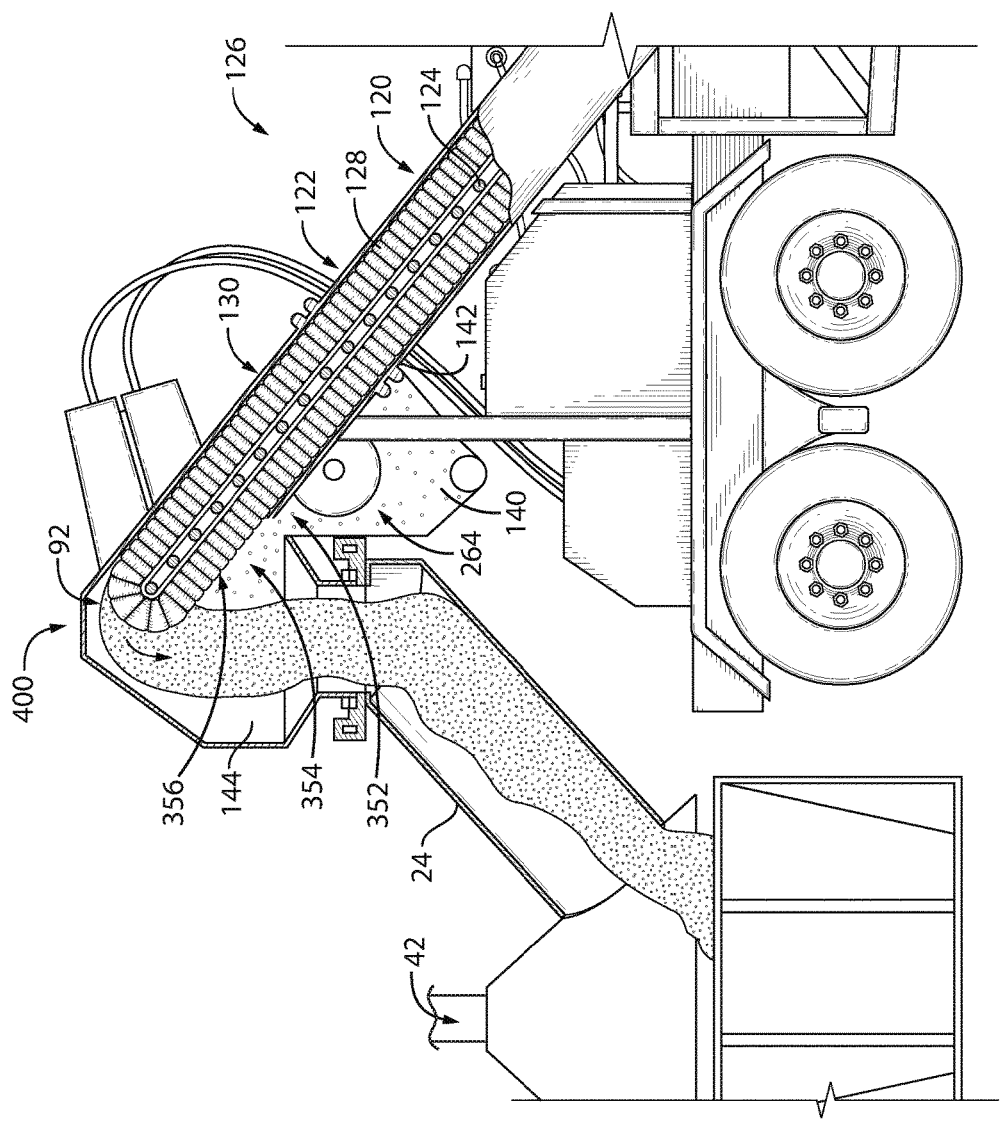
FIG. 26 is a partial side elevation view of proppant being deposited into the catch box of FIG. 23 according to an embodiment of the present invention.

FIG. 26 is a partial side elevation view of proppant 92 being deposited into the catch box 140, according to an embodiment of the present invention. As described above, the catch box 14 is arranged on a bottom surface 142 of the shroud 130 to catch dust particles 264 and proppant 92 after the conveyor 122 turns over to deposit the proppant 92 into the proppant chamber 144. For example, the conveyor 122 receives the proppant 92 discharged from the containers 18 on the top surface 120. The conveyor 122 moves the proppant 92 away from the containers 18 and up the inclined section 126. At an apex 400, the conveyor 122 turns over such that the top surface 120 is no longer on top of the rollers 124. In other words, after the top surface 120 crosses the apex 400, the top surface 120 becomes the lower surface 356 that substantially faces a ground plane. In operation, the proppant 92 on the top surface 120 falls off of the conveyor 122 at the apex 400 and into the proppant chamber 144 to the chute 24. However, in certain embodiments, residual proppant 354 remains on the top surface 102. Furthermore, dust particles 264 may form in the proppant chamber 144 due to the movement and settling of the proppant 92. To capture the residual proppant 354 and the dust particles 264, the catch box 140 is positioned on the bottom surface 142 of the shroud 130 downstream of the apex 400.

In the illustrated embodiment, the inlet 352 between the shroud 130 and the proppant chamber 144 provides access to the catch box 140. The residual proppant 354 remaining on the conveyor 122 is directed toward the catch box 140 via the positioning of the catch box 140 at the location where the conveyor 122 turns over. In other words, the catch box 140 is positioned downstream of the apex 400 where the top surface 120 becomes the lower surface 356. Accordingly, the gravitational force acting on the residual proppant 354, drives the residual proppant 354 to fall off of the conveyor 122 and into the catch box 140. Furthermore, dust particles 264 forming at the proppant chamber 144 can settle toward the inlet 352, thereby being captured in the catch box 140. In this manner, the residual proppant 354 and dust particles 264 may be captured before the lower surface 356 returns down the inclined section 126 and toward the containers 18.

Figure 27:
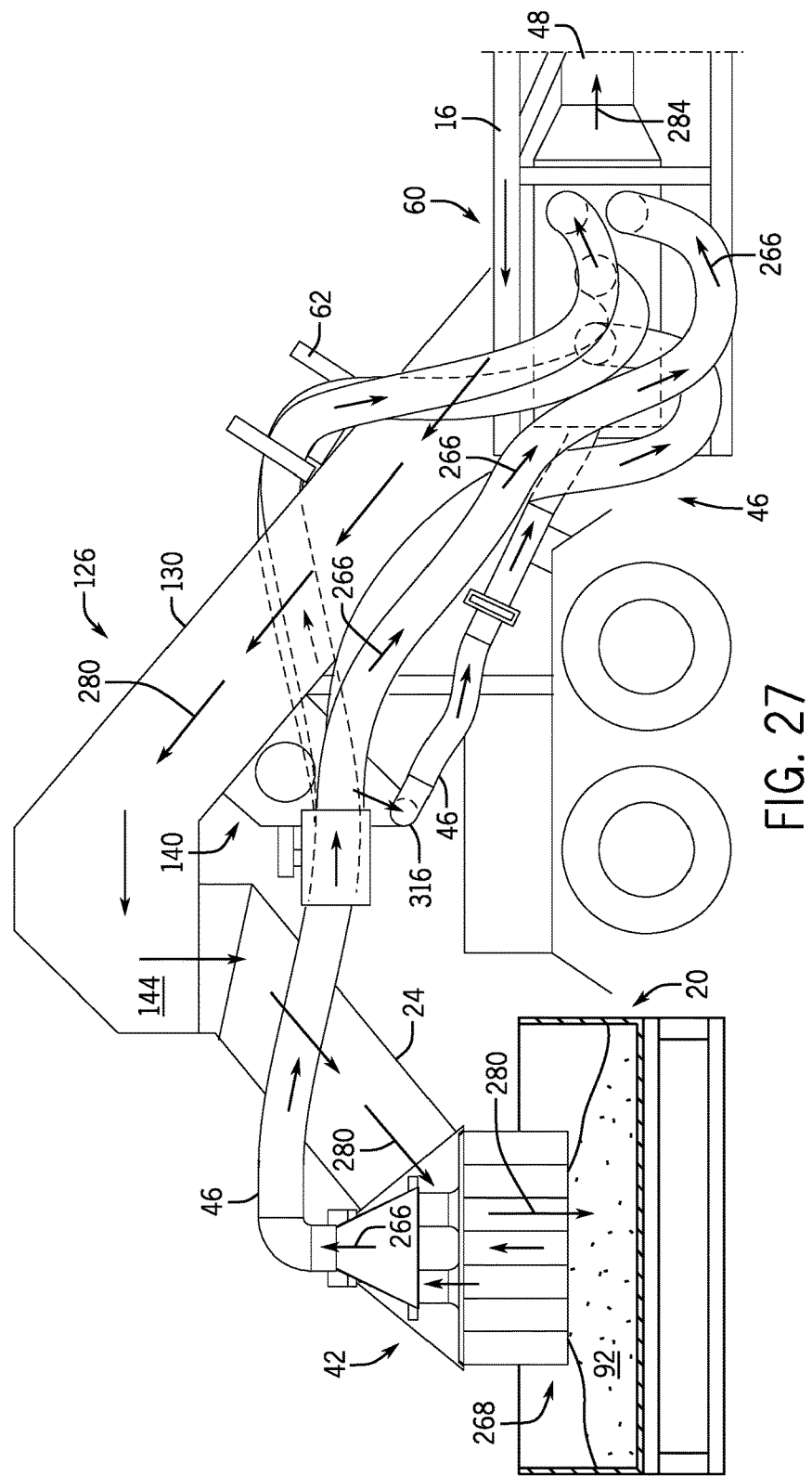
FIG. 27 is a partial side elevation view of an air flow and proppant moving through the system according to an embodiment of the present invention.

FIG. 27 is a cross-sectional view of the hood assembly 42 arranged over the blender hopper 20 in which the air flow 266 traveling through the conduit 44 is illustrated. As described in detail above, the hood assembly 42 is arranged proximate and overlying the blender hopper 20. In the illustrated embodiment, the hood assembly 42 is smaller than the blender hopper 20, thereby enabling the hood assembly 42 to move without the blender hopper 20 to evenly distribute the proppant 92. The hood assembly 42 is coupled to and surrounds the chute 24. As described above, the chute 24 receives the proppant 92 from the proppant mover 22, as shown by the proppant flow direction 280. The proppant 92 is dispensed from the containers 18 positioned on the cradle 16 downward via gravity feed onto the proppant mover 22. The proppant mover 22 moves the proppant 92 away from the containers 18 and toward the chute 24. As the proppant 92 enters the chute 24, the chute 24 positioned to direct the proppant 92 into the blender hopper 20.

In the illustrated embodiment, the hood assembly 42 is positioned to capture dust particles 264 formed due to the movement and settling of the proppant 92. For example, the hood assembly 42 directs the air flow 266 over the flow path 268 to capture the dust particles 264 and direct the dust particles 264 through the hood assembly 42 and into the tubes 46. The tubes 46 direct the air flow 266 toward the manifold 48 in the air flow direction 284. As illustrated, the tubes 46 are coupled to the manifold 48 at the connections 60, thereby substantially joining the respective air flows 266 in each tube 46. In this manner, the captured dust particles are directed away from the blender hopper 20 and toward the air mover 28.

Moreover, as described above, the catch box 140 is arranged on the bottom surface 142 of the inclined section 126. As shown, the air flow 266 acts on the catch box 140 to remove the residual proppant 354 and dust particles 264 that are collected therein via the tube 46 coupled to the outlet 316. As will be appreciated, the tube 46 is coupled to the manifold 48, thereby transmitting the suction pressure generated by the air mover 28. The tube 46 receives the residual proppant 354 and the dust particles 264 from the catch box 140 and directs them toward the manifold 48 via the air flow 266. As described above, the manifold 48 directs the air flow 266 in the air flow direction 284 toward the air mover 28 and away from the blender hopper 20.

Figure 28:
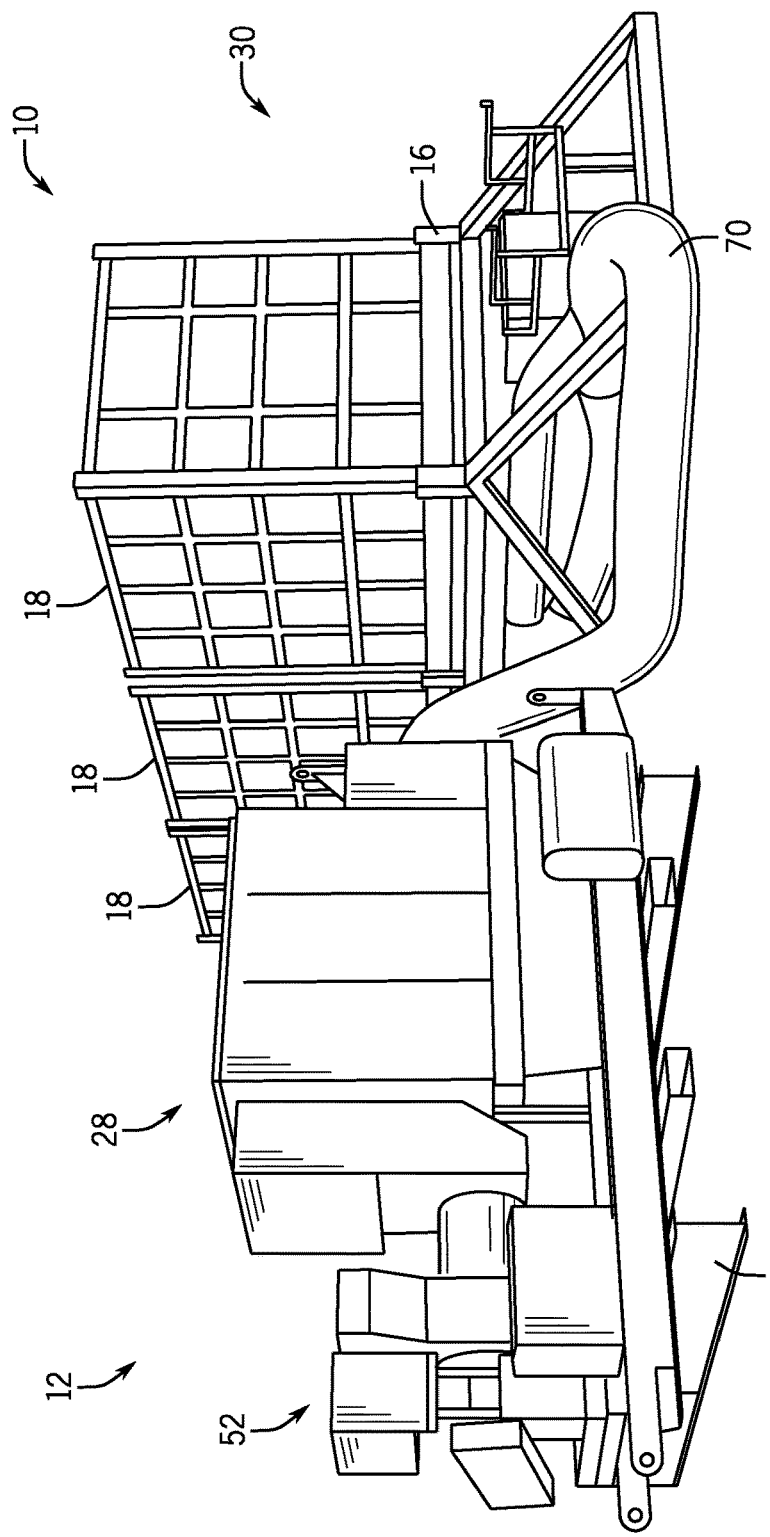
FIG. 28 is a perspective view of an air mover of the dust collection assembly arranged proximate the proppant delivery system on a skid according to an embodiment of the present invention.

FIG. 28 is a perspective view of the air mover 28 arranged at the rear end 30 of the cradle 16. As shown, the engine 52 is positioned proximate the air mover 28 to provide operational power to generate the suction pressure (e.g., vacuum pressure, suction force, vacuum force) that enables the hood assembly 42 to capture the dust particles 264. For example, the engine 52 may be coupled to a fan that rotates via rotation of the engine 52. The air mover 28 is positioned on the skid 50 to enable movement between well sites and to optimize placement along the length 40 of the cradle 16. For example, in the illustrated embodiment, the air mover 28 is positioned at the rear end 30. However, in other embodiments, the air mover 28 may be positioned closer to the distal end 32. It is appreciated that positioning the air mover 28 closer to the hood assembly 42 may reduce the pressure drop along the conduit 44 (e.g., by shortening the length of the conduit 44), thereby reducing the static pressure and increasing the flow rate of the air mover 28.

As shown, the air mover 28 is coupled to the manifold 48 via the tubing 70. In certain embodiments, the tubing 70 is flexible tubing (e.g., polymer tubing, flexible metal, etc.) to simplify installation of the system. For example, the tubing 70 can be positioned to curve under the cradle 16 to couple to the manifold 48. Moreover, by placing the tubing 70 under the cradle 16, the overall footprint of the system may be reduced at the well site 14.

Figure 29:
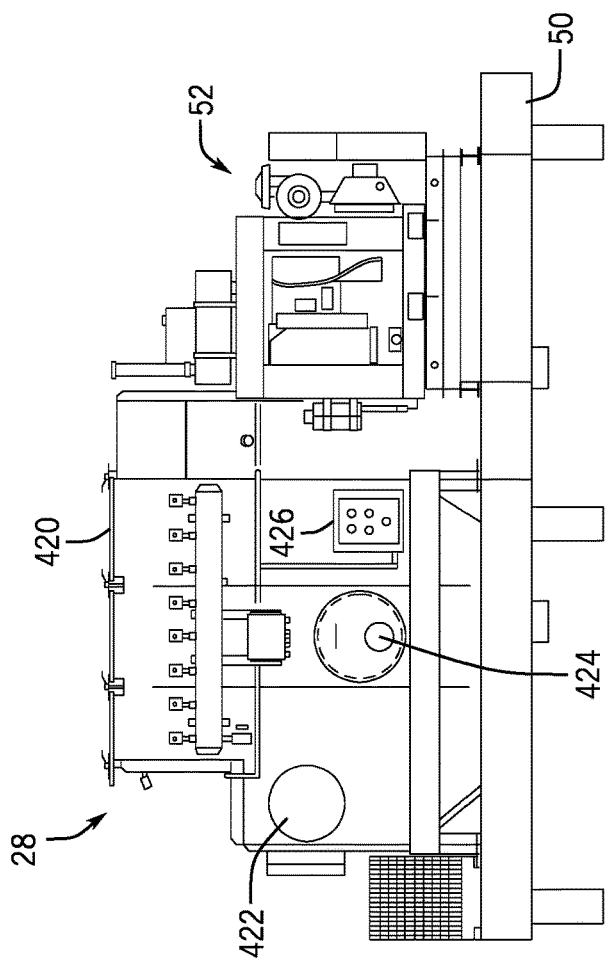
FIG. 29 is a side elevation view of the air mover of FIG. 29 according to an embodiment of the present invention.

FIG. 29 is a side elevation view of the air mover 28, according to an embodiment of the present invention. In the illustrated embodiment, the air mover 28 is positioned on the skid 50 to elevate the air mover 28 above the ground plane. The engine 52 is positioned proximate the air mover 28 (e.g., compressor, fan) and provides operational power to the air mover 28. In the illustrated embodiment, the engine 52 is a diesel powered engine. However, in other embodiments, the engine 52 may be gas powered or electric. The air mover 28 includes a cover 420 which is removable to access filter elements within the air mover 28. The filter elements block dust and debris from entering the moving parts of the air mover 28, thereby improving longevity of the equipment. A duct connector 422 is positioned on the air mover 28 to couple the tubing 70 between the air mover 28 and the manifold 48. As shown, the duct connector 422 includes a removable cover to block access to the interior workings of the air mover 28 when the air mover is not in use, such as during transportation or maintenance.

In operation, the air flow 266 travels toward the air mover 28 via the conduit 44. The filter elements are utilized to filter out the captured dust particles 264 and residual proppant 354. The air mover 28 includes a discharge 424 to remove the dust particles 264 and the residual proppant 354 from the system. As will be described below, the discharge 424 can be coupled to a container to receive the dust particles 264 and the residual proppant 354 for disposal. In the illustrated embodiment, the air mover 28 includes a controller 426 to monitor and change operation of the air mover 28. For example, the controller 426 may include on/off switches, gauges indication operating conditions of the air mover 28, and the like. In this manner, operation of the air mover 28 may be monitored and controlled to adjust the parameters of the air mover 28 to facilitate capture and removal of the dust particles 264 formed proximate the blender hopper 20.

Figure 30:
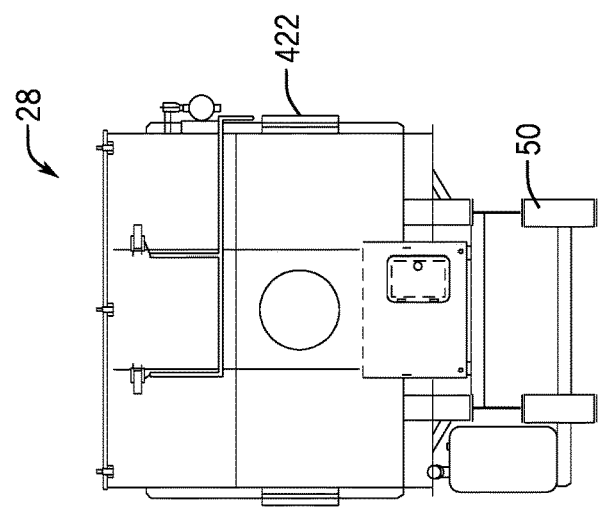
FIG. 30 is a rear elevation view of the air mover of FIG. 29 according to an embodiment of the present invention.

FIG. 30 is a rear elevation view of the air mover 28, according to an embodiment of the present invention. In the illustrated embodiment, the engine 52 is obstructed by the air mover's compressor section. As shown, the skid 50 positions the air mover 28 above the ground plane. The duct connector 422 extends off of a side of the air mover 28 for connection to the manifold 48. The connection between the air mover 28 and the manifold 48 enables the air flow 266 to be generated at the hood assembly 42, thereby facilitating removal of the dust particles 264.

Figure 31:
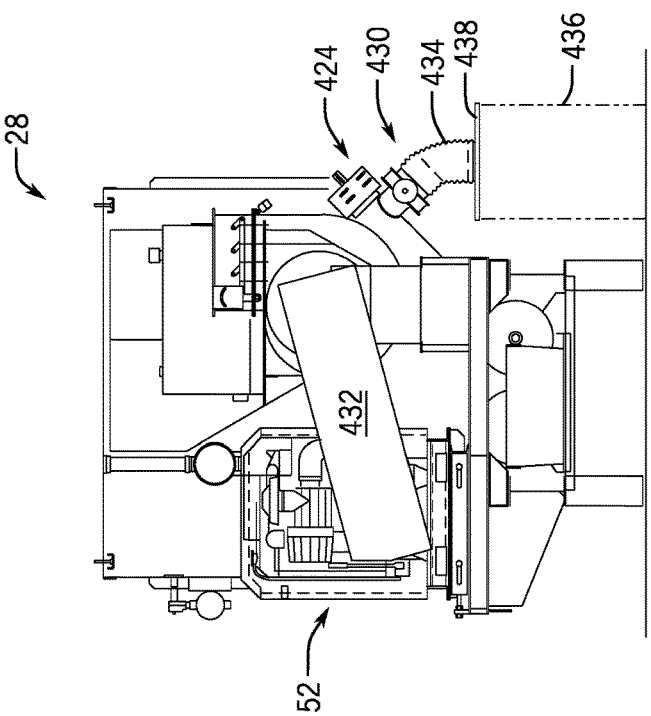
FIG. 31 is a back elevation view of the air mover of FIG. 29 having a waste discharge assembly according to a first embodiment of the present invention.

FIG. 31 is a back elevation view of the air mover 28 with a waste discharge assembly 430 coupled to the discharge 424, according to a first embodiment of the present invention. As described, the engine 52 is coupled to the air mover 28 to provide operational power. A guard 432 blocks access to the coupling between the air mover 28 and the engine 52. The discharge 424 extends off of the side of the air mover 28 for removal of the dust particles 264 and residual proppant 354 collected by the dust collection assembly 12. In the illustrated embodiment, a flexible hose 434 is coupled to the discharge to direct the dust particles 264 and the residual proppant 354 into a drum 436. The drum 436 has a removable lid 438 that blocks access to the interior of the drum 436 when the dust particles 264 and the residual proppant 354 is being transferred to the drum 436. As a result, the dust particles 264 are substantially confined to the drum 436 to reduce the likelihood of exposure to operations personnel. In certain embodiments, the flexible hose 434 and the lid 438 are coupled together such that both components are removed from the discharge 424 when the drum 436 is full. As a result, the chance of exposure to the dust particles 264 when the drum 436 is moved is decreased because the opening through the flexible hose 434 is smaller than the opening of the drum 436.

Figure 32:
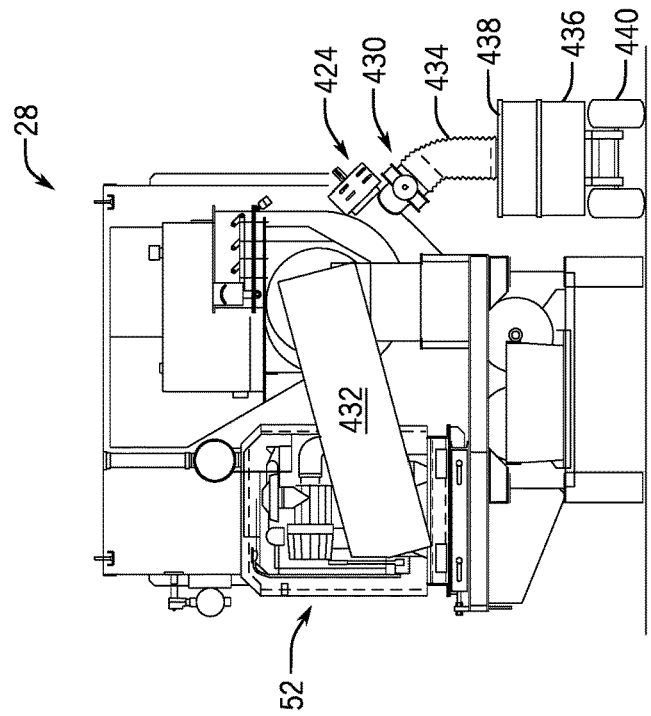
FIG. 32 is a back elevation view of the air mover of FIG. 29 having a waste discharge assembly according to a second embodiment of the present invention.

FIG. 32 is a back elevation view of the air mover 28 and the waste discharge 430, assembly according to a second embodiment of the present invention. As described above, the dust particles 264 and residual proppant 354 captured by the air mover 28 via the hood assembly 42 and the catch box 104 is carried back to the air mover 28 via the air flow 266. The captured particles are filtered out by the filter elements and removed from the system via the discharge 424. In the illustrated embodiment, the drum 436 is positioned on a set of wheels 440 to facilitate movement of the drum 436. The particles flow out of the discharge 424 and into the drum 436 via the flexible hose 434. Thereafter, the drum 436 can be removed from the air mover 28, for example, when the drum 436 is full. The wheels 440 enable easier movement of the drum 436, thereby reducing the time period between changing full drums 436 for empty drums 436.

Figure 33:
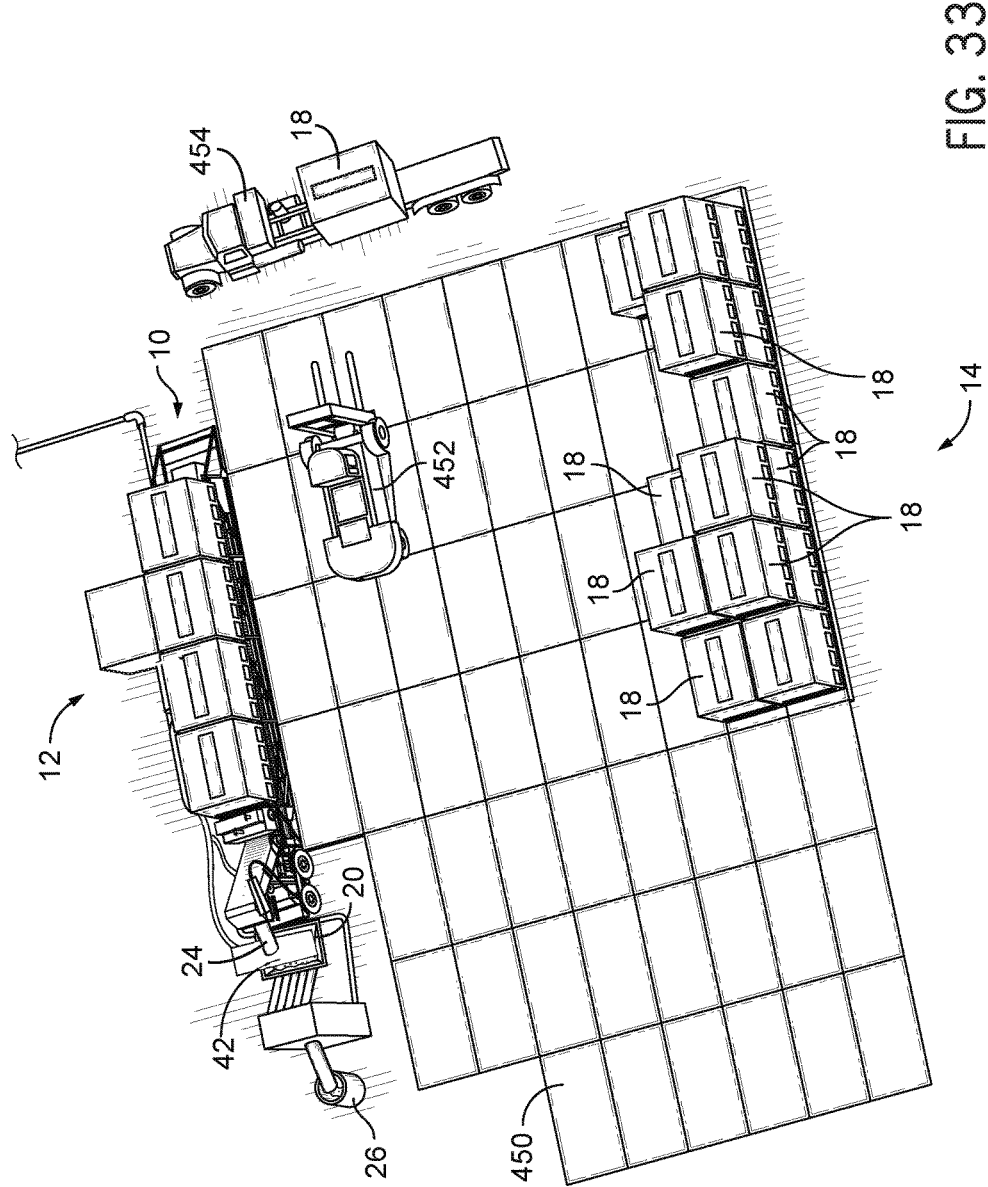
FIG. 33 is a perspective view of a proppant delivery system and a dust collection assembly arranged at a well site according to an embodiment of the present invention.

FIG. 33 is a perspective view of the proppant delivery assembly 10 and the dust collection assembly 12 arranged at the well site 14, according to an embodiment of the present invention. In the illustrated embodiment, the well site 14 includes a removable floor 450 made of wooden pallets to facilitate the use of heavy machinery, such as one or more forklifts 452, cranes, or other hydraulic movers, for loading and unloading the containers 18 off of the trucks 454. The containers 18 are stackable in a vertical configuration such that one container 18 is stacked on top of another. By stacking the containers 18 at the well site 14, the overall footprint utilized by the containers 18 may be reduced, thereby maximizing the often limited space available at the well site 14. The well site 14 further includes the blender hopper 20 which receives the proppant 92 dispensed from the containers 18 via the proppant delivery assembly 10. The dust collection assembly 12 is arranged proximate the proppant delivery assembly 10 such that dust particles 264 generated by the movement and settling of the proppant 92 are captured by the dust collection assembly 12. For example, the hood assembly 42 is coupled to the chute 24 and arranged above the blender hopper 20. From there, the proppant 92 can be mixed with liquids (e.g., water, fracking fluids, etc.) and injected into the wellbore 26.

While the illustrated embodiment includes the truck 454 delivering the containers 18 filled with fracking proppant 92, in other embodiments a railroad may be utilized to deliver the containers 18. The containers 18 can be arranged in a side-by-side configuration on rail cars and unloaded from the rail cars using the forklift 452 or another hydraulic mover. Thereafter, as shown in the illustrated embodiment, the containers 18 can be stacked at the well site 14 until needed. Because the containers 18 are shipped with the proppant 92 already loaded, the containers 18 may remain at the well site 14 as long as necessary because the proppant 92 is protected from the environment via the container 18. In this manner, the well site 14 may be organized for usage of the proppant delivery assembly 10 utilizing the containers 18.

Figure 34:
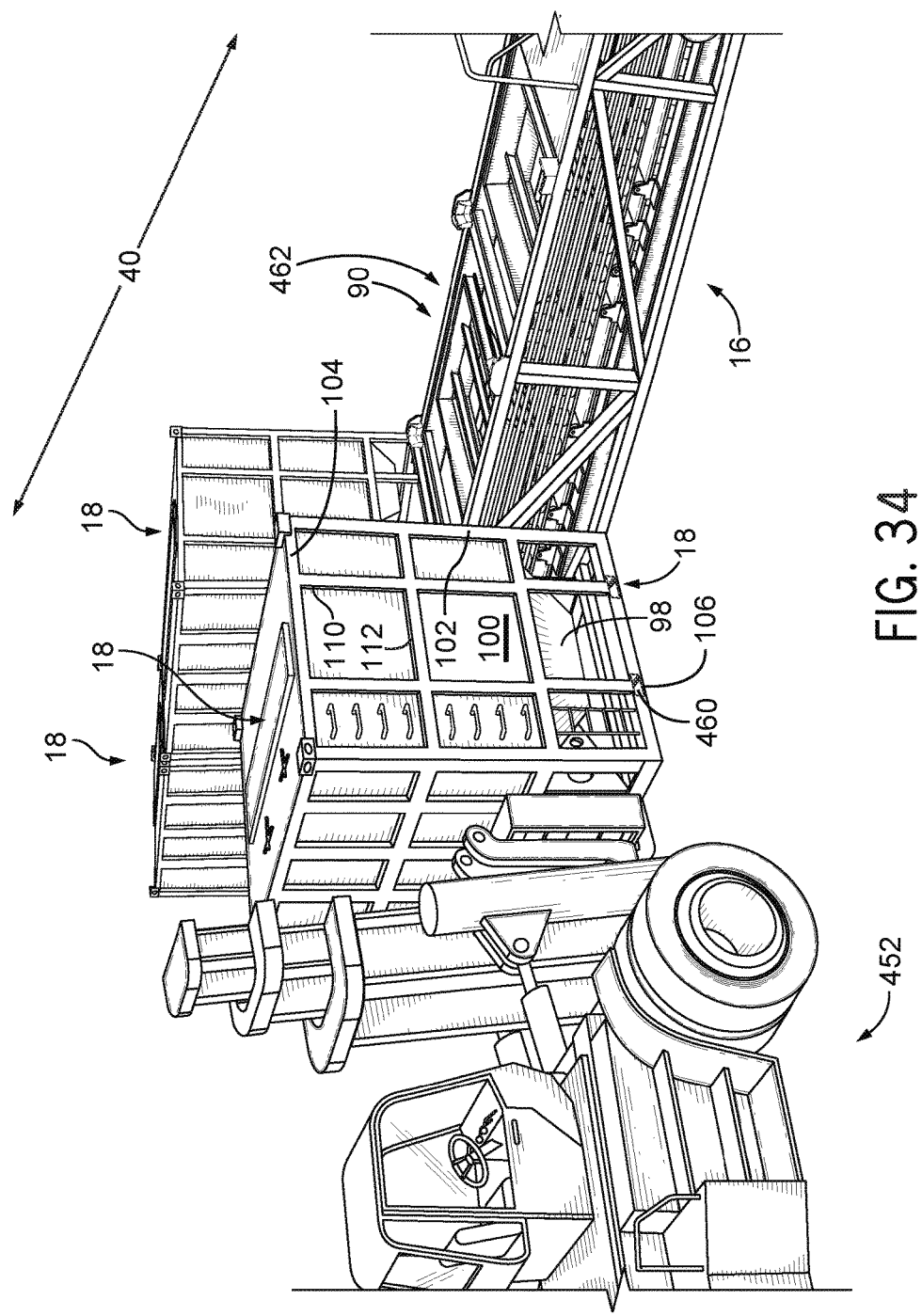
FIG. 34 is a perspective view of a container of a proppant delivery system being loaded onto a cradle of the proppant delivery system according to an embodiment of the present invention.

FIG. 34 is a perspective view of the container 18 of the proppant delivery system 10 being loaded onto the cradle 16 of the proppant delivery system 10, according to an embodiment of the present invention. The forklift 452 engages slots 460 in the container 18 configured to receive the forks of the forklift 452 for ease with movement. The forklift 452 lifts the container 18 off of the ground plane and carries the container 18 toward the cradle 16. As shown, the cradle 16 includes cradle sections 462 for receiving the container 18. The containers 18 are arranged in a side-by-side configuration along the length 40 of the cradle 16 to facilitate movement of the proppant 92 from the containers 18 to the blender hopper 20. In the illustrated embodiment, the forklift 452 lifts the container 18 above the top surface 90 and then lowers the container 18 onto the top surface 90 to receive and support the container 18. The containers 18 align with the cradle sections 462 to position the containers 18 over one or more actuators to enable the proppant 92 to flow out of the opening 94. In this manner, the containers 18 may be continuously loaded and unloaded from the cradle 16 to provide proppant 92 for fracking operations.

Figure 35:
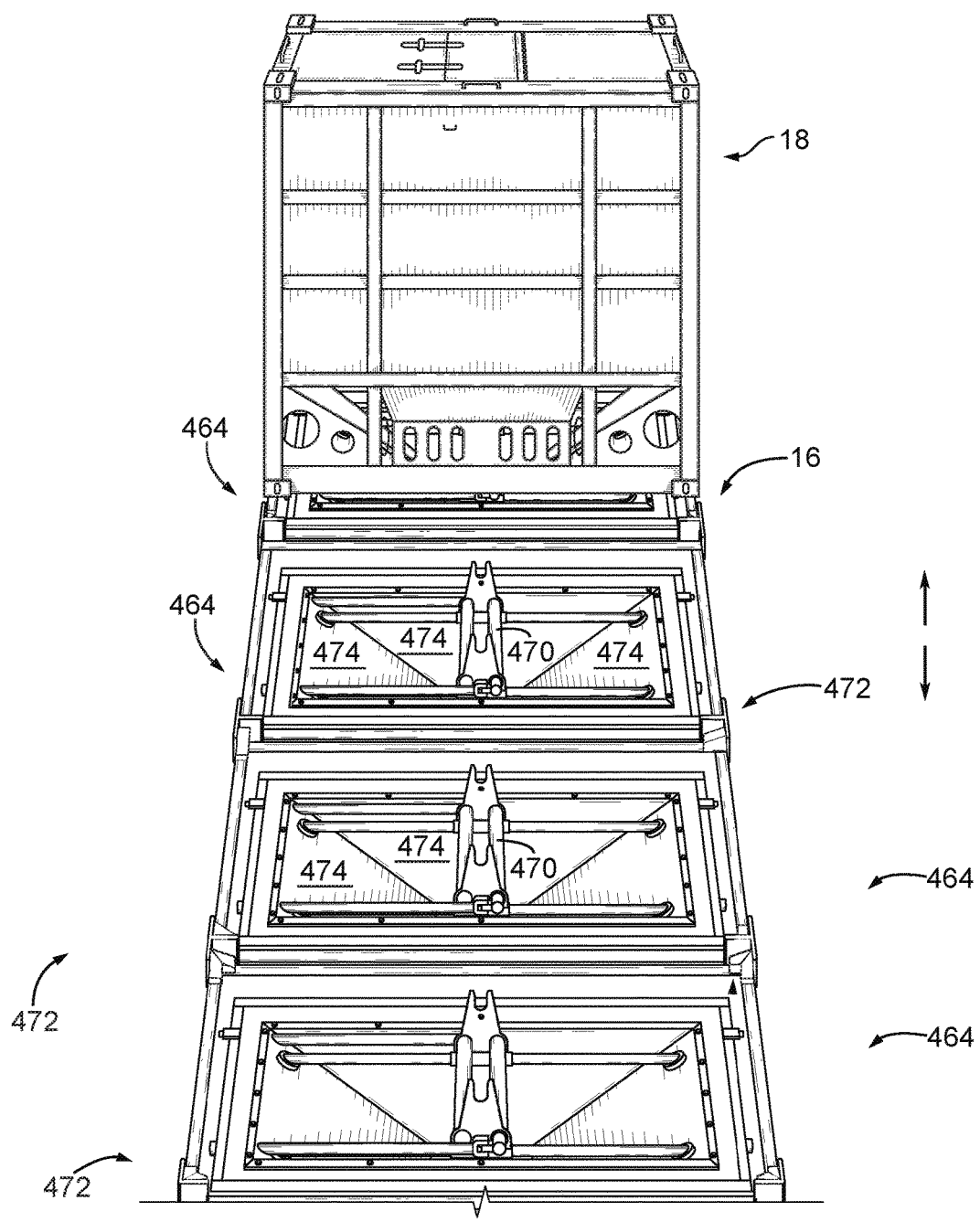
FIG. 35 is a perspective view of the container of FIG. 34 positioned on the cradle and aligned with an actuator of a proppant delivery system having a dust collector assembly according to an embodiment of the present invention.

FIG. 35 is a perspective view of the container 18 positioned on the cradle 16 and aligned with an actuator 470 of the proppant delivery system 10. In the illustrated embodiment, the container 18 is lowered onto the cradle section 464 to secure the container 18 to the cradle 16. The actuators 470 align with a gate 114 positioned at the bottom 96 of the container 18 to cover the opening 94. In operation, the actuators 470 move the gate between an open position, in which the proppant 92 flows out of the container 18, and a closed position, in which the proppant 92 is blocked from flowing out of the container 18. When in the open position, the proppant 92 flows out of the container 18 and into a hopper 472 arranged below the top surface 90 of the cradle 16. The hopper 472 includes sloped walls 474 that direct the proppant 92 downward and toward the proppant mover 22. In operation, the containers 18 are arranged in the side-by-side configuration along the cradle 16 such that each container 18 is engaged with respective actuators 470 to drive movement of the respective gates 114 between open and closed positions. The actuators 470 enable the containers 18 to empty the proppant 18 contained therein onto the proppant mover 22 for movement toward the blender hopper 20.

Figure 36:
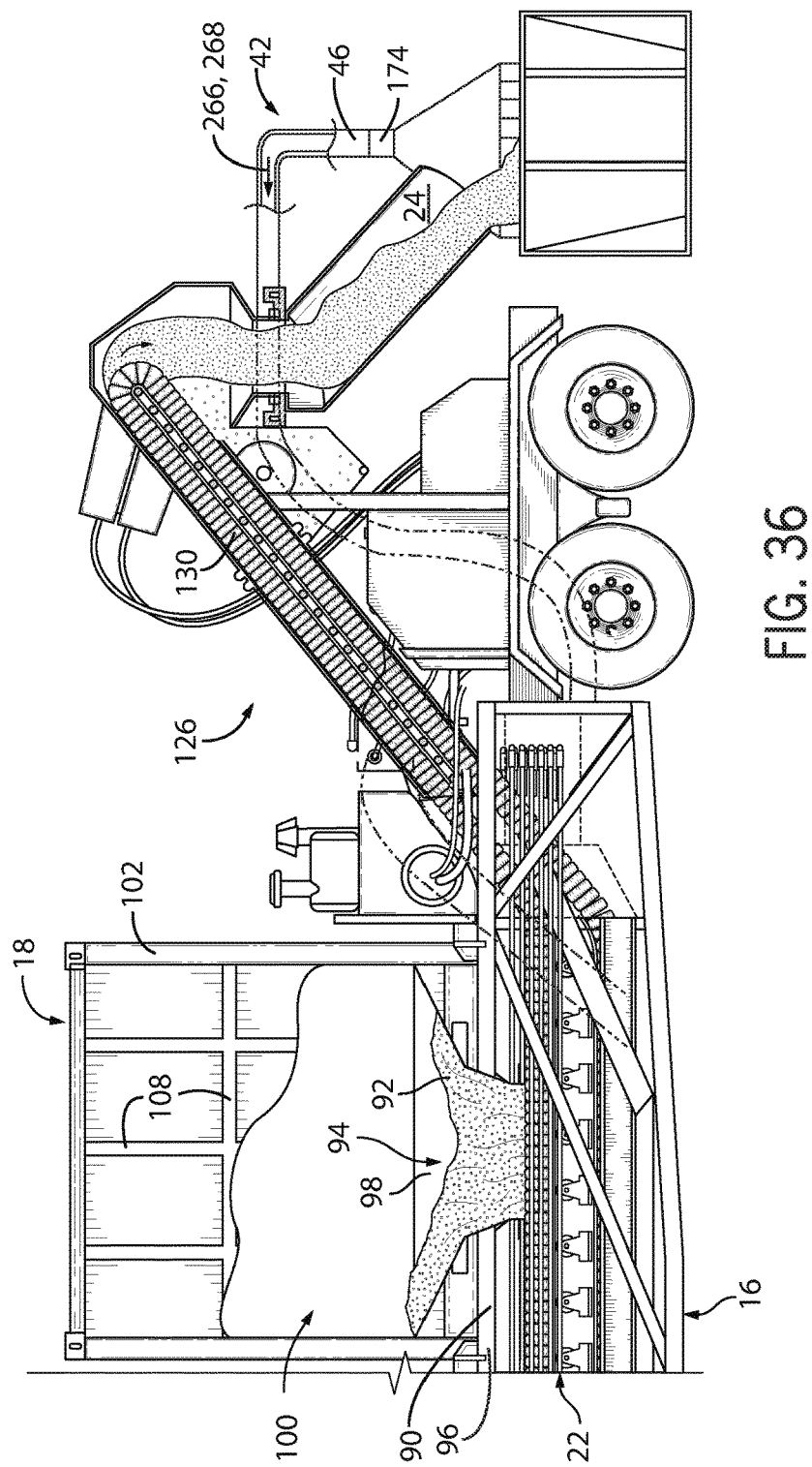
FIG. 36 is a partial sectional view of a container dispensing onto a conveyor of a proppant delivery system having a dust collector assembly according to an embodiment of the present invention.

FIG. 36 is a partial sectional view of the container 18 dispensing onto the conveyor 122 of the proppant delivery system 10 and the dust collection assembly 12 positioned over the blender hopper 20, according to an embodiment of the present invention. The container 18 is positioned on the cradle 16 and dispensing the proppant 92 through the opening 94 at the bottom 96 of the container 18. For example, the actuator 470 moves the gate 114 to the open position to enable the proppant 92 to flow out of the container 18. The proppant 92 flows through the hopper 472 and onto the top surface 120 of the proppant mover 22. In the illustrated embodiment, the proppant mover 22 is the endless conveyor 122. The conveyor 122 receives the proppant 92 and carries it away from the containers 18 and along the inclined section 126 toward the proppant chamber 144. As described above, the conveyor 122 turns over at the apex 400 to direct the proppant 92 through the proppant chamber 144 and onto the chute 24 for deposition into the blender hopper 20.

As the proppant 92 is moved toward the blender hopper 20, movement and settling may facilitate the formation of the dust particles 264. For example, as the proppant 92 is directed toward the proppant chamber 144, the proppant 92 may contact the sidewalls of the chamber 144, producing dust. In certain embodiments, the dust particles 264 can enter the catch box 140 through the inlet 352. As a result, the dust particles 264 will be contained within the system and not expelled into the atmosphere, where they can be inhaled by operations personnel.

Moreover, the dust particles 264 can form when the proppant 92 flows through the chute 24 and into the blender hopper 20. For example, settling of the proppant 92 can generate dust particles 264 that enter the air around the blender hopper 20 and can be inhaled by operations personnel. The hood assembly 42 is arranged over the blender hopper 20 and around the chute 24 to capture the dust particles 264 and direct them toward the air mover 28. In the illustrated embodiment, dust receptacles 174 extend through the hood assembly 42 to receive the air flow 266 generated by the air mover 28. The air flow 266 is a vacuum force (e.g., suction pressure) that draws air from the flow path 268 away from the blender hopper 20 and toward the air mover 28. The air flow 266 enters the hood assembly 42 and is directed to the tubes 46 via the dust receptacles 166, 174, 182. The tubes 46 are coupled to the manifold 48 that directs the air flow 266 to the air mover 28, thereby removing the dust particles 264 from the flow path 268 proximate the blender hopper 20. Accordingly, the dust particles 264 produced by the movement and settling of the proppant 92 can be captured to reduce the risk of operations personnel inhaling the dust particles 264.

Figure 37A:
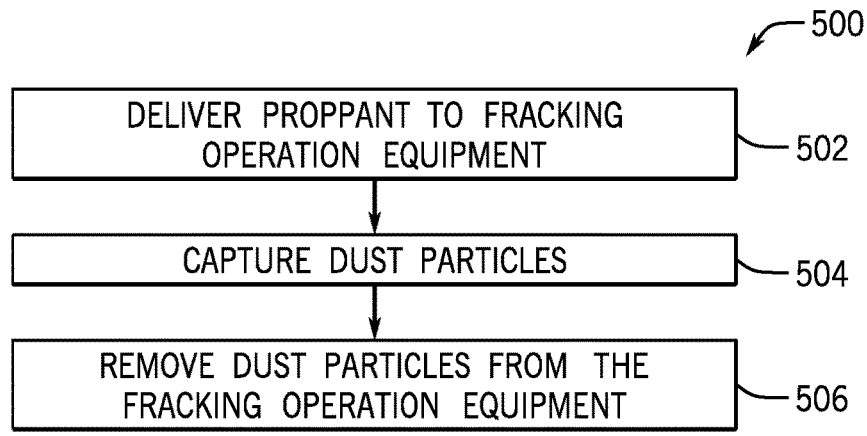
FIGS. 37A-D are flow charts illustrating methods for collecting dust particles in fracking operations according to embodiments of the present invention.

FIGS. 37A-D are flow charts illustrating methods for collecting dust particles in fracking operations according to embodiments of the present invention. Turning to FIG. 37A, in certain embodiments, a dust capturing method 500 includes delivering proppant 92 to fracking operation equipment (e.g., the blender hopper 20, the container 18, the wellbore 26, etc.) via the proppant delivery assembly 10 (block 502). For example, the proppant 92 can be stored in the one or more containers 10 and dispensed through the opening 94 in the bottom 96 of the containers 18 via gravity feed along the inclined surfaces 98. In certain embodiments, the one or more containers 10 are positioned on the top surface 90 of the cradle 16. For example, the containers 10 may be positioned onto the top surface 90 from the vertically stacked configuration at the well site 14 via the forklift 452. As the proppant 92 is dispensed from the containers 18, it falls onto the top surface 120 of the proppant mover 22 and is carried away from the containers 18 and toward the blender hopper 20.

As the proppant 92 is moved toward the blender hopper 20, dust particles may form due to the movement and settling of the proppant 92 on the proppant mover 22 and/or in the blender hopper 20. For example, the proppant mover 22 may carry the proppant 92 to the chute 24, which directs the proppant 92 into the blender hopper 20 via gravity feed. As the proppant 92 contacts the blender hopper 20 and/or proppant 92 already in the blender hopper 20, dust particles 264 may be released and enter the air surrounding the blender hopper 20. In certain embodiments, the dust particles 264 formed by the movement and settling of the proppant 92 at the blender hopper 20 (e.g., fracking operation equipment) are captured via the air flow 266 directed in the flow path 268 overlying the dust particles 264 (block 504). For example, the dust collection assembly 12 may capture the dust particles 264 in the air flow 266. In certain embodiments, the air mover 28 produces a suction force (e.g., vacuum pressure) to draw the air flow 266 away from the blender hopper 20. The air flow 266 is positioned over the blender hopper 20 via the hood assembly 42. In certain embodiments, the hood assembly 42 includes one or more dust receptacles 166, 174, 182 to direct the air flow 266 to the conduit 44 and back to the air mover 28. That is, the proppant dust particles 264 are removed from the fracking operation equipment (e.g., the blender hopper 20) by directing the air flow 266 away from the fracking operation equipment (block 506). For example, the suction force generated by the air mover 28 draws the air flow 266 up and away from the blender hopper 20 and through the dust receptacles 166, 174, 182. The dust receptacles 166, 174, 182 are coupled to the conduit 44 to direct the air flow 266 away from the blender hopper 20 and in the air flow direction 284. In this manner, the dust particles 264 can be removed from the fracking operation equipment to thereby reduce the risk of operations personnel inhaling the dust particles 264 in the air.

Figure 37B:
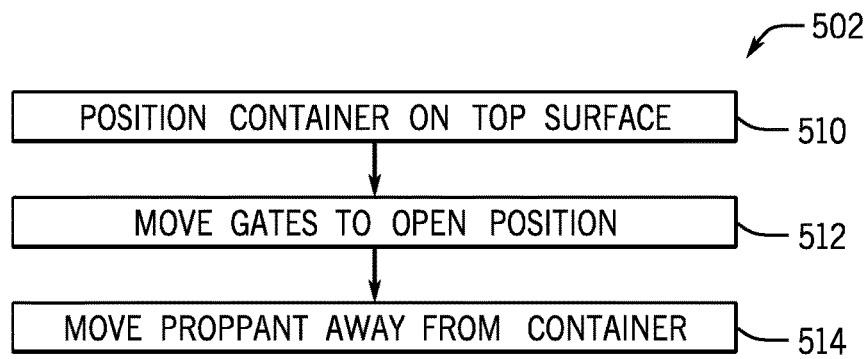

FIG. 37B is a flow chart illustrating the step shown in block 502 of delivering the proppant 92 to the fracking operation equipment. In certain embodiments, the one or more containers 18 are positioned on the top surface 90 of the cradle 16 (block 510). For example, the forklift 452 can lift the containers 18 from the stacked configuration and transport the containers 18 over to the cradle 16. As the containers 18 are positioned on the top surface 90, they can be aligned with one or more actuators 470 that interact with the gates 114 positioned at the bottom 96 of the containers 18. The respective gates 114 enable proppant 92 to flow out of the containers 18 when in the open position and block proppant 92 from flowing out of the containers 18 when in the closed position. For example, to deliver the proppant 92 the gates 114 arranged at the respective bottoms 96 of the one or more containers 18 may be moved to the open position to enable the proppant 92 to flow out of the one or more containers 18 (block 512). In certain embodiments, the proppant 92 flowing out of the one or more containers 18 is received on the top surface 120 of the proppant mover 22. For example, the proppant mover 22 can be the conveyor 122 that receives the proppant 92. The proppant mover 22 is positioned below the top surface 90 to receive the proppant from the one or more containers 18 via gravity feed. As a result, the proppant 92 can be moved away from the one or more containers (block 514). For example, the proppant 92 can be moved to the blender hopper 20.

Figure 37C:
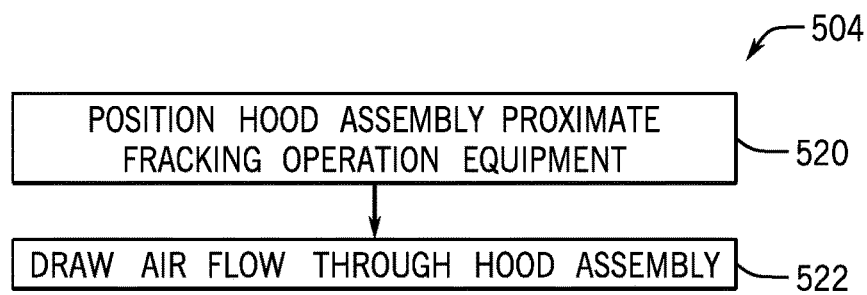

FIG. 37C is a flow chart of the method step of capturing dust particles 264, represented by block 504. In certain embodiments, the hood assembly 42 is arranged proximate the fracking operating equipment (e.g., the blender hopper 20) to direct the air flow 266 toward the flow path 268 (block 520). For example, the hood assembly 42 is arranged over the blender hopper 20 such that the capture area 190 is within the blender hopper surface area 192. As a result, the first, second, and third volumes 168, 170, 204 are closely positioned to the blender hopper 20 to facilitate capture of the dust particles 264. The hood assembly 42 is fluidly coupled to the air mover 28 to facilitate capture of the dust particles 48. For example, in certain embodiments, the air flow 266 is drawn upward and through the hood assembly 42 (block 522). As described above, the dust receptacles 166, 174, 182 extend through the hood assembly 42 to couple to the tubes 46 extending between the hood assembly 42 and the manifold 48. The suction pressure generated by the air mover 28 pulls the air flow 266 through the hood assembly 42, thereby removing the air present in the flow path 268 from proximate the blender hopper 20. In this manner, dust particles 264 formed proximate the blender hopper 20 can be captured in the hood assembly 42.

Figure 37D:
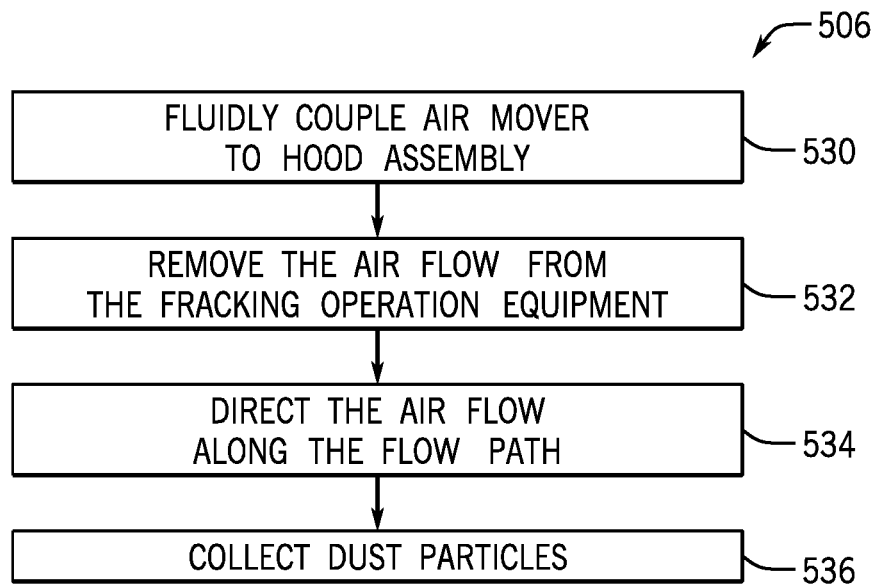

FIG. 37D is a flow chart illustrating the step shown in block 506 of removing the dust particles 264 from the fracking operation equipment. In certain embodiments, the conduit 44 fluidly couples the air mover 28 to the hood assembly 42 to facilitate removal of the dust particles 264 (block 530). For example, flexible tubing, rigid conduit, and/or the like may be utilized to form the flow path 268 between the air mover 28 and the hood assembly 42. Then, the air flow 266 is removed from the area proximate the blender hopper 20 (block 532). For example, the suction pressure generated by the air mover 28 draws the air flow 266 through the dust receptacles 166, 174, 182 and into the conduit 44. That is, the air mover 28 continually applies the vacuum force at the dust receptacles 166, 174, 182 and thereby removes at least a portion of the air in the flow path 268. The air flow 266 travels along the flow path 268 to the air mover (block 534). For example, the suction pressure generated by the air mover 28 draws the air flow 266 along the flow path 268 through the conduit 44. In certain embodiments, the air flow 266 is sufficient to capture the dust particles 264 while not removing grains of proppant 92 from the blender hopper 20. In other words, the suction pressure is particularly selected to capture the dust particles 264 and have a limited impact on the proppant 92. The dust particles 264 are collected at the air mover 28 (block 536). In certain embodiments, the air mover 28 includes filter element positioned along the flow path 268 to separate the dust particles 264 from the air. The dust particles 264 are collected and directed toward the discharge 424. At the discharge 424, one or more waste discharge assemblies 430 can be coupled to the discharge 424 to receive the dust particles 264 collected by the air mover 28. For example, the waste discharge assembly 430 may include the drum 436 fluidly coupled to the discharge 424 to receive the dust particles 264. In this manner, the dust particles 264 can be collected and removed from the system.

Figure 38:
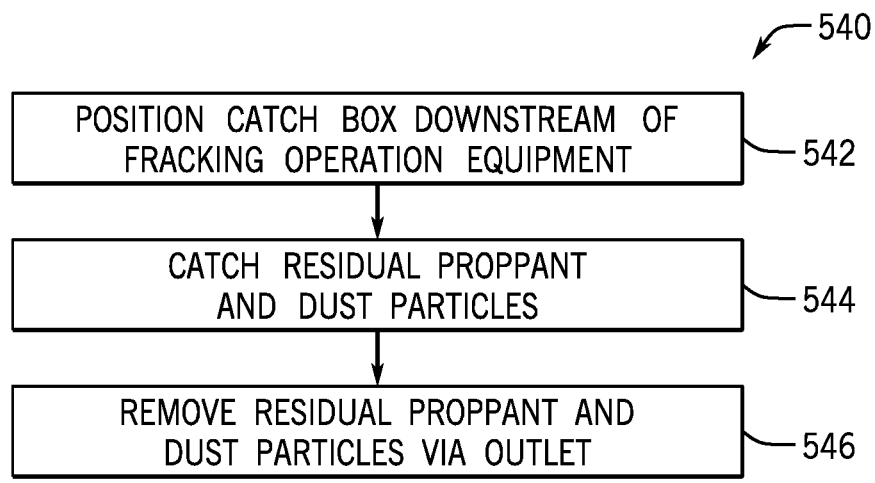
FIG. 38 is a flow chart illustrating methods for collecting dust particles and residual proppant in fracking operations according to embodiments of the present invention.

FIG. 38 is a flowchart of a method 540 of collecting residual proppant 354 and dust particles 264 in the proppant delivery assembly 10. As described above, in certain embodiments residual proppant 354 can stay on the proppant mover 22 after the proppant mover 22 turns over at the apex 400. For example, in embodiments where the proppant mover 22 is the conveyor 122, the top surface 102 of the conveyor may flip over and become the lower surface 354 after the apex 400. Residual proppant may remain on the conveyor 122, along with dust particles 264 formed as the proppant 92 is transferred to the chute 24. In certain embodiments, the catch box 140 is positioned downstream of the fracking operation equipment between the proppant mover 22 and the fracking operation equipment (block 542). For example, the catch box 140 can be positioned on the lower surface 356 of the inclined section 126 of the proppant mover 22. The inlet 352 is positioned downstream of the apex 400 to provide a flow path for the residual proppant 354 and the dust particles 264 to enter the catch box 140. In this manner, the catch box 140 catches the residual proppant 354 and dust particles 264 (block 544). For example, the catch box 140 includes an interior volume 350 having an inclined side 312 to direct the residual proppant 354 and dust particles 264 downward and into the catch box 140. The residual proppant 354 and dust particles 264 are removed from the catch box 140 via the outlet 316 (block 546). For example, the tubes 46 can be coupled to the outlet 316 such that the air flow 266 generated by the air mover 28 also captures the residual proppant 354 and dust particles 264 in the catch box 140. Moreover, in embodiments where the air flow 266 is particularly selected to be insufficient to move the residual proppant 354, the residual proppant 354 may be otherwise removed from the catch box 140. In this manner, the risk of exposure to proppant 294 and/or the dust particles 264 can be reduced.

As described above, embodiments of the present disclosure include the dust collection assembly 12 utilized to capture dust particles 265 generated by the movement and settling of proppant 92. In certain embodiments, the dust collection assembly 12 positioned proximate to and at least partially coupled to the proppant delivery assembly 10. The proppant delivery assembly 10 includes the cradle 16 for receiving and supporting one or more containers 18 on a top surface 90. The one or more containers 18 store proppant 92 that can be dispensed through the opening 94 at the bottom 96. As the proppant 92 flows out of the one or more containers 18, it lands on the top surface 120 of the proppant mover 22. In certain embodiments, the proppant mover 22 is the endless conveyor 122 that carries the proppant 92 away from the one or more containers 18. The conveyor 122 carries the proppant 92 to the chute 24 positioned at the distal end 32 of the cradle 16 for deposition into the blender hopper 20. In certain embodiments, as the proppant 92 flows into the blender hopper 20, dust particles 264 may be formed, which, in certain embodiments, can be inhaled by fracking operations site personnel. In order to reduce the risk of inhalation, the dust collection assembly 12 includes the hood assembly 42 coupled to the chute 24 and arranged proximate and overlying the blender hopper 20. In certain embodiments, the hood assembly 42 includes one or more dust receptacles 168, 174, 182 that extend through the hood assembly 42 to enable the dust particles 264 to exit the hood assembly 42 and be moved toward the air mover 28. For example, tubes 46 couple the one or more dust receptacles 168, 174, 182 to the manifold 48 to direct the air flow 266 generated by the suction pressure of the air mover 28 in the air flow direction 284. The air flow 266 captures the dust particles 264 present in the flow path 268 such that at least a volume of air proximate the blender hopper 20 is removed and carried toward the air mover 28. In this manner, the dust particles 264 can be removed from proximate the blender hopper 20 to reduce the risk of exposure to fracking site operations personnel.

This application is a continuation of U.S. Non-Provisional application Ser. No. 15/463,063, filed Mar. 20, 2017, titled "Conveyor with Integrated Dust Collector System," which is a divisional of U.S. Non-Provisional application Ser. No. 15/398,835, filed Jan. 5, 2017, titled "Conveyor with Integrated Dust Collector System," which claims priority to U.S. Provisional Application No. 62/275,377, filed Jan. 6, 2016, titled "Conveyor with Integrated Dust Collector System," all of which are incorporated herein by reference in their entireties.

The foregoing disclosure and description of the invention is illustrative and explanatory of the embodiments of the invention. Various changes in the details of the illustrated embodiments can be made within the scope of the appended claims without departing from the true spirit of the invention. The embodiments of the present invention should only be limited by the following claims and their legal equivalents.

The invention claimed is:

1. A catch box arranged beneath and proximate a lower surface of a proppant mover and adjacent a mover outlet to discharge proppant therefrom to catch settling residual proppant and dust particles when the proppant is transferred from the proppant mover in a direction away from the catch box to a desired location outside the catch box, the catch box comprising:
   an inlet positioned below the proppant mover to catch residual proppant and dust particles after the proppant mover has deposited proppant into a chute that directs the proppant to the desired location;
   an interior volume to store the residual proppant and dust; and
   an outlet positioned adjacent an upper section having a conduit connection configured and operable to enable removal of the settled residual proppant and dust particles via suction at the outlet; and
   an inclined surface adjacent the mover to direct residual proppant toward a lower section.

2. The catch box of claim 1, wherein the proppant mover comprises an endless conveyor that deposits the proppant into the chute at a conveyor location where the conveyor flips over, and the catch box is positioned at the conveyor location to catch the residual proppant remaining on the conveyor when the conveyor flips over.

3. The catch box of claim 1, wherein the outlet is positioned at a lower section of the catch box such that the residual proppant and dust particles will settle near the outlet to enable removal of the residual proppant and dust particles using suction pressure.

4. The catch box of claim 1, wherein the catch box further comprises the inclined surface being positioned the conveyor to direct the residual proppant and the dust particles toward a lower section of the catch box.

5. The catch box of claim 1, wherein the desired location is a proppant container.

* * * * *